US012612776B2

(12) United States Patent　　　(10) Patent No.:　US 12,612,776 B2
Kuroiwa et al.　　　(45) Date of Patent:　Apr. 28, 2026

(54) UNMANNED AERIAL VEHICLE

(71) Applicants: ACSL Ltd., Tokyo (JP); NJS Co., Ltd., Tokyo (JP)

(72) Inventors: Kenji Kuroiwa, Osaka (JP); Shosuke Inoue, Tokyo (JP); Yusuke Inagaki, Suita (JP); Patrik Ken Takeuchi, Yokohama (JP)

(73) Assignees: ACSL Ltd., Tokyo (JP); NJS Co., Ltd., Tokyo (JP)

( * ) Notice: Subject to any disclaimer, the term of this patent is extended or adjusted under 35 U.S.C. 154(b) by 202 days.

(21) Appl. No.: 17/046,408

(22) PCT Filed: Apr. 10, 2019

(86) PCT No.: PCT/JP2019/015670
§ 371 (c)(1),
(2) Date: Oct. 9, 2020

(87) PCT Pub. No.: WO2019/198768
PCT Pub. Date: Oct. 17, 2019

(65) Prior Publication Data
US 2021/0171196 A1　　Jun. 10, 2021

(30) Foreign Application Priority Data
Apr. 10, 2018　(WO) .................. PCT/JP2018/015100

(51) Int. Cl.
*B64U 50/30*　　(2023.01)
*B64U 20/30*　　(2023.01)
(Continued)

(52) U.S. Cl.
CPC ............... *E03F 7/00* (2013.01); *F16L 55/38* (2013.01); *H04N 7/181* (2013.01); *H04N 23/90* (2023.01);
(Continued)

(58) Field of Classification Search
CPC .............. B64C 27/20; B64C 2201/027; B64C 2201/123; B64C 2201/127;
(Continued)

(56) References Cited

U.S. PATENT DOCUMENTS 10,002,342 B1 *　6/2018　Oikarinen .............. H04N 7/185
10,759,531 B2 *　9/2020　Yamada .................. B64C 25/54
(Continued)

FOREIGN PATENT DOCUMENTS

CN　　101491898 A　　7/2009
CN　　103217983 A　　7/2013
(Continued)

OTHER PUBLICATIONS

International Search Report mailed on Jun. 11, 2019, issued in connection with International Application No. PCT/JP2019/015670, filed on Apr. 10, 2019, 3 pages.
(Continued)

*Primary Examiner* — Joshua D Huson
*Assistant Examiner* — Anna L. Gordon
(74) *Attorney, Agent, or Firm* — McDonnell Boehnen Hulbert & Berghoff LLP

(57) ABSTRACT

The present disclosure relates to a device configuration, and a method for performing an imaging survey within a survey space using an unmanned aerial vehicle. An unmanned aerial vehicle with at least four rotating blades, and a control unit which controls the rotation of the at least four rotating blades. The unmanned aerial vehicle includes a survey camera in a position on a chassis of the unmanned aerial vehicle, between at least one rotating blade positioned on the side in the direction of travel, from among the at least four rotating blades, and at least one rotating blade positioned on the opposite side to the direction of travel, and wherein, when flying above a surface in which a liquid is at least (Continued)

partially present, the unmanned aerial vehicle flies while at least partially preventing scattered liquid from reaching above the chassis.

5 Claims, 44 Drawing Sheets

(51) Int. Cl.

| | |
|---|---|
| *B64U 30/21* | (2023.01) |
| *E03F 7/00* | (2006.01) |
| *F16L 55/38* | (2006.01) |
| *H04N 7/18* | (2006.01) |
| *H04N 23/90* | (2023.01) |
| *B64D 43/00* | (2006.01) |
| *B64U 50/13* | (2023.01) |
| *B64U 101/26* | (2023.01) |
| *B64U 101/30* | (2023.01) |
| *F16L 101/30* | (2006.01) |
| *H04N 23/50* | (2023.01) |

(52) U.S. Cl.

CPC .............. *B64D 43/00* (2013.01); *B64U 20/30* (2023.01); *B64U 30/21* (2023.01); *B64U 50/13* (2023.01); *B64U 50/30* (2023.01); *B64U 2101/26* (2023.01); *B64U 2101/30* (2023.01); *B64U 2201/10* (2023.01); *B64U 2201/20* (2023.01); *F16L 2101/30* (2013.01); *H04N 23/555* (2023.01)

(58) Field of Classification Search

CPC . B64C 2201/141; B64C 39/024; B64D 47/08; H04N 2005/2255; B64U 2101/26; B64U 2101/30; B64U 30/299; B64U 20/75

See application file for complete search history.

(56) References Cited

U.S. PATENT DOCUMENTS

| | | | |
|---|---|---|---|
| 10,899,436 B2 | 1/2021 | Gentry | |
| 11,235,890 B1 | 2/2022 | Dahlstrom | |
| 2010/0013917 A1* | 1/2010 | Hanna .............. | G08B 13/19689 |
| | | | 348/E13.001 |
| 2014/0361111 A1 | 12/2014 | Hyun | |
| 2016/0129998 A1* | 5/2016 | Welsh ..................... | B64C 27/24 |
| | | | 244/12.3 |
| 2016/0229530 A1 | 8/2016 | Welsh | |
| 2016/0375997 A1* | 12/2016 | Welsh .................. | B64C 39/024 |
| | | | 244/17.23 |
| 2016/0378108 A1 | 12/2016 | Paczan et al. | |
| 2017/0122736 A1 | 5/2017 | Dold et al. | |
| 2017/0274995 A1 | 9/2017 | Yamada et al. | |
| 2017/0277187 A1* | 9/2017 | Refai ...................... | G06T 17/05 |
| 2017/0369166 A1 | 12/2017 | van den Heuvel | |
| 2018/0022451 A1* | 1/2018 | Lim ........................ | B64D 27/24 |
| | | | 244/17.23 |
| 2018/0093770 A1 | 4/2018 | Welsh | |
| 2018/0099745 A1 | 4/2018 | Welsh | |
| 2018/0217614 A1* | 8/2018 | Salas-Moreno ...... | G01C 21/383 |
| 2018/0251212 A1* | 9/2018 | Sugaki .................. | B64C 39/024 |
| 2019/0106206 A1 | 4/2019 | Shi | |
| 2019/0366375 A1* | 12/2019 | Thompson ............ | B64C 39/024 |
| 2020/0377211 A1* | 12/2020 | Daddi .................... | B64D 47/08 |

FOREIGN PATENT DOCUMENTS

| | | | |
|---|---|---|---|
| CN | 204507256 U | | 7/2015 |
| CN | 205499350 U | | 8/2016 |
| CN | 205707410 U | | 11/2016 |
| CN | 106245524 A | * | 12/2016 |
| CN | 106628149 A | * | 5/2017 |
| CN | 107207087 A | | 9/2017 |
| JP | 2005-193727 A | | 7/2005 |
| JP | 2006-051841 A | | 2/2006 |
| JP | 2013-000059 A | | 1/2013 |
| JP | 2014-236728 A | | 12/2014 |
| JP | 2014-239665 A | | 12/2014 |
| JP | 2015-194069 A | | 11/2015 |
| JP | 2015-223995 A | | 12/2015 |
| JP | 2016-211878 A | | 12/2016 |
| JP | 2017-036988 A | | 2/2017 |
| JP | 2017-061298 A | | 3/2017 |
| JP | 2017-087917 A | | 5/2017 |
| JP | 2017-136914 A | | 8/2017 |
| JP | 2017-171032 A | | 9/2017 |
| JP | 2017-191026 A | | 10/2017 |
| JP | 2017-532256 A | | 11/2017 |
| JP | 2017-226259 A | | 12/2017 |
| JP | 2018-001967 A | | 1/2018 |
| JP | 2018-505094 A | | 2/2018 |
| JP | 2018-505818 A | | 3/2018 |
| JP | 2018510805 A | | 4/2018 |
| KR | 1020170138015 A | | 12/2017 |
| KR | 1020180012136 A | | 2/2018 |
| KR | 1020180012194 A | | 2/2018 |
| WO | 2017/183219 A1 | | 10/2017 |
| WO | WO-2019037036 A1 | * | 2/2019 |

OTHER PUBLICATIONS

Written Opinion mailed on Jun. 11, 2019, issued in connection with International Application No. PCT/JP2019/015670, filed on Apr. 10, 2019, 4 pages.

Disclosures in Grace Period for Japanese application No. 2020-513437 (Japanese version).

Disclosures in Grace Period for Japanese application No. 2020-513437 (partial English translation).

* cited by examiner 13,14,15,16

A

27A

27B

27C

A

27A

27A 27A-1

27B

27C

27C

27B

64 — PROCESSING UNIT

51

65 — STORAGE UNIT

66 — DISPLAY UNIT

67 — COMMUNICATION UNIT

68 — INPUT UNIT

COMET ANTENNA CP-60L

ANTENNA

114(1) SHEAVE BRACKET

113(3) STOPPER HOOK

114(2) CYLINDER BRACKET

108 CYLINDER TOP
ELECTRIC CYLINDER

113(1) CYLINDER FRAME

107 SWING CRANK

φ8×1300L SUS304

OVERALL WEIGHT
ABOUT 8.5 kg

MAX1000

50

29

45°

65

114

110 ANTENNA
BRACKET B

110 ANTENNA
BRACKET A

113(2)ANTENNA STAY

Φ30

20°

UNMANNED AERIAL VEHICLE

CROSS-REFERENCE TO RELATED APPLICATIONS

This application is a U.S. National Phase Application under 35 U.S.C. § 371 of International Application No. PCT/JP2019/015670, filed Apr. 10, 2019, which claims priority to International Application No. PCT/JP2018/015100, filed Apr. 10, 2018, the disclosures of each of which are incorporated herein by reference in their entirety.

TECHNICAL FIELD

The present invention relates to an unmanned flying object (unmanned aerial vehicle). More specifically, the present invention relates to an unmanned flying object suitable for performing shooting inspection in an inspection space including the inside of a closed-type space such as the inside of a tubular space or the inside of a rectangular space.

BACKGROUND ART

The useful life of a sewage pipeline (sewer conduit) is set to approximately 50 years, and it is assumed that facilities that have reached the end of their useful life will exponentially increases in the future. For efficient maintenance and management, it is essential to grasp a state of the sewage pipeline.

As a method of inspecting the state of the sewage pipeline, a method of an inspector moving in a pipe to perform direct visual inspection, a method of arranging a television camera connected to the ground via a cable in a pipe to perform shooting, a method of loading a television camera connected to the ground via a cable into a self-propelled vehicle and arranging the television camera in a pipe to perform shooting while traveling, and the like have been used. However, in the method of the direct visual inspection by the inspector, there are various problems such as a risk of a toxic gas being produced in the sewage pipeline to affect a human body and a risk from immersion at the time of sudden rainfall. In the method of arranging the television camera in the pipe, there are also problems that a sufficient inspection speed is not obtained and a vehicle is difficult to control when a water level in the sewage pipeline rises.

In flying an unmanned aerial vehicle in not only the sewage pipeline but also an environment where a collision with any boundary surface such as a wall surface or a ceiling may occur, controllability of the unmanned aerial vehicle may be deteriorated by the collision with the boundary surface, or an vehicle body may be damaged in some cases.

CITATION LIST

Patent Literature

Patent Literature 1: Japanese Patent Laid-Open No. 2017-087917
Patent Literature 2: Japanese Patent Laid-Open No. 2017-226259
Patent Literature 3: Japanese Patent Laid-Open No. 2018-001967
Patent Literature 4: Japanese Patent Laid-Open No. 2014-239665
Patent Literature 5: Japanese Patent Laid-Open No. 2014-236728

Patent Literature 6: Japanese Patent Laid-Open No. 2013-000059

SUMMARY OF INVENTION

Technical Problem

An object of the present invention is to provide an apparatus configuration, a method, and the like for performing shooting inspection in an inspection space including the inside of a sewage pipeline using an unmanned flying object.

Solution to Problem

To solve the above-described problems, the present invention provides an unmanned flying object comprising at least four rotary wings and a control unit controlling rotations of the at least four rotary wings, wherein the unmanned flying object comprises an inspection camera which is placed at a position on the vehicle body of the unmanned flying object, the position being between one or more rotary wings from the at least four rotary wings positioned at a traveling direction-side and one or more rotary wings from the at least four rotary wings positioned at a side opposite to the traveling direction-side, where the unmanned flying object flies while the at least four rotary wings are at least partially preventing scattered liquid from reaching a position above the vehicle body when the unmanned flying object is flying above a surface on which a liquid at least partly exists.

The unmanned flying object may further comprise a thrust generation propeller, and the unmanned flying object may be propelled by rotations of the thrust generation propeller while floating by rotations of the at least four rotary wings.

The unmanned flying object may further comprise a traveling direction shooting camera which is placed at a position on the vehicle body of the unmanned flying object, the position of the traveling direction shooting camera being between one or more rotary wings from the at least four rotary wings positioned at the traveling direction-side and one or more rotary wings from the at least four rotary wings positioned at the side opposite to the traveling direction-side, where the position of the traveling direction shooting camera is different from the position of the inspection camera and an unmanned flying object-side communication unit, and the unmanned flying object can fly inside an inspection space while shooting inside the inspection space in the traveling direction by means of the traveling direction shooting camera and while transmitting traveling direction image data obtained by shooting in the traveling direction from the unmanned flying object-side communication unit.

Advantageous Effect of Invention

The present invention proposes a specific procedure, apparatus, and the like for performing shooting inspection using an unmanned flying object. As a result, safe shooting inspection in a sewage pipeline can be performed.

BRIEF DESCRIPTION OF DRAWINGS

FIG. 24A is a design drawing of one example of the flight start stage (corresponding to a diagram viewed from above in FIG. 18).

DESCRIPTION OF EMBODIMENTS

First Embodiment

Figure 1A:
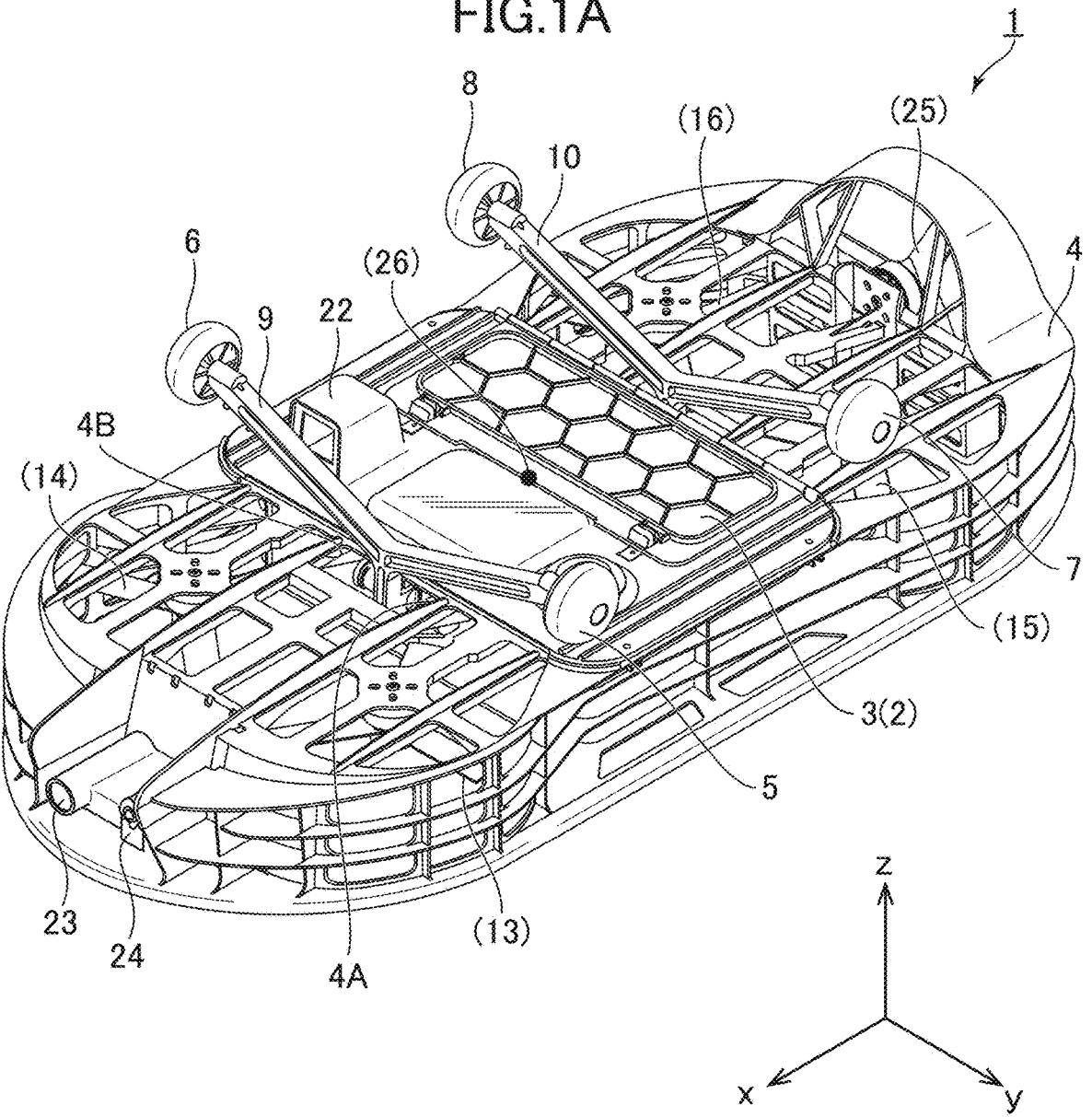
FIG. 1A is a perspective view of an unmanned aerial vehicle according to an embodiment of the present embodiment.

An unmanned aerial vehicle, a flight control mechanism for the unmanned aerial vehicle, and a method using these according to an embodiment of the present invention will be described below with reference to the drawings. Note that the unmanned aerial vehicle, the flight control mechanism for the unmanned aerial vehicle, and the method using these are not limited to a specific mode described below, but are appropriately changeable within the scope of the present invention. For example, the unmanned aerial vehicle according to the present invention is not necessarily an autonomous flight type unmanned aerial vehicle, and a functional configuration of the unmanned aerial vehicle is not limited to that illustrated in FIG. 9, but is also arbitrary if a similar operation can be performed. For example, operations to be performed by a plurality of components may be performed by a single component, for example, a function of a communication unit is integrated with a main operation unit. Alternatively, an operation to be performed by a single component as illustrated may be performed by a plurality of components, for example, a function of a main operation unit is distributed among a plurality of operation units. An autonomous control program of the unmanned aerial vehicle may be recorded on a recording device such as a hard disk drive and read out and executed by the main operation unit (The autonomous control program as illustrated may be decomposed into a plurality of program modules, or any other programs may be executed by the main operation unit or the like), or a similar operation may be performed by a built-in type system using a microcomputer or the like. All components illustrated in the following embodiment need not be included in the unmanned aerial vehicle and the flight control mechanism for the unmanned aerial vehicle according to the present invention (For example, the unmanned aerial vehicle and the flight control mechanism for the unmanned aerial vehicle need not include a thrust generation propeller 25 when propulsion of the unmanned aerial vehicle is controlled under control of rotors 13 to 16 illustrated in FIG. 1B and need not include an autonomous control program and various types of databases if the unmanned aerial vehicle is completely flown under control from outside without performing autonomous control), and the method according to the present invention need not include all method steps as illustrated. A rotary wing for floating the unmanned aerial vehicle is not limited to four rotors 13 to 16 as illustrated in FIG. 1B, for example, but may be any number of (four or more) rotary wings. A propeller for generating a thrust is not limited to the thrust generation propeller 25 illustrated in FIG. 1D, for example, but may be any propeller. The flight control mechanism for the unmanned aerial vehicle according to the present invention can be used for controlling any unmanned aerial vehicle such as a rotorcraft or a fixed-wing craft, and the unmanned aerial vehicle according to the present invention is not limited to the rotorcraft. An vehicle body size of the unmanned aerial vehicle is also arbitrary. Although an example in which the unmanned aerial vehicle performs shooting flight (flight while taking pictures) in a closed-type space is illustrated in the following embodiment, the unmanned aerial vehicle according to the present invention can be flown in not only the closed state but also any environment and for any purpose, and the flight control mechanism can be used in not only the closed-type space but also any environment. Note that the closed-type space need not be completely closed, but may be a space that is at least partially closed and where flight of the unmanned aerial vehicle is at least partially restricted. For example, a tubular space in a sewage pipeline connected to the outside via a manhole is also a closed-type space, and a tunnel of a highway is also a closed-type space, as described in the following embodiment. The number of preceding collision members to be held by the holding member is not limited to two, but is also arbitrary, and the number of flight control mechanisms to be attached to the vehicle body is also arbitrary. Note that although the holding member can be formed of a metal or plastic, for example, the holding member may be formed of any material such as an elastic body if it can exhibit a function as the holding member.

Other members and components may be composed of any material if they can exhibit functions of the present invention.

Configuration of Unmanned Aerial Vehicle

Figure 1B:
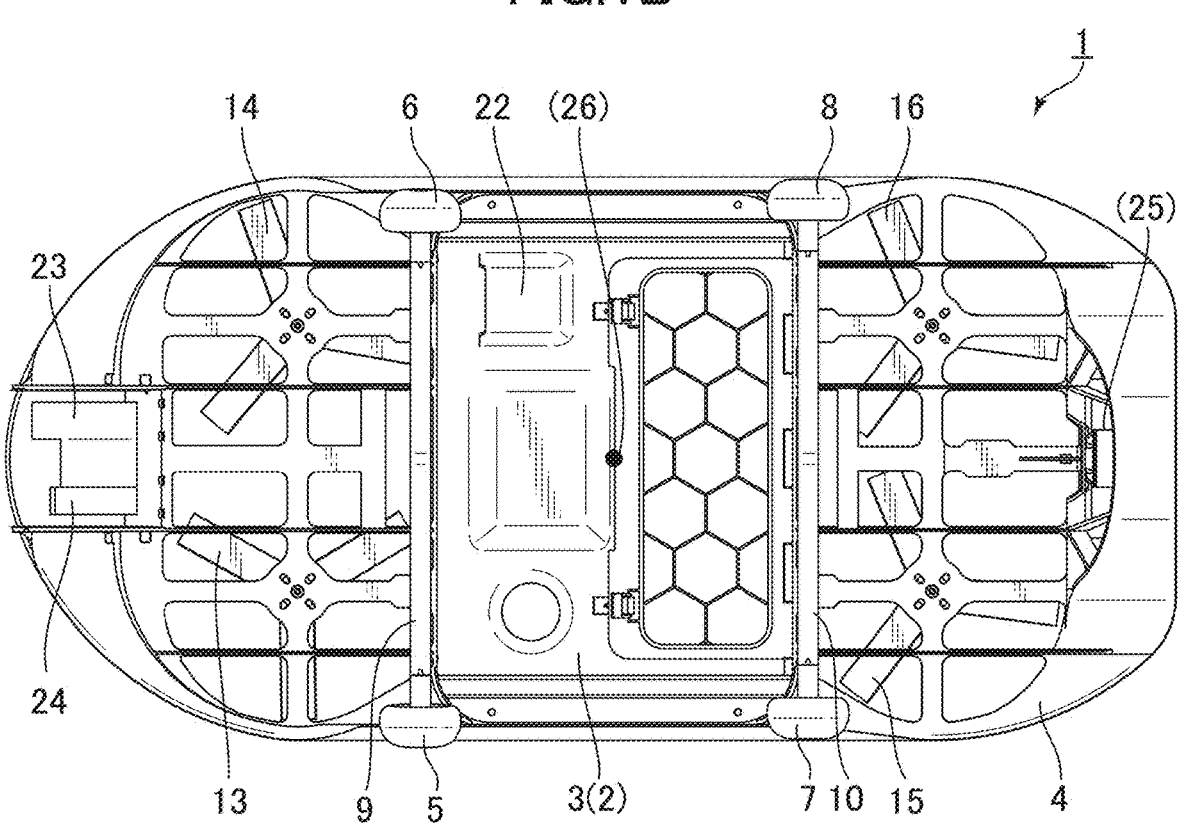
FIG. 1B is a diagram of the unmanned aerial vehicle illustrated in FIG. 1A in a positive direction of z.
Figure 1C:
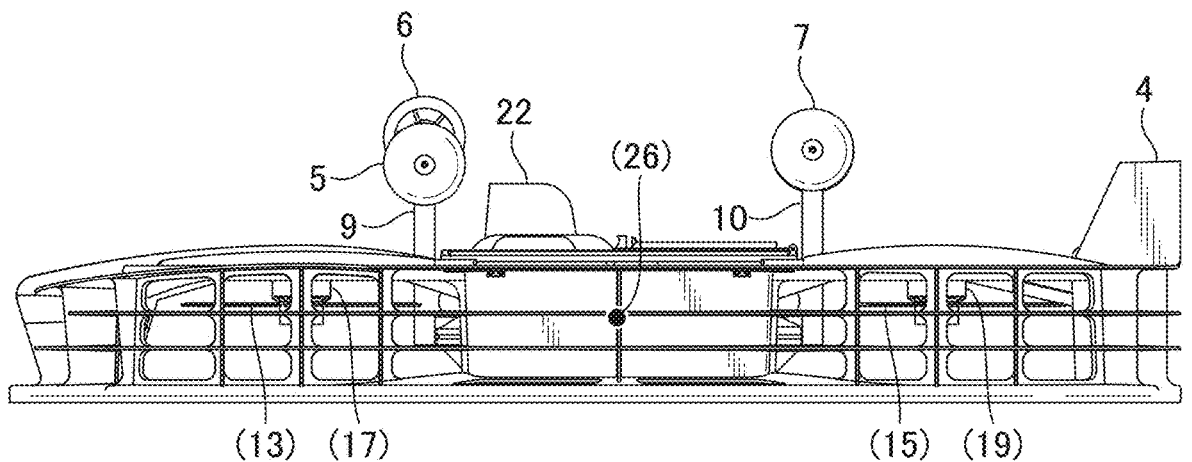
FIG. 1C is a diagram of the unmanned aerial vehicle illustrated in FIG. 1A in a positive direction of y.
Figure 1D:
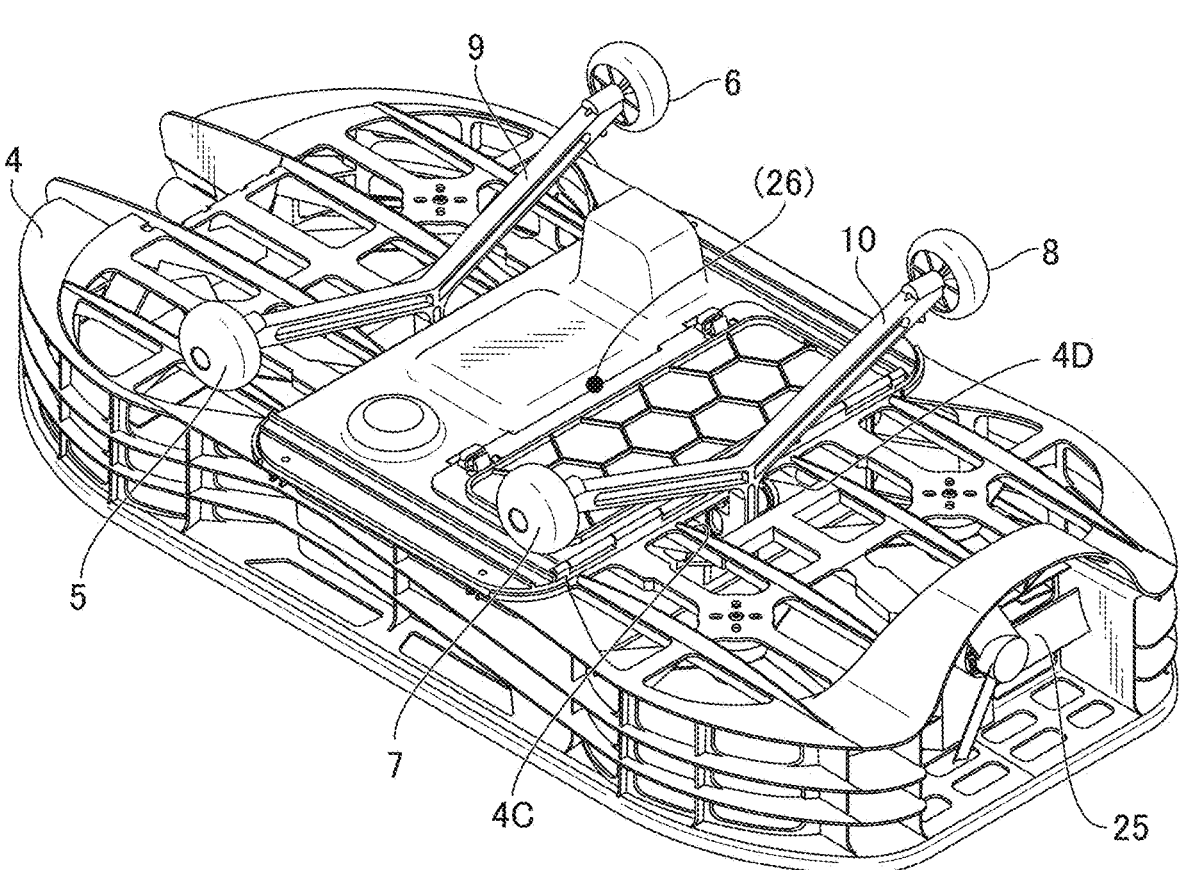
FIG. 1D is a perspective view of the unmanned aerial vehicle illustrated in FIG. 1A from behind in a traveling direction.
Figure 1E:
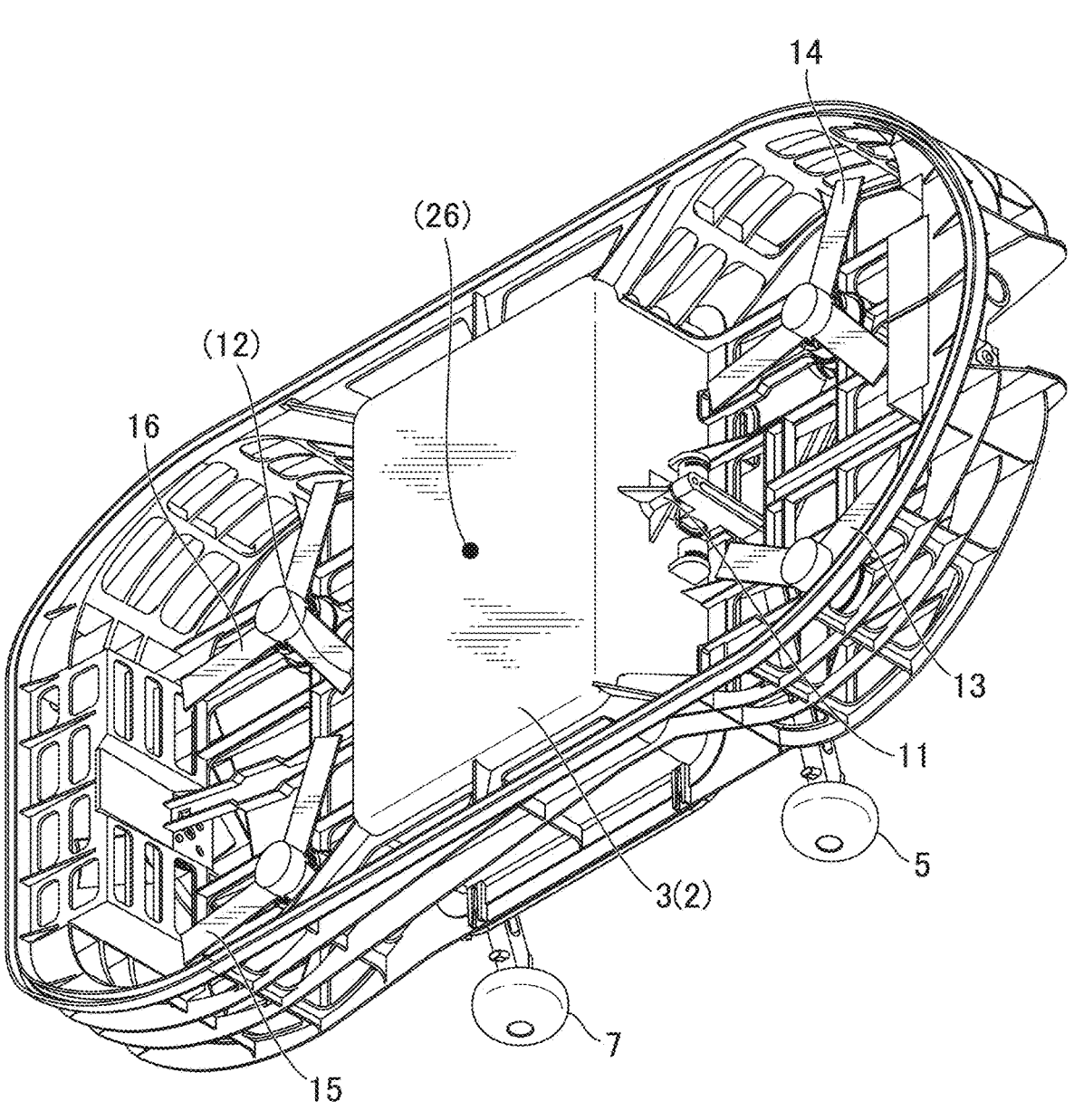
FIG. 1E is a perspective view of the unmanned aerial vehicle illustrated in FIG. 1A in a negative direction of z.
Figure 1F:
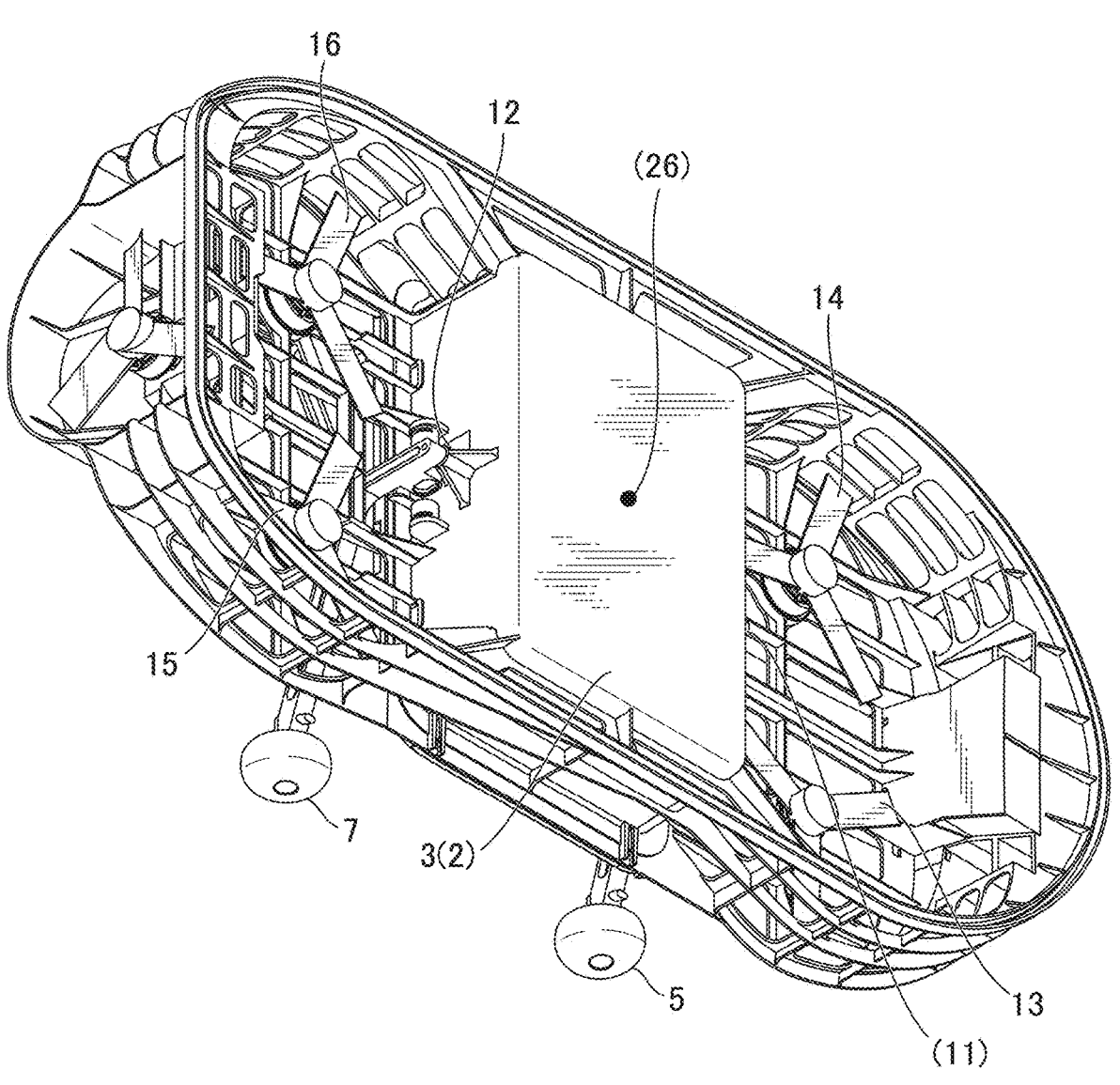
FIG. 1F is a perspective view of the unmanned aerial vehicle illustrated in FIG. 1A in the negative direction of z and in a direction different from that in FIG. 1E.

FIGS. 1A to 1F illustrate an appearance of an unmanned aerial vehicle according to an embodiment of the present invention. FIG. 1A is a perspective view, FIG. 1B is a diagram viewed in a positive direction of z illustrated in FIG. 1A, FIG. 1C is a diagram viewed in a positive direction of y, FIG. 1D is a perspective view viewed from behind in a traveling direction, and FIGS. 1E and 1F are perspective views viewed in a negative direction of z (but in different directions) illustrated in FIG. 1A. An unmanned aerial vehicle 1 is designed in dimensions of an overall width (a width in a y-direction in FIG. 1A) of approximately 250 mm and an overall length (a width in an x-direction in FIG. 1A) of approximately 550 mm to be able to fly in a closed-type space having a bore diameter of approximately 400 mm in an example, and includes a main body section 2 (housed in a waterproof case 3), five motors 17 to 21 (see FIG. 9) that are driven in response to a control signal from the main body section 2, four rotors (rotary wings) 13 to 16 that respectively rotate by drives of the motors 17 to 20 to float the unmanned aerial vehicle 1 (The adjacent rotors respectively rotate in opposite directions, for example, the rotors 13 and 16 rotate in a clockwise direction viewed in the positive direction of z, and the rotors 14 and 15 rotate in a counterclockwise direction viewed in the positive direction of z), a thrust generation propeller 25 that rotates by a drive of the motor 21 to generate a thrust of the unmanned aerial vehicle 1, an inspection camera 22, a front camera 23, and a ultrasonic sensor 24, and each of the components are integrated using a frame 4.

The unmanned aerial vehicle 1 further includes a holding member 9 that separates preceding collision members (a rotary member such as a wheel or a roller) 5 and 6 to hold the preceding collision members 5 and 6 above an vehicle body of the unmanned aerial vehicle 1 (the positive direction of the z-axis) and can be inclined with respect to the vehicle body by rotating toward the lateral side of the vehicle body around a predetermined position in the vehicle body or on the vehicle body (in the positive direction of y or in a negative direction of y, which need not be completely parallel to the y-direction but may intersect the x-direction) and a holding member 10 that similarly holds preceding collision members (a rotary member such as a wheel or a roller) 7 and 8 and can be similarly inclined with respect to the vehicle body with the holding member 9 and the holding member 10 separated from each other in a front-rear direction (A positive direction of x in FIG. 1A is a forward direction, and the positive direction of y and the negative direction of y in FIG. 1A are respectively a leftward direction and a rightward direction). The holding member 9 is attached to the waterproof case 3 by a holding ember attachment member 11 (FIG. 1E), as illustrated in FIG. 1E, and the holding member 10 is also similarly attached to the waterproof case 3 by a holding member attachment member 12 (FIG. 1F). Note that the number of holding members to be attached to the vehicle body is arbitrary. For example, one of the holding members 9 and 10 may be detached, only one holding member may be used by being attached to the vicinity of a center of gravity 26 of the vehicle body, or three or more holding members may be used by being attached. Note that in the present embodiment, the components of the unmanned aerial vehicle 1 illustrated in FIG. 1A, excluding the holding members 9 and 10 and the preceding collision members 5 to 8 held thereby or excluding shaft sections for preceding collision member 5A to 8A and preceding collision member attachment members 9B-1, 9B-2, 10B-1, and 10B-2 when the preceding collision members 5 to 8, are each a rotary member such as a wheel or a roller are referred to as an "vehicle body".

Figure 2:
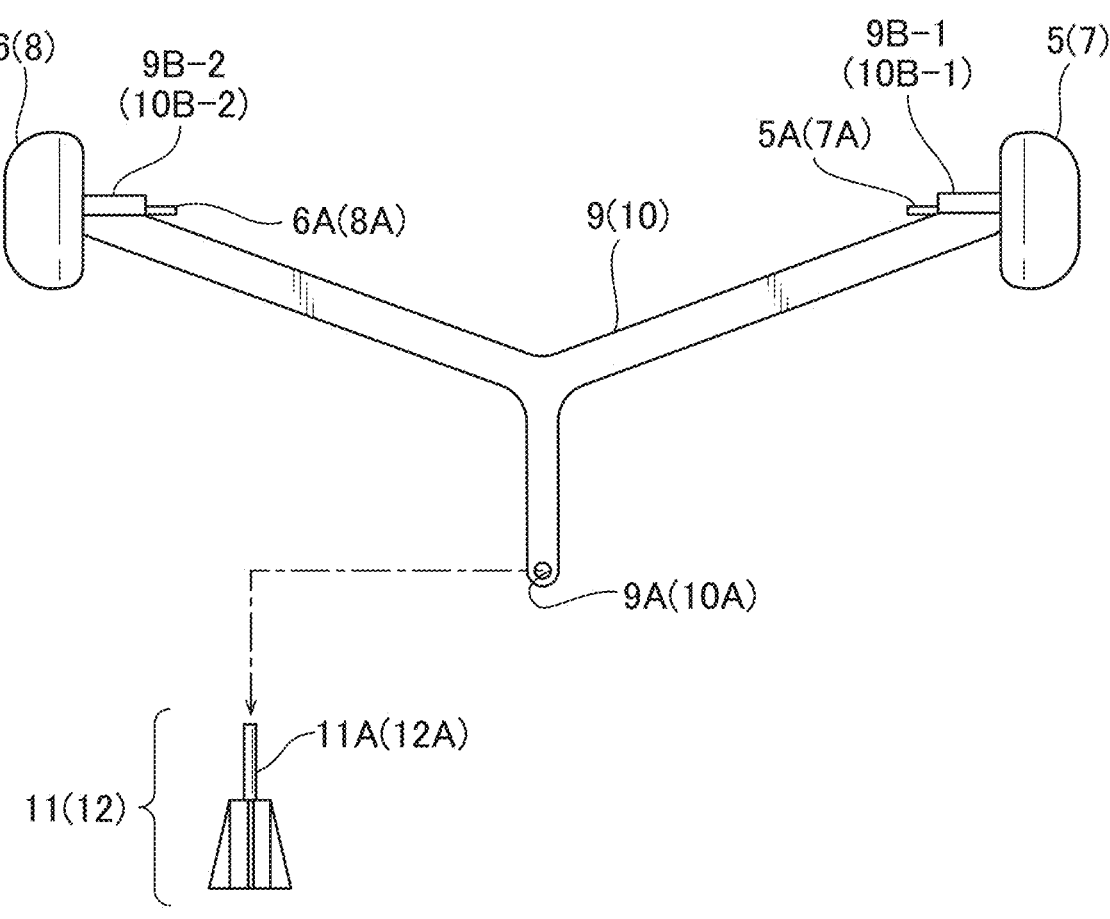
FIG. 2 is a diagram illustrating a holding member that holds preceding collision members (a rotary member such as a wheel or a roller) and a holding member attachment member to which the holding member is attached.

FIG. 2 illustrates the holding member 9 that holds the preceding collision members 5 and 6 and the holding member attachment member 11 to which the holding member 9 is attached. The same may apply to a configuration of the holding member 10 that holds the preceding collision members 7 and 8 and the holding member attachment member 12 to which the holding member 10 is attached. As illustrated in FIGS. 1E and 1F, the holding member attachment members 11 and 12 are fixed to the waterproof case 3. The holding member 9 is provided with a hole 9A. When a shaft section for holding member 11A in the holding member attachment member 11 is inserted into the hole 9A (See FIG. 1E. Although the shaft section for holding member 11A extends along the paper in FIG. 2, the shaft section for holding member 11A is inserted into the hole 9A with the shaft section 11A extending in a direction perpendicular to the paper), the holding member 9 is attached to the vehicle body. The holding member 9 can be inclined with respect to the vehicle body by rotating toward the lateral side of the vehicle body around a position of the hole 9A with the shaft section for holding member 11A used as a rotation axis (fixing axis). To prevent the holding member 9 from separating from the holding member attachment member 11, a member for separation prevention (a cap, etc.) may be further fitted in the shaft section for holding member 11A after the holding member 9 is attached. Note that "rotation" herein is not limited to rotation in one direction but may be rotation in both directions (in positive and negative directions in the y-direction in FIG. 1A in an example) or may not be complete rotation by 360 degrees (The same applies to subsequent "rotation"). As illustrated in FIG. 1E, although the holding member 9 is exposed to the top of the vehicle body (in the positive direction of z) from a hole provided in the frame 4 as illustrated in FIG. 1A while being attached to the waterproof case 3 by the holding member attachment member 11, rotational motion of the holding member 9 is prevented at a boundary position (rotation stop positions 4A and 4B) on the lateral side of the hole. Thus, the rotational motion is limited to rotation up to a predetermined maximum angle. The holding member 10 is also similarly exposed to the top of the vehicle body (in the positive direction of z) from a hole provided in the frame 4 while being attached to the waterproof case 3 by the holding member attachment member 12, and rotational motion of the holding member 10 is prevented at a boundary position (rotation stop positions 4C and 4D (see FIG. 1D)) on the lateral side of the hole. Thus, the rotational motion of the holding member 10 is also limited to rotation up to a predetermined maximum angle (The respective maximum rotational angles of the holding members 9 and 10 may differ from each other).

Figure 3A:
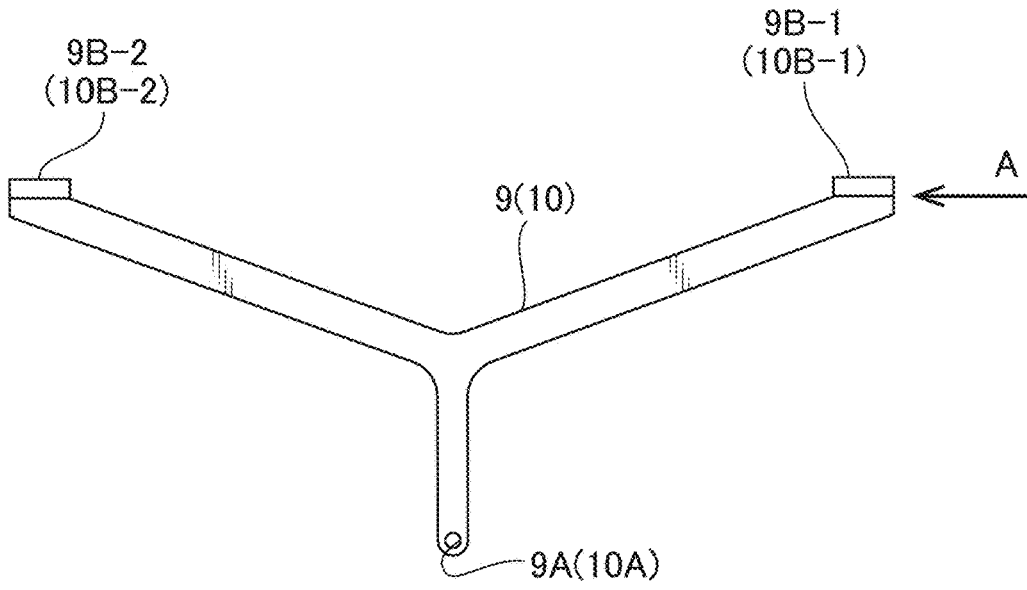
FIG. 3A is a diagram illustrating the holding member with the preceding collision members removed.
Figure 3B:
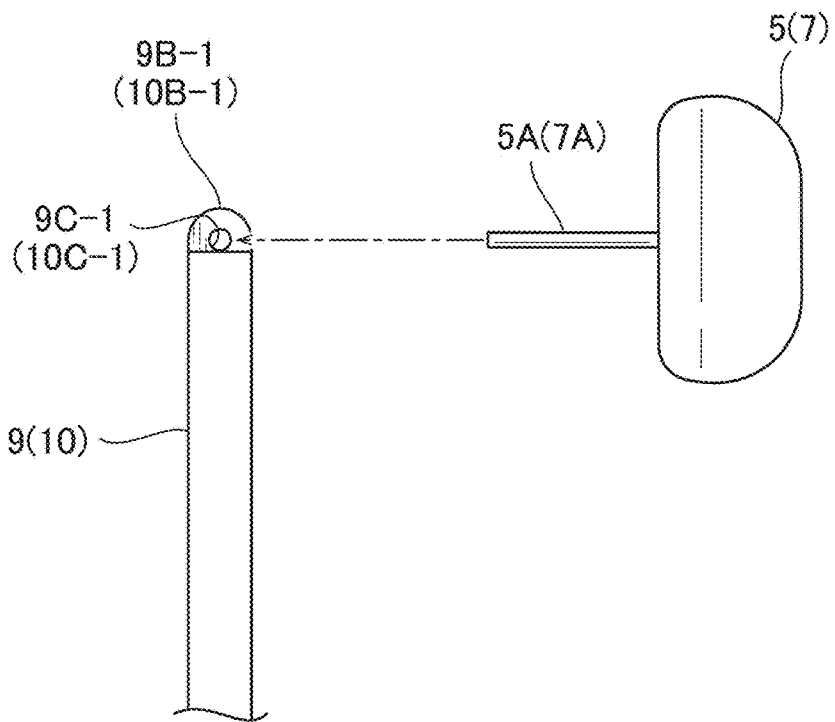
FIG. 3B is a diagram illustrating the holding member, the preceding collision member (a rotary member such as a wheel or a roller) to be attached to the holding member, and a shaft section for preceding collision member as viewed in an arrow direction indicated by A in FIG. 3A.

The holding member 9 with the preceding collision members 5 and 6 removed is illustrated in FIG. 3A. The same may apply to the holding member 10 with the preceding collision members 7 and 8 removed. The holding member 9 is provided with preceding collision member attachment members 9B-1 and 9B-2. The holding member 9, the preceding collision member 5 to be attached to the holding member 9, and the shaft section for preceding collision member 5A as viewed in an arrow direction indicated by A in FIG. 3A are illustrated in FIG. 3B. Here, the preceding collision member 5 as a rotary member such as a wheel or a roller is fixed to the shaft section for preceding collision member 5A, and the shaft section for preceding collision member 5A is inserted into a hole 9C-1 provided in the preceding collision member attachment member 9B-1 in the holding member 9 (It may be passed through the hole 9C-1, as illustrated in FIG. 2. The same applies to insertion of the shaft section for holding member 11A into the above-described hole 9A) (although the shaft section for preceding collision member 5A extends along the paper in FIG. 3B, the shaft section for preceding collision member 5A is inserted into the hole 9C-1 with the shaft section 5A extending in the direction perpendicular to the paper) so that the shaft section 5A is held in the holding member 9. Note that "holding" herein does not require that the preceding collision member 5 is completely fixed to the holding member 9 but may prevent the preceding collision member 5 from completely separating from the holding member 9 and freely moving (The same applies to the other holding member and the other preceding collision members). In a configuration illustrated in FIG. 3B, the preceding collision member (rotary member) 5 and the shaft section for preceding collision member 5A can rotate in an integrated manner with the shaft section for preceding collision member 5A held in the holding member 9 using the shaft section for preceding collision member 5A as a rotation axis. To prevent the preceding collision member 5 from separating from the holding member 9, a member for separation prevention (a cap, etc.) may be further fitted in the shaft section for preceding collision member 5A after the preceding collision member 5 is attached to the holding member 9 as described above. The same may apply to a mode in which the holding member 9 holds the preceding collision member 6 and a mode in which the holding member 10 holds the preceding collision members 7 and 8.

Figure 4:
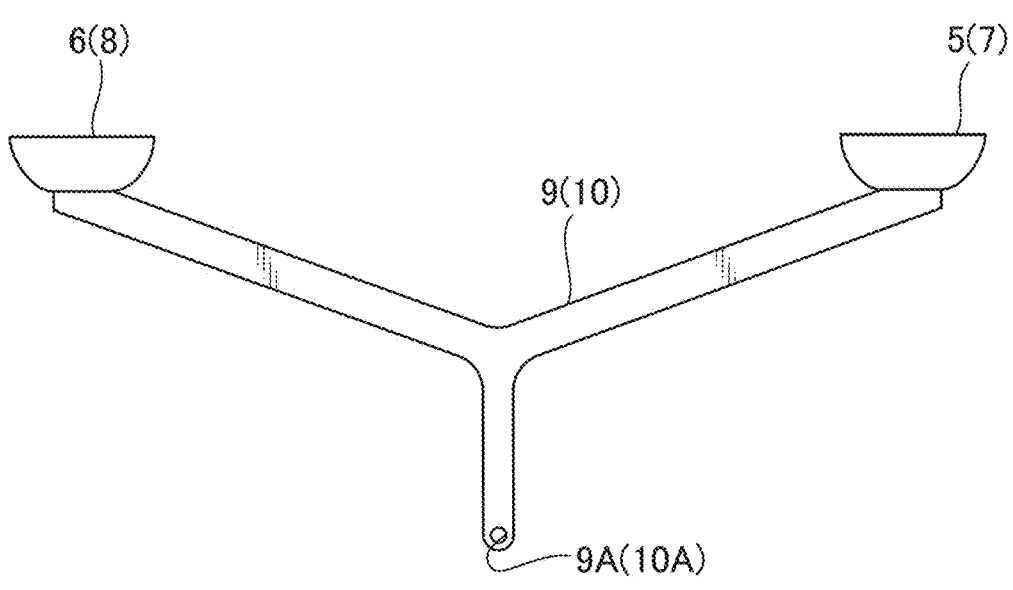
FIG. 4 is a diagram illustrating the holding member to which the preceding collision members other than a rotary member such as a wheel or a roller is attached.

Note that a member other than a rotary member such as a wheel or a roller may be used as the preceding collision members 5 to 8. An example in which a preceding collision member fixed to a holding member is used is illustrated in FIG. 4 as an example. In FIG. 4, the preceding collision members 5 and 6 are each configured as a member fixed to the holding member 9, and are each formed of a low friction plastic material or the like. Even if the preceding collision member and the holding member each having such a configuration are used, flight control of an unmanned aerial vehicle as described below can be performed. Note that the preceding collision member advances while sliding on a boundary surface (like, e.g., a sled), unlike when a rotary member such as a wheel or a roller is used. Thus, the preceding collision member is preferably formed of a material having a low friction between itself and the boundary surface. The same may apply in a mode in which the holding member 10 holds the preceding collision members 7 and 8. When the preceding collision members 5 to 8 wear out by advancing while sliding in contact with the boundary surface, the preceding collision members 5 to 8 are preferably replaced with new ones.

The inspection camera 22 is a camera for shooting a still image or a moving image during flight in a closed-type space by the unmanned aerial vehicle 1. In an example of the inspection camera 22, a commercially available camera such as a GoPro session (Tajima MOTOR CORPORATION) can be used. The front camera 23 is a camera for shooting a still image or a moving image in a traveling direction during flight in the closed-type space by the unmanned aerial vehicle 1. Data of the shot still image or moving image is transmitted to an external apparatus (e.g., a computer including a display), as needed, and an operator can steer the unmanned aerial vehicle 1 while confirming the data. The ultrasonic sensor 24 is a sensor for detecting an obstacle or the like ahead thereof, and can transmit a ultrasonic wave in the traveling direction during flight in the closed-type space by the unmanned aerial vehicle 1 and measure a distance from the obstacle or the like by receiving a reflected wave. The inspection camera 22 and the front camera 23 may be each a camera such as an infrared camera or a ultraviolet camera.

The above-described rotation center position in each of the holding members 9 and 10 is preferably below (in the negative direction of z in FIG. 1A) a position of the set of rotors corresponding to the holding member with the vehicle body not inclined. A reason for that will be described below with reference to FIGS. 5A to 5F. Note that although description is made hereinafter using a model in which the rotation center position of the holding member 9 (10) and the rotation center position of the rotors 13 (15) and 14 (16) are coplanar (a yz plane in FIG. 1A) (respective x coordinates illustrated in FIG. 1A are equal to each other) for the purpose of simplifying the description (The same applies in a comparative example illustrated in FIGS. 6A to 6E), an operation can be basically described in a similar principle otherwise.

Figure 5A:
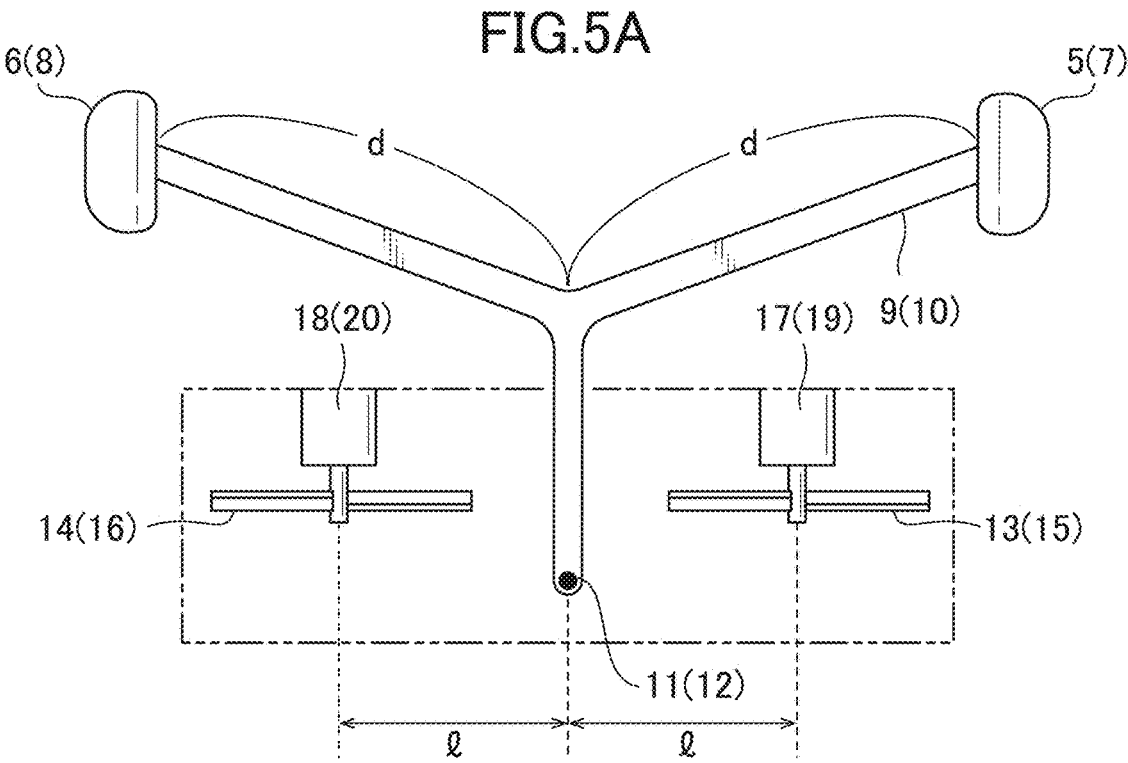
FIG. 5A is a diagram illustrating a positional relationship when a holding member is attached to an vehicle body to rotate around a position lower than a corresponding set of rotors.

A positional relationship when the holding member is attached to be rotatable around a position lower than the corresponding set of rotors (in the negative direction of z in FIG. 1A) with the vehicle body not inclined is illustrated in FIG. 5A (viewed in the positive direction of x in FIG. 1A). Although description is made below using the holding member 9 and the corresponding set of rotors 13 and 14, an operation can also be described in a similar principle in the holding member 10 and the corresponding set of rotors 15 and 16. Although it is assumed that respective distances between a center line of the holding member, which remains not inclined with respect to the vehicle body, and center lines of the two rotors in the corresponding set are equal to each other (1 in FIG. 5A), and respective distances from a branch portion of the holding member 9 (10) to the preceding collision members 5 (7) and 6 (8) on both sides are also equal to each other (d in FIG. 5A), the operation can be basically described in a similar principle even when the respective distances are not equal to each other.

Figure 5B:
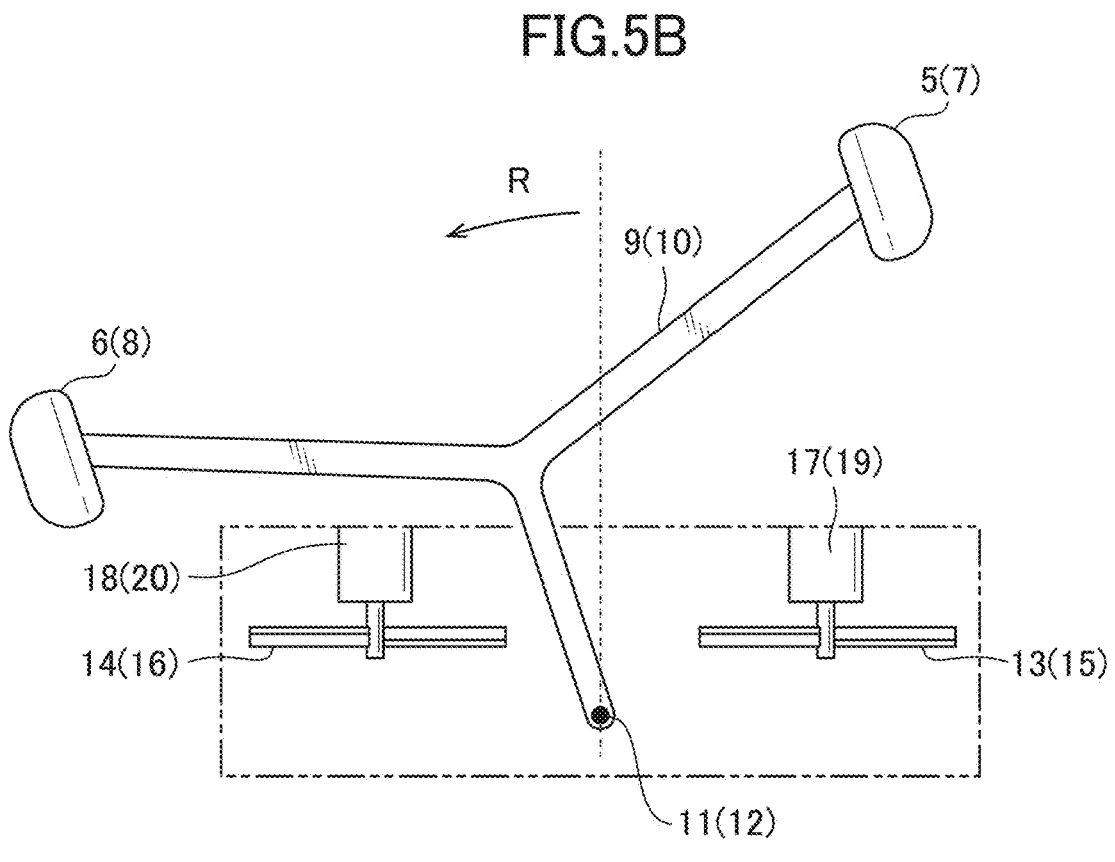
FIG. 5B is a diagram illustrating a positional relationship when the holding member illustrated in FIG. 5A is inclined with respect to the vehicle body.

As illustrated in FIG. 5B, the holding member 9 is inclined toward the lateral side of the vehicle body due to any reason. When the rotors 13 and 14 continue to rotate in this state, forces f are respectively exerted (respectively act) on the rotors 13 and 14, as indicated by arrows in FIG. 5C. Note that although an entire configuration illustrated in FIG. 5B is drawn in an inclined manner for convenience of illustration in FIG. 5C, a relative inclination between the holding member 9 and the vehicle body does not change from the configuration illustrated in FIG. 5B. Although it is assumed that the forces respectively exerted on the rotors 13 and 14 are equal to each other for simplicity, the operation can also be basically described in a similar principle even when the forces respectively exerted on the rotors 13 and 14 differ from each other due to a difference in number of rotations, for example.

Figure 5C:
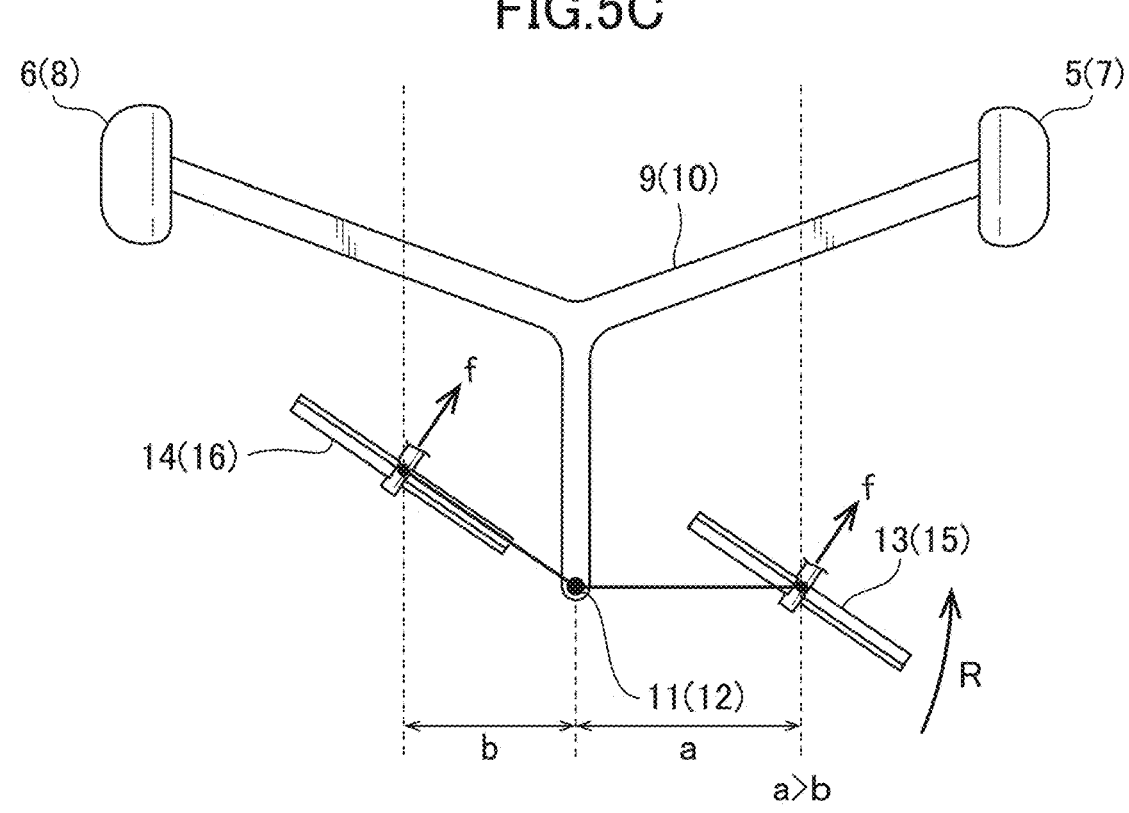
FIG. 5C is a diagram illustrating a force to be exerted on each of the rotors when the inclination illustrated in FIG. 5B has occurred during flight and a rotational direction of the vehicle body caused by the force.
Figure 5D:
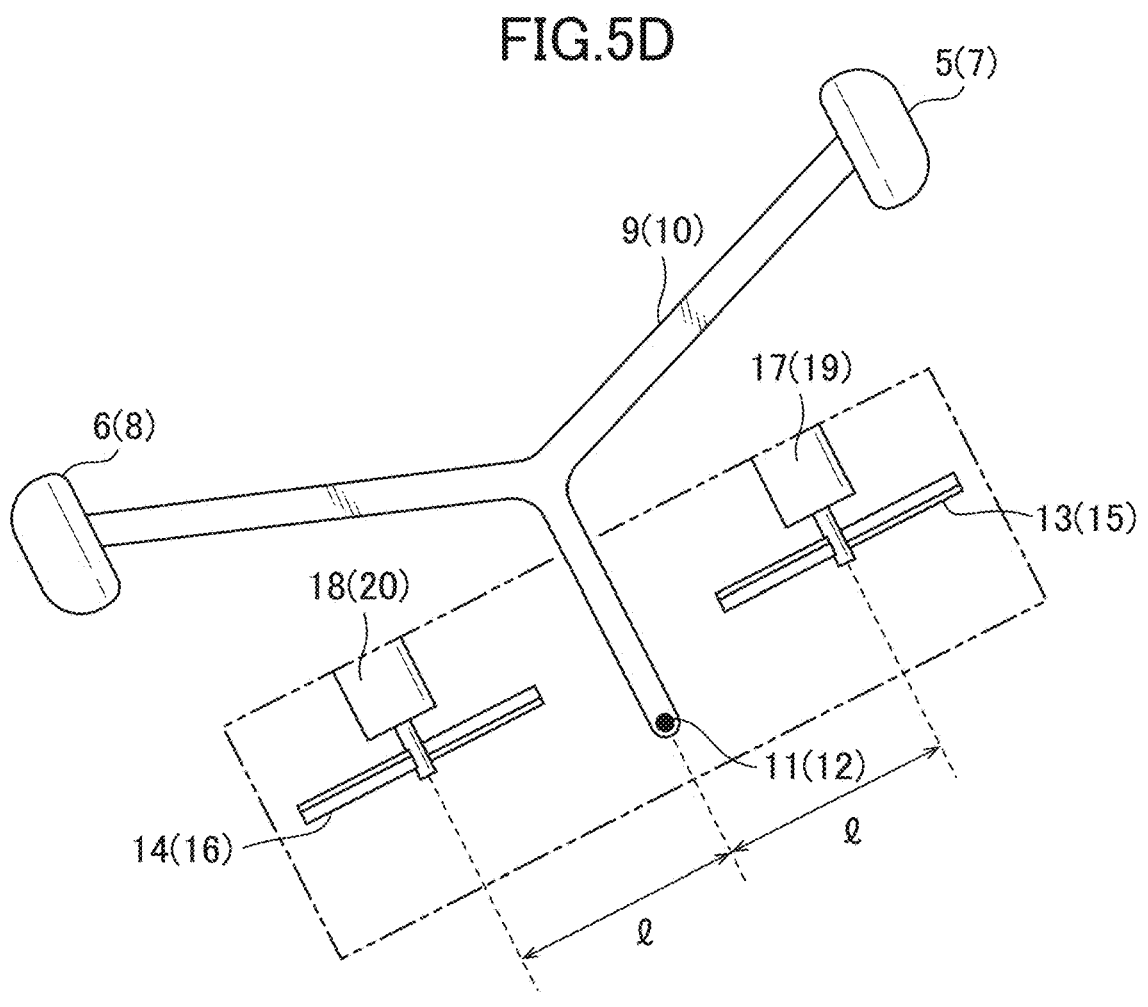
FIG. 5D is a diagram illustrating a positional relationship when the vehicle body is inclined by a function of the force to the rotor illustrated in FIG. 5C.
Figure 5E:
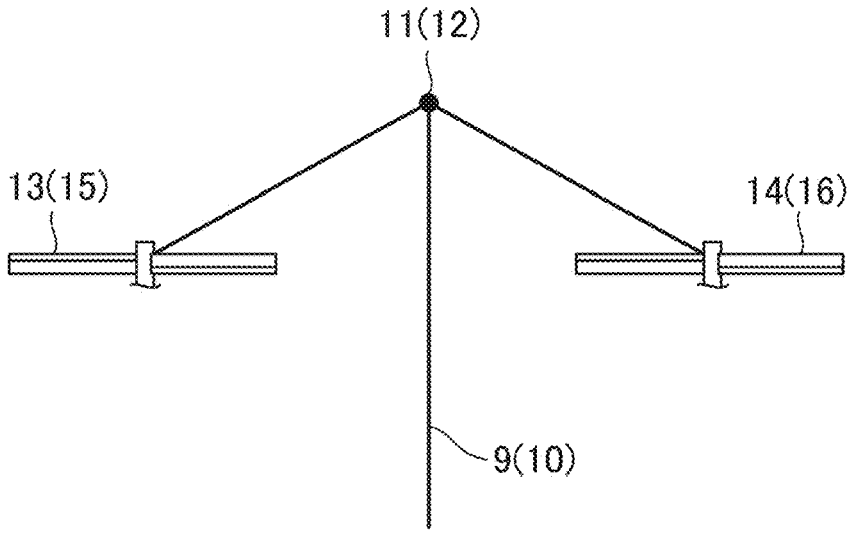
FIG. 5E is a conceptual diagram illustrating a principle of the inclination of the vehicle body described with reference to FIGS. 5A to 5D.

At this time, a "distance" between the rotor 14 and the center line of the holding member 9 (a distance in a direction perpendicular to the center line of the holding member 9 between a rotation center of the rotor 14 and the center line) is b, while a "distance" between the rotor 13 and the center line of the holding member 9 (a distance in the direction perpendicular to the center line of the holding member 9 between a rotation center of the rotor 13 and the center line) is a, and a is larger than b (It is assumed that respective magnitudes of distances and the angles from a position on the holding member attachment member 11 as a rotation center of the holding member 9 to the rotation centers of the rotors 13 and 14 are equal to each other in FIG. 5A. Even in a configuration deviating from such a configuration, an operation can be basically described in a similar principle). Accordingly, a force (torque) to rotate the vehicle body in an arrow direction indicated by R in FIG. 5C is exerted as a whole on the vehicle body. The force is a force to be exerted in a direction in which the inclination of the holding member 9 with respect to the vehicle body is canceled. When the vehicle body is inclined in a similar direction to that of the inclination of the holding member 9, as illustrated in FIG. 5D, a relative inclination between the holding member 9 and the vehicle body can be at least partially canceled. A positional relationship between the holding member 9 and the rotors 13 and 14, including an attachment position of the holding member 9 (a position of the holding member attachment member 11), is illustrated in FIG. 5E if conceptually drawn, and a principle in which the above-described relative inclination can be at least partially canceled can be understood. In the holding member when the holding member 10 is also attached to be rotatable around a position lower than a position of the corresponding set of rotors 15 and 16 (in the negative direction of z in FIG. 1A), a relative inclination between the holding member 10 and the vehicle body can also be at least partially canceled in a similar principle.

Figure 6A:
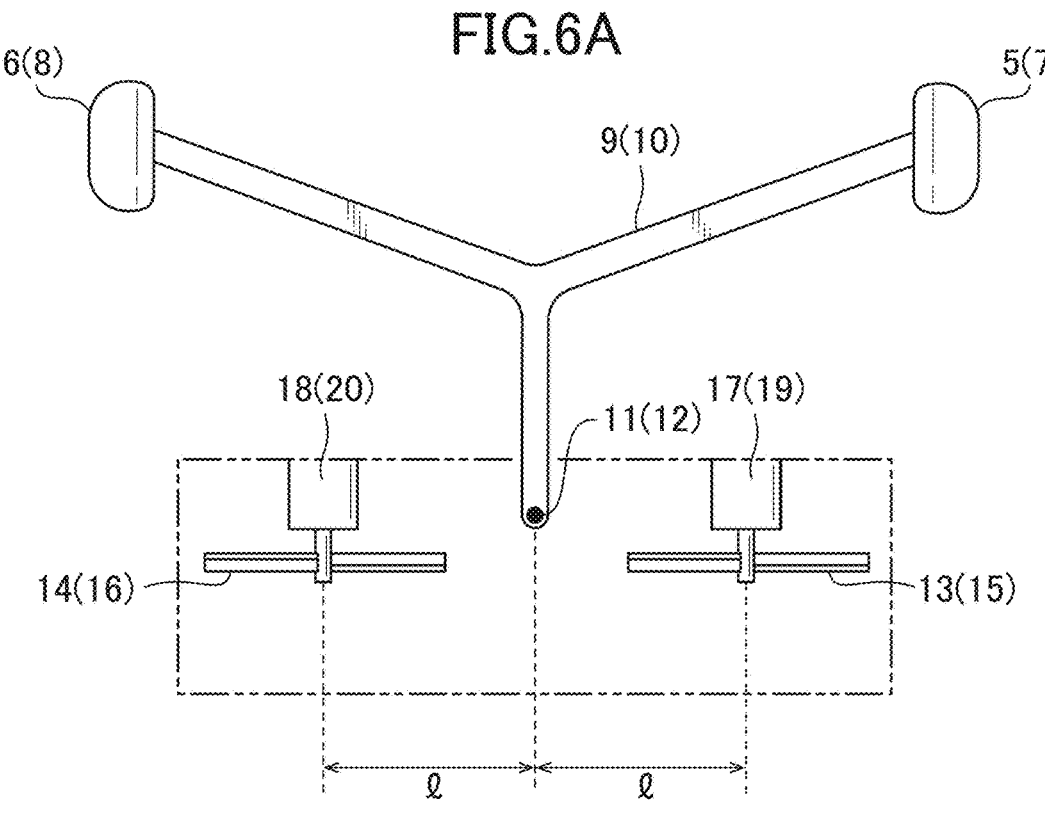
FIG. 6A is a diagram illustrating a positional relationship when a holding member is attached to an vehicle body to rotate around a position higher than a corresponding set of rotors.

Then, as a comparative example, a positional relationship when a holding member is attached to be rotatable around a position higher than a corresponding set of rotors with an vehicle body not inclined (in the positive direction of z in FIG. 1A) is illustrated in FIG. 6A (viewed in the positive direction of x FIG. 1A). Although description is made below using a holding member 9 and a corresponding set of rotors 13 and 14, an operation can also be described in a similar principle in a holding member 10 and a corresponding set of rotors 15 and 16. Although it is assumed that respective distances between a center line of the holding member and center lines of the two rotors in the corresponding set with the vehicle body not inclined are equal to each other (1 in FIG. 6A), the operation can be basically described in a similar principle even when the distances are not equal to each other.

Figure 6B:
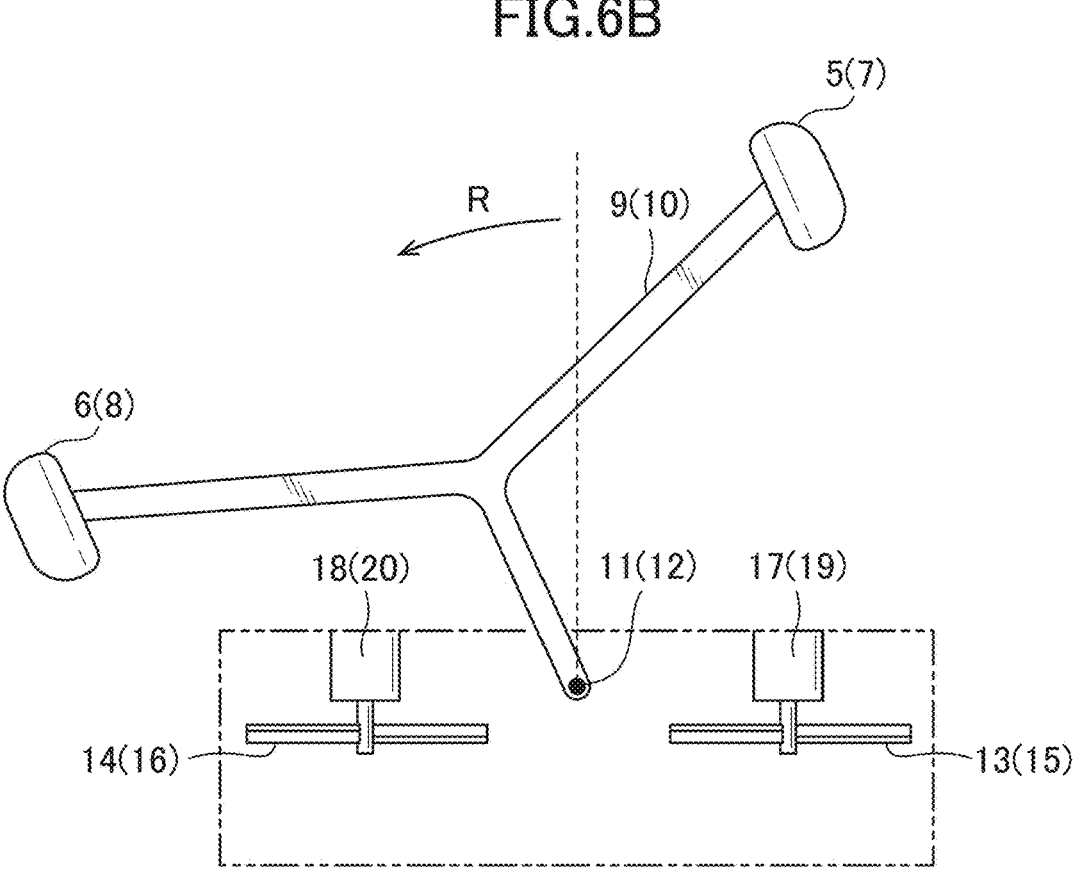
FIG. 6B is a diagram illustrating a positional relationship when the holding member illustrated in FIG. 6A is inclined with respect to the vehicle body.

As illustrated in FIG. 6B, it is assumed that the holding member 9 is inclined toward the lateral side of the vehicle body due to any reason. When the rotors 13 and 14 continue to rotate in this state, forces f are respectively exerted (respectively act) on the rotors 13 and 14, as indicated by an arrow in FIG. 6C. Note that although an entire configuration illustrated in FIG. 6B is drawn in an inclined manner for convenience of illustration in FIG. 6C, a relative inclination between the holding member 9 and the vehicle body does not change from the configuration illustrated in FIG. 6B. Although it is assumed that the forces respectively exerted on the rotors 13 and 14 are equal to each other for simplicity an operation can be basically described in a similar principle even when the forces respectively exerted on the rotors 13 and 14 differ from each other due to a difference in number of rotations, for example.

Figures 6C, 6D:
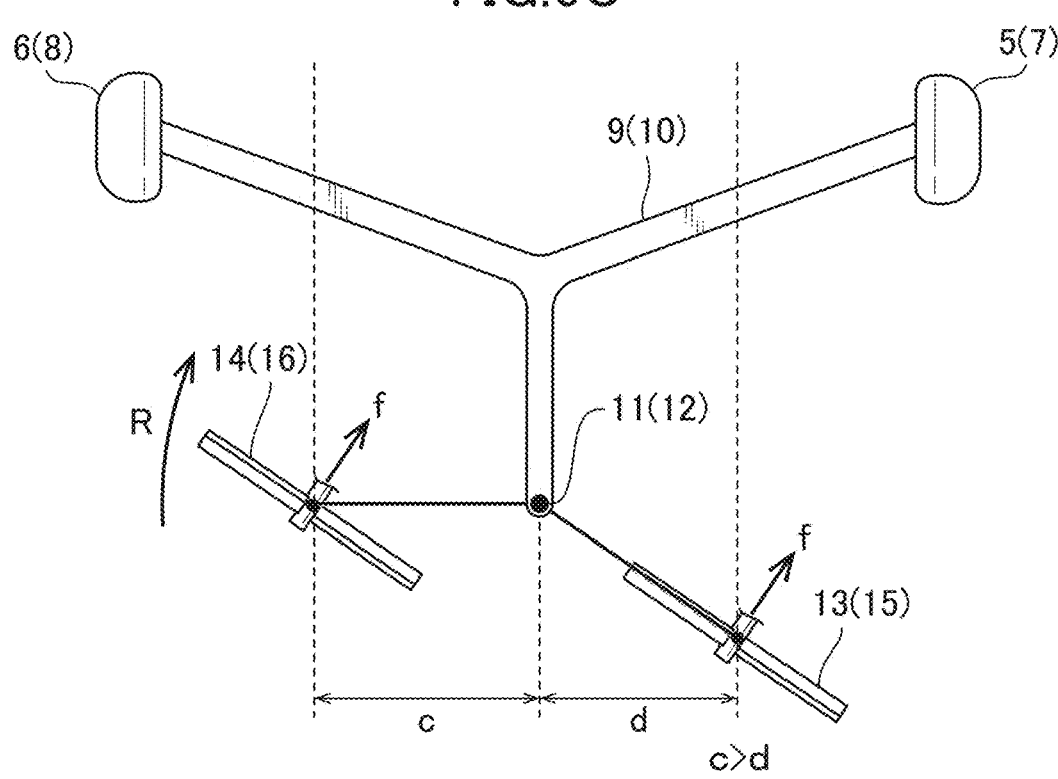
FIG. 6C is a diagram illustrating a force to be exerted on each of the rotors when the inclination illustrated in FIG. 6B has occurred during flight and a rotational direction of the vehicle body caused by the force.
FIG. 6D is a diagram illustrating a positional relationship when the vehicle body is inclined by the function of the force to the rotor illustrated in FIG. 6C.
Figure 6E:
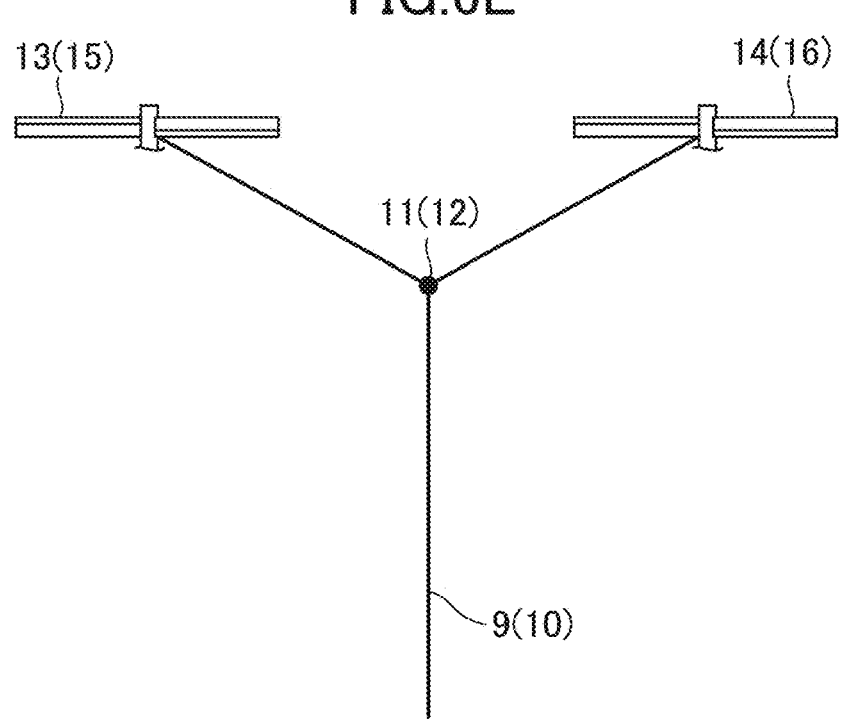
FIG. 6E is a conceptual diagram illustrating a principle of the inclination of the vehicle body described with reference to FIGS. 6A to 6D.

At this time, although a "distance" between the rotor 14 and a center line of the holding member 9 (a distance in a direction perpendicular to the center line of the holding member 9 between a rotation center of the rotor 14 and the center line) is c, while a "distance" between the rotor 13 and the center line of the holding member 9 (a distance in the direction perpendicular to the center line of the holding member 9 between a rotation center of the rotor 13 and the center line) is d, and c is larger than d (It is assumed that respective magnitudes of distances and angles from a position on a holding member attachment member 11 as a rotation center of the holding member 9 to the rotation centers of the rotors 13 and 14 are equal to each other in FIG. 6A. In a configuration deviating from such a configuration, the operation can also be basically described in a similar principle). Accordingly, a force (torque) to rotate the vehicle body in an arrow direction indicated by R in FIG. 6C is exerted as a whole on the vehicle body. The force is a force to be exerted in a direction in which inclination of the holding member 9 with respect to the vehicle body is increased. When the vehicle body is inclined in a direction opposite to the direction of the inclination of the holding member 9, as illustrated in FIG. 6D, a relative inclination between the holding member 9 and the vehicle body increases. A positional relationship between the holding member 9 and the rotors 13 and 14, including an attachment position of the holding member 9 (a position of the holding member attachment member 11), is illustrated in FIG. 6E if conceptually drawn, and a principle in which the above-described relative inclination increases can be understood. In the holding member 10, when the holding member 10 is also attached to be rotatable around a position higher than a position of the corresponding set of rotors 15 and 16 (in the positive direction of z in FIG. 1A), a relative inclination between the holding member 10 and the vehicle body increases in a similar principle. Although a configuration corresponding to FIG. 5A is preferably adopted to cancel the relative inclination, it should be noted that the present invention can be implemented even if a configuration corresponding to FIG. 6A is adopted.

Figure 7A:
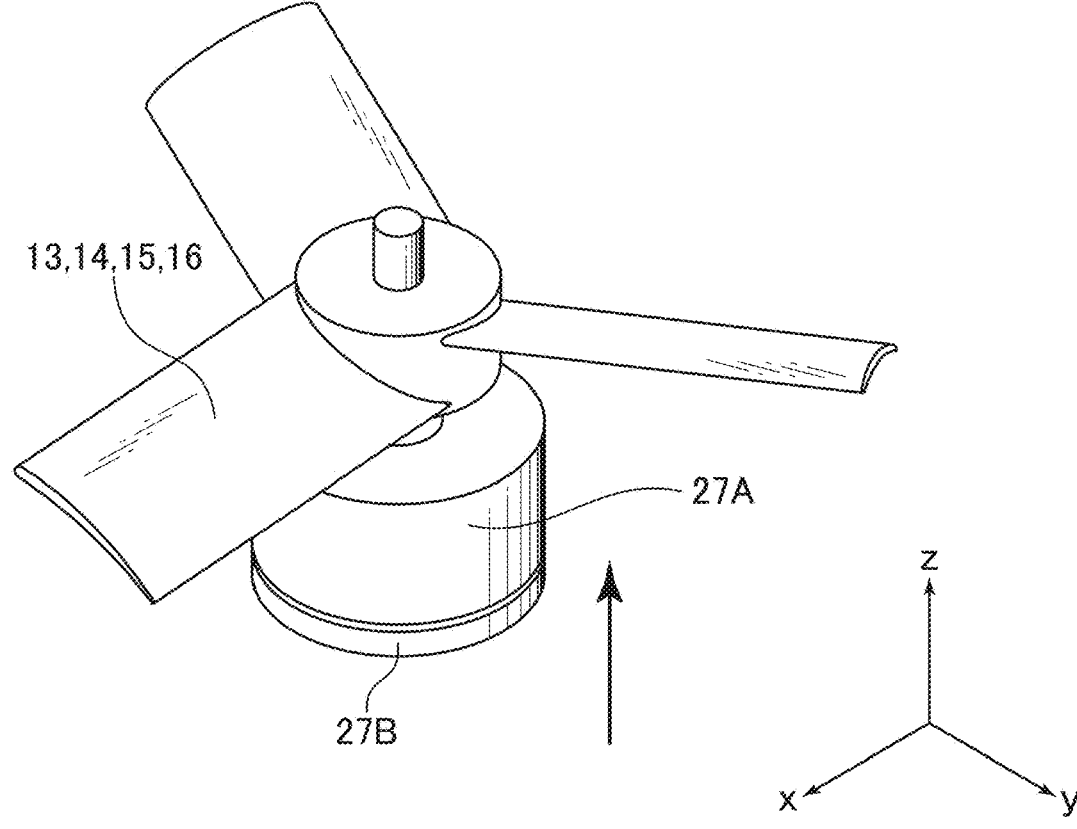
FIG. 7A is a perspective view illustrating a positional relationship between rotors and motor members in a comparative example.
Figure 7B:
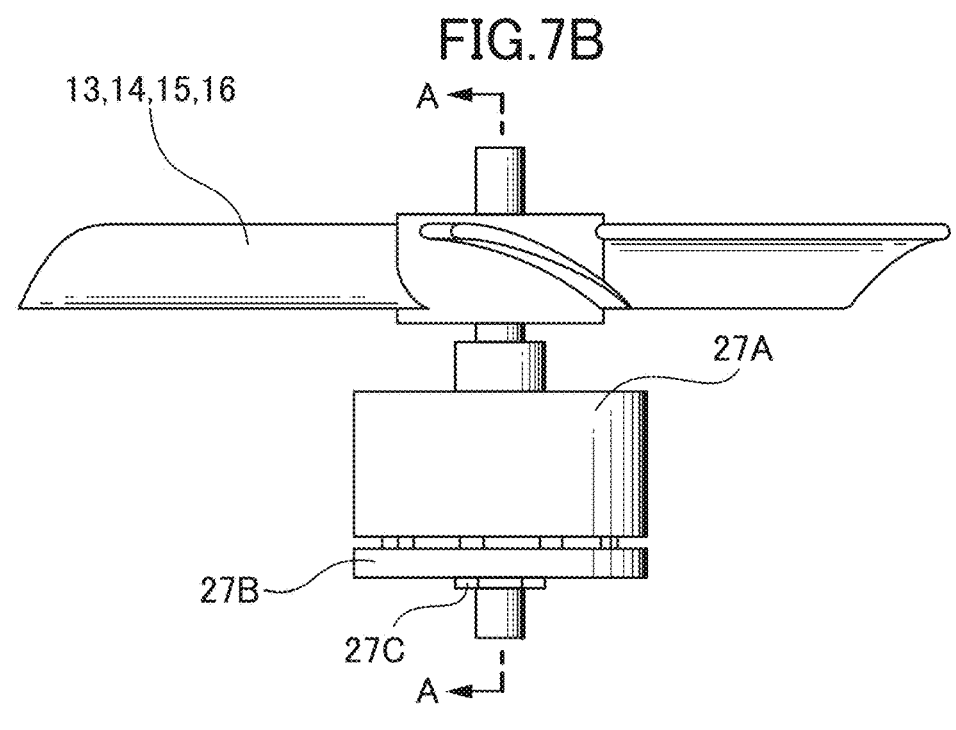
FIG. 7B is a diagram of the rotors and the motor members illustrated in FIG. 7A in a positive direction of x.
Figure 7C:
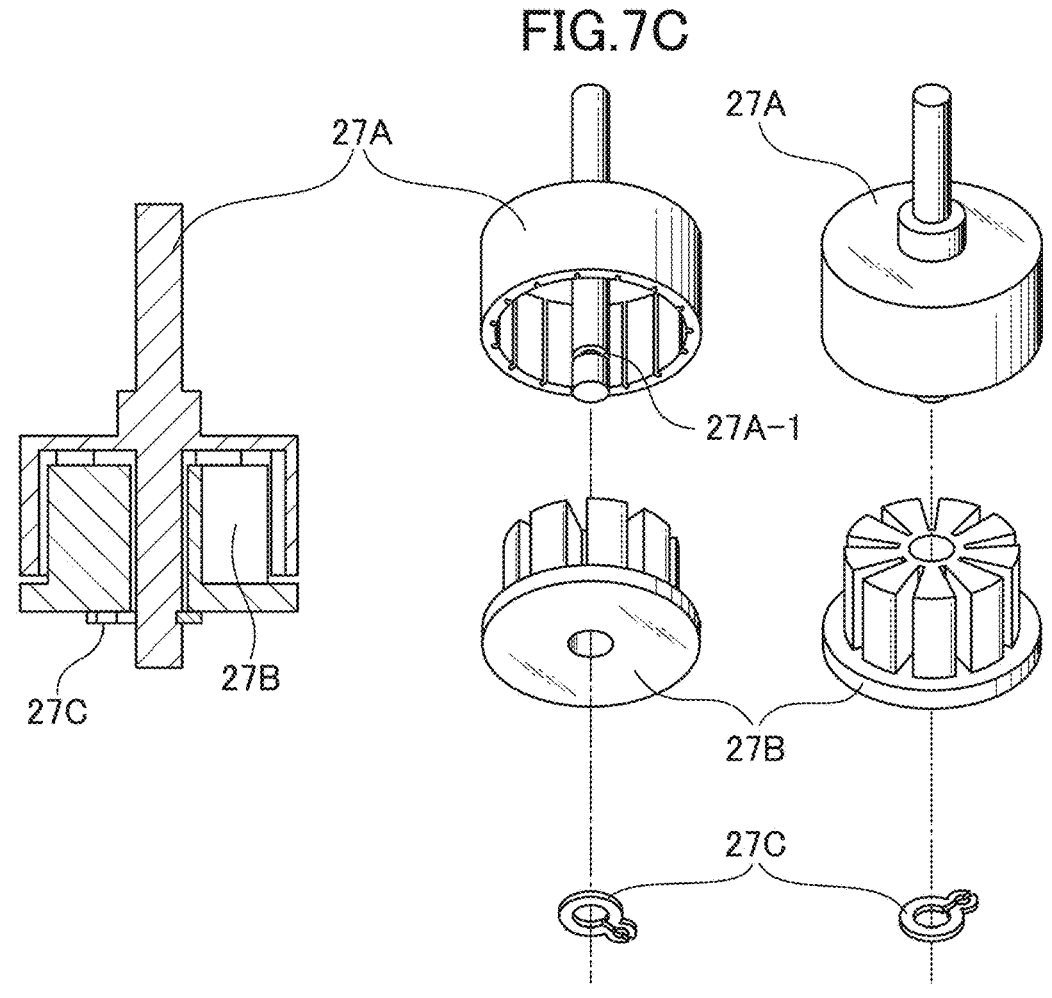
FIG. 7C is a diagram illustrating a cross section cut along a plane A-A in FIG. 7B of the motor members illustrated in FIG. 7A and each of the motor members.

As illustrated in FIG. 1C, the motors 17 and 19 are configured to be respectively positioned above rotors 13 and 15 (at a position where a gravity potential is high) to drive the rotors 13 and 15. The motors 18 and 20 (see FIG. 9) are also similarly configured to be respectively positioned on the rotors 14 and 16 to drive the rotors. An advantage of adopting such a configuration will be described while comparing the configuration with that in the comparative example in which motors are positioned below the rotors, as illustrated in FIGS. 7A to 7C. Note that the unmanned aerial vehicle, the flight control mechanism for the unmanned aerial vehicle, and the method of using these can also be implemented even if a positional relationship between the rotors and the motors as in the comparative example is adopted.

FIG. 7A is a perspective view illustrating a positional relationship between rotors and motor members in the comparative example, FIG. 7B is a diagram of the rotors and the motor members illustrated in FIG. 7A as viewed in a positive direction of x in FIG. 7A, and FIG. 7C is a diagram illustrating a cross section cut along a plane A-A in FIG. 7B and each of the motor members. The rotors 13, 14, 15, and 16 are fixed to a rod-shaped protrusion (see FIG. 7C) of a motor member 27A (see FIG. 7B), and rotate with the rod-shaped protrusion as a rotation axis. The rotors 13, 14, 15, and 16 receive a force in an arrow direction (in a positive direction of z) in FIG. 7A by rotating, to pull the motor member 27A in the same direction. As illustrated in FIG. 7C, the motor member 27A and a motor member 27B are fitted to each other, and do not necessarily adhere to each other. Therefore, if the motor member 27A is pulled in the positive direction of z, the motor member 27A may separate from the motor member 27B. To prevent the separation, a motor member 27C is used as a fastener in the configuration in the comparative example (see FIGS. 7B and 7C. As illustrated in FIG. 7C, when the motor member 27C is fitted in a groove 27A-1 provided in the motor member 27A (After the motor member 27A and the motor member 27B are fitted to each other), the motor member 27A can be prevented from separating from the motor member 27B. However, the motor member 27C needs to be detached when the motors are maintained.

Figure 8:
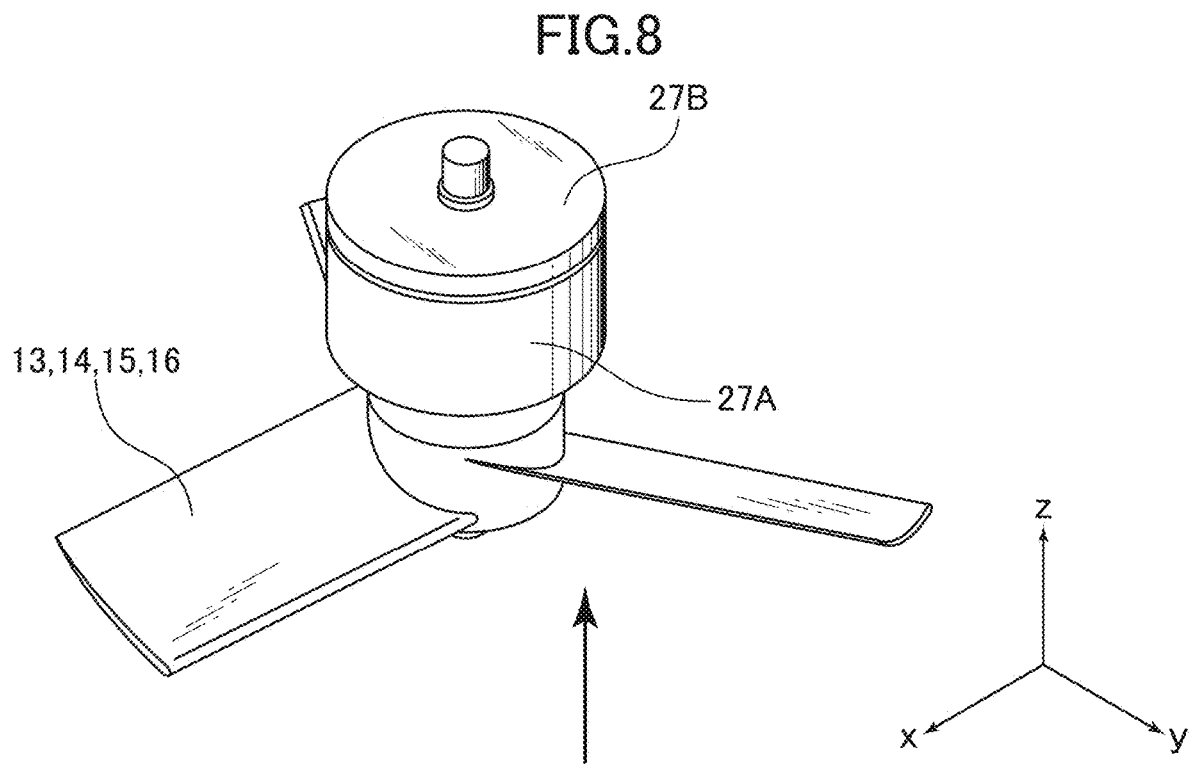
FIG. 8 is a perspective view illustrating a position relationship between rotors and motor members in the present embodiment.

A positional relationship between rotors and motor members in the present embodiment is illustrated in a perspective view of FIG. 8. The present embodiment is similar to the comparative example except that the rotors 13, 14, 15, and 16 are positioned below the motor members 27A and 27B and that the motor member 27C is not used. The rotors 13, 14, 15, and 16 are fixed to a rod-shaped protrusion (see FIG. 7C) of the motor member 27A (see FIG. 7B), and rotate with the rod-shaped protrusion as a rotation axis. The rotors 13, 14, 15, and 16 receive a force in an arrow direction (in a positive direction of z) in FIG. 8 by rotating, to press the motor member 27A in the same direction. As a result, since the motor member 27A is pressed against the motor member 27B, the motor member 27A need not be prevented from separating from the motor member 27B. Therefore, in a configuration illustrated in FIG. 8, the motor member 27C is not required so that the motors are easily maintained.

Figure 9:
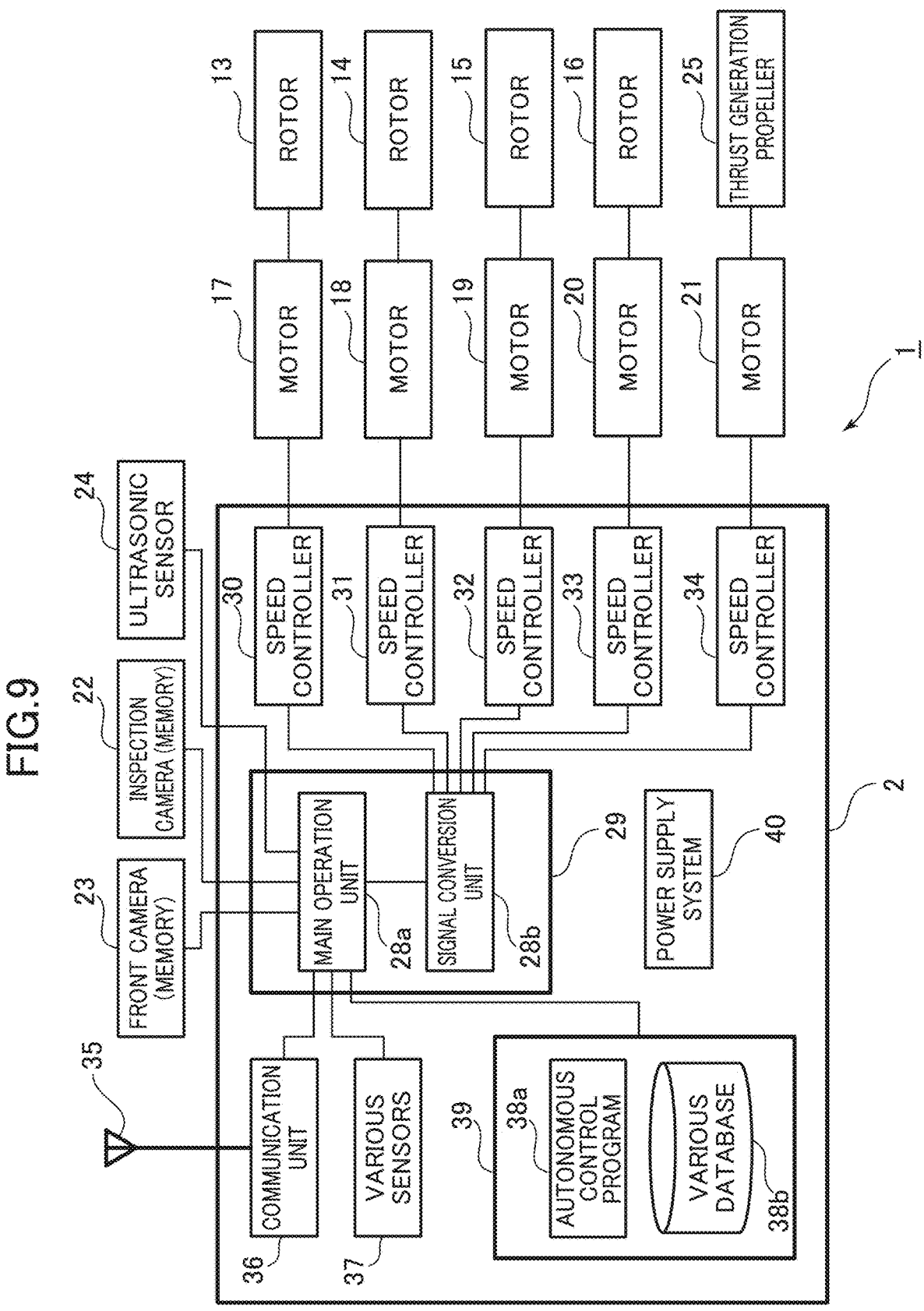
FIG. 9 is a block diagram illustrating a functional configuration of the unmanned aerial vehicle illustrated in FIG. 1A.

FIG. 9 is a block diagram illustrating a functional configuration of the unmanned aerial vehicle illustrated in FIG. 1A. The main body section 2 in the unmanned aerial vehicle 1 includes a main operation unit 28a including a processor, a temporary memory, and the like to perform various types of operations, a signal conversion unit 28b including a processor, a temporary memory, and the like, which performs processing for converting control command value data obtained by an operation by the main operation unit 28a into a pulse signal (PWM: a pulse width modulation signal) (An operation unit including the main operation unit 28a and the signal conversion unit 28b is referred to as a control signal generation unit 29), speed controllers (ESC: electric speed controllers) 30 to 34 that convert the pulse signal generated by the control signal generation unit 29 into driving currents, respectively, to the motors 17 to 21, a communication antenna 35 and a communication unit (including a processor, a temporary memory, and the like) 36 that transmit and receive various types of data signals to and from outside, a sensor unit 37 including various types of sensors such as a GPS (global positioning system) sensor, an attitude sensor, an altitude sensor, and a direction sensor, a recording apparatus 39 including a recording device such as a hard disk drive that records an autonomous flight program 38a, various types of databases 38b, and the like, and a power supply system 40 including a battery device such as a lithium polymer battery or a lithium ion battery and a power distribution system to each of elements.

In addition, the unmanned aerial vehicle 1 may include army functional unit, information, and the like depending on a functional use. As an example, if the unmanned aerial vehicle 1 autonomously flies according to a flight plan, flight plan information, which is data representing a flight plan as any rule to follow during flight, such as a flight plan path as a set of a start position and a destination of flight, and a check point position (a latitude, a longitude, and an altitude) through which the unmanned aerial vehicle 1 is to pass until it reaches the destination after starting at the start position, a speed limit, and an altitude limit is recorded in the recording apparatus 39, and the main operation unit 28a reads the flight plan information to execute the autonomous control program 38a so that the unmanned aerial vehicle 1 flies according to the flight plan. Specifically, the flight of the unmanned aerial vehicle 1 is controlled by determining a current position, a speed, and the like of the unmanned aerial vehicle 1 based on information obtained from the various types of sensors in the sensor unit 37, comparing the determined current position, speed, and the like with respective target values of the flight plan path, the speed limit, the altitude limit, and the like determined in the flight plan to operate respective control command values for the rotors 13 to 16 and the thrust generation propeller 25 in the main operation unit 28a, converting data respectively representing the control command values into pulse signals (generating control signals) and transmitting the pulse signals to the speed controllers 30 to 34 in the signal conversion unit 28b, respectively converting the pulse signals into driving currents and outputting the driving currents to the motors 17 to 21 in the speed controllers 30 to 34, and controlling drives of the motors 17 to 21 to control respective rotational speeds and the like of the rotors 13 to 16 and the thrust generation propeller 25. As an example, control is performed to increase the respective numbers of rotations of the rotors 13 and 16 for a control command to increase the altitude of the unmanned aerial vehicle 1 (decrease the numbers of rotations when the altitude is decreased), increase the numbers of rotations of the thrust generation propeller 25 for a control command to accelerate the unmanned aerial vehicle 1 in a forward direction (in the position direction of x in FIG. 1A) (decrease the numbers of rotations when the unmanned aerial vehicle 1 is decelerated), and decrease the respective numbers of rotations of the rotors 14 and 16 for a control command to incline the unmanned aerial vehicle 1 by rolling around the x-axis illustrated in FIG. 1A (in a counterclockwise direction as viewed in the positive direction of x) to maintain the respective numbers of rotations of the rotors 13 and 15, for example. Note that the acceleration (deceleration) in the forward direction of the unmanned aerial vehicle 1 can also be performed by controlling the respective numbers of rotations of the rotors 13 to 16, for example, decreasing the respective numbers of rotations of the rotors 13 and 14 to increase the respective numbers of rotations of the rotors 15 and 16 (opposite control when the unmanned aerial vehicle 1 is decelerated), and the unmanned aerial vehicle 1 can also be flown without using the thrust generation propeller 25. Note that simplified control can be performed. For example, the speed of the unmanned aerial vehicle 1 in the forward direction (in the positive direction of x in FIG. 1A) can be performed by making all the respective numbers of rotations of the rotors 13 to 16 equal to one another (performing control to only equally increase or decrease the respective numbers of rotations of all the four rotors 13 to 16) to float and land (or land on water) the unmanned aerial vehicle 1 and controlling the number of rotations of the thrust generation propeller 25. Flight recording information such as a flight path through which the unmanned aerial vehicle 1 has actually flown (e.g., a position of the aircraft of the unmanned aerial vehicle 1 at each time point) and various types of sensor data are recorded on various types of databases 38b, as needed, during flight.

As examples of the autonomous flight type unmanned aerial vehicle, Mini Surveyor ACSL-PF1 (Autonomous Control Systems Laboratory Ltd.), Snap (Vantage Robotics), AR. Drone 2.0 (Parrot), and Bebop Drone (Parrot), for example, are commercially available.

Note that when the unmanned aerial vehicle 1 flies under control from outside, the unmanned aerial vehicle receives data representing a control command value received from a controller device or the like of the operator using the communication antenna 35 and the communication unit 36, converts the data into a pulse signal using the signal conversion unit 28b (generates a control signal), and controls respective rotational speeds of the rotors 13 to 16 and the thrust generation propeller 25 using the speed controllers 30 to 34 and the motors 17 to 21, to perform flight control. Even in this case, when the main operation unit 28a reads data representing attitude information of the unmanned aerial vehicle 1 obtained from the attitude sensor (a gyro sensor or a magnetic sensor) among the various types of sensors in the sensor unit 37 to execute the autonomous control program 38a, partial autonomous control and control from outside can also be combined with each other. For example, a command value of attitude control is operated by comparing the data from the attitude sensor with a target value of an attitude, for example, to perform attitude control (In this case, the main operation unit 28a operates a final control command value by executing the autonomous control program 38a based on data representing a control command value received from an external controller device or the like and data representing the command value of the attitude control. When the signal conversion unit 28b converts data representing the control command value into a pulse signal, a control signal including an attitude control signal is generated). Although it is assumed that the unmanned aerial vehicle 1 basically flies in response to a control signal from the external controller device or the like in shooting flight described below, and only an attitude is autonomously controlled, similar shooting flight can also be performed by the unmanned aerial vehicle 1 that performs fully autonomous control flight and fully external control flight.

Shooting Flight in Closed-Type Space by
Unmanned Aerial Vehicle

As an example of shooting flight in a closed-type space by the unmanned aerial vehicle 1, shooting flight in a sewage pipeline will be described below with reference to FIGS. 10 to 14. Note that a use of the unmanned aerial vehicle, the flight control mechanism for the unmanned aerial vehicle, and the method using these according to the present invention as already described is not limited to such shooting flight, but an unmanned aerial vehicle, a flight control mechanism for the unmanned aerial vehicle, and a method using these according to the present invention can be used in any environment and for any purpose.

Figure 10:
FIG. 10 is a diagram illustrating a structure of a sewage pipeline facility capable of flying the unmanned aerial vehicle illustrated in FIG. 1A.

FIG. 10 illustrates a structure of a sewage pipeline facility capable of flying the unmanned aerial vehicle illustrated in FIG. 1A. A manhole 42a provided on a ground surface 41 leads to the sewage pipeline 43, and follows the sewage pipeline 43 in a rightward direction in FIG. 10 to reach another manhole 42b (Although the sewage pipeline 43 is drawn by being cut at two points in the middle in FIG. 10, this is a representation used for convenience and is actually formed as a consecutive sewage pipeline 43 longer than that illustrated). A boundary surface of the closed-type space is defined by an inner wall 44 in the sewage pipeline 43, and a connection section 45 exists for each predetermined distance in the rightward direction in FIG. 10 in the sewage pipeline 43.

In performing the shooting flight in the sewage pipeline 43 by the unmanned aerial vehicle 1, the unmanned aerial vehicle 1 is advanced into the manhole 42a and dropped to a depth of the sewage pipeline 43. In an example, a holding table is provided at a distal end of a pole having approximately the same length as the depth of the manholes 42a and 42b, and the pole is inserted into the manhole 42a with the unmanned aerial vehicle 1 loaded on the holding table to drop the unmanned aerial vehicle 1. If the autonomous flight type unmanned aerial vehicle 1 is used, a position of the manhole 42a, the depth of the sewage pipeline 43, and the like may be previously recorded as a flight plan path on the recording apparatus 39, and the main operation unit 28a may read the flight plan information including data of the flight plan path and execute the autonomous control program 38a to autonomously fly the unmanned aerial vehicle 1 and guide the unmanned aerial vehicle 1 to one end of the sewage pipeline 43 (a left end in the sewage pipeline 43 in FIG. 10, which is hereinafter referred to as a shooting flight start position S), or may transmit a control signal to the unmanned aerial vehicle 1 from the external controller device and steer the unmanned aerial vehicle 1 to guide the unmanned aerial vehicle 1 to the shooting flight start position S.

Figure 11:
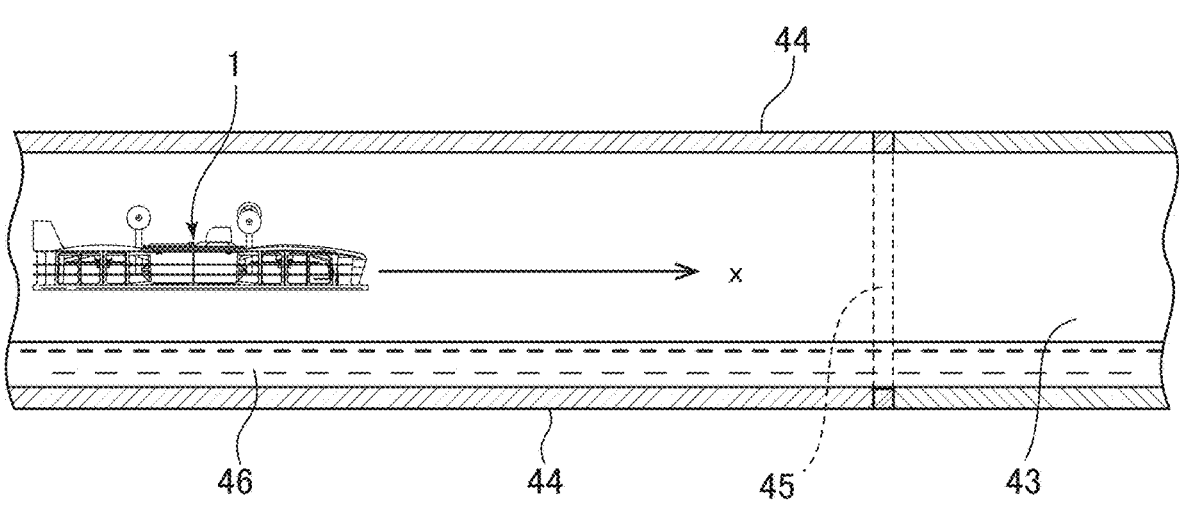
FIG. 11 is a diagram illustrating the unmanned aerial vehicle illustrated in FIG. 1A that flies in a tubular space in the sewage pipeline facility illustrated in FIG. 10.

The unmanned vehicle 1 starts the shooting flight in the rightward direction in FIG. 10 (with the direction used as the positive direction of x in FIG. 1A. i.e., the traveling direction) from the shooting flight start position (FIG. 11). With manual control by the operator from the external controller, the inspection camera 22 and the front camera 23 shoot a still image or a moving image within the sewage pipeline 43 while the unmanned aerial vehicle 1 is flying in the traveling direction upon receiving a control signal for issuing a forward instruction. Note that although water 46 normally exists in the sewage pipeline 43, and its water level varies, as needed, a float force can also be obtained by a water surface effect produced by rotation of the rotors 13 to 16 can also be obtained (If there is no water 46, a similar effect can also be obtained from the inner wall 44).

Data of the still image or the moving image shot by the inspection camera 22 is recorded in a built-in memory in the inspection camera 22, and data of the still image or the moving image shot by the front camera 23 is transmitted, as needed, to an external computer of the operator from the communication antenna 35 by the communication unit 36 after being recorded in a built-in memory in the front camera 23. The operator displays the still image or the moving image shot by the front camera 23 on a display provided in the external computer using the received data, and steers the unmanned aerial vehicle 1 by the external controller while confirming the still image or the moving image (If a communication quality between the external controller and the communication antenna 35 is not sufficient, a radio relay station is preferably previously installed in the sewage pipeline 43. A GPS signal can also be received similarly via the radio relay station). In an example, the unmanned aerial vehicle 1 is steered while a distance by which the unmanned aerial vehicle 1 has advanced with the connection section 45 reflected on the displayed still image or moving image used as a landmark.

Figure 12A:
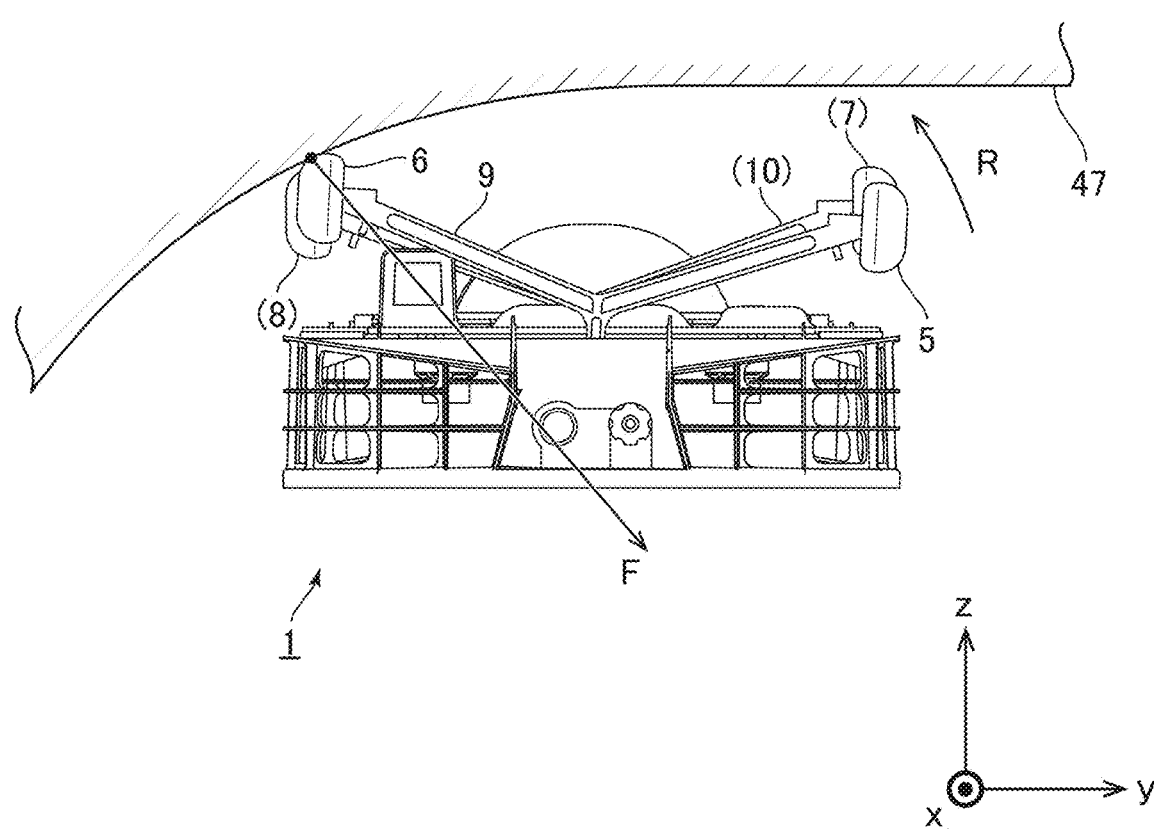
FIG. 12A is a diagram illustrating how a preceding collision member collides with an inner wall of a sewage pipeline during flight illustrated in FIG. 11.

During the shooting flight, the unmanned aerial vehicle 1 may excessively rise to collide with the inner wall 44 of the sewage pipeline 43 due to any reason such as an accuracy problem of manual control by the external controller or an accuracy problem of autonomous attitude control. A situation at this time is illustrated in FIG. 12A. The preceding collision member 6 (as a rotary member such as a wheel or a roller) held by the holding member 9 in the unmanned aerial vehicle 1 contacts the boundary surface 47 between the sewage pipeline 43 and the inner wall 44, and a force in an arrow direction indicated by F in FIG. 12A is exerted on the preceding collision member 6 from the inner wall 44. This force is exerted as a force for rotating the holding member 9 (with the shaft section for holding member 11A as a fixed rotation axis) arrow direction indicated by R in FIG. 12A.

Figure 12B:
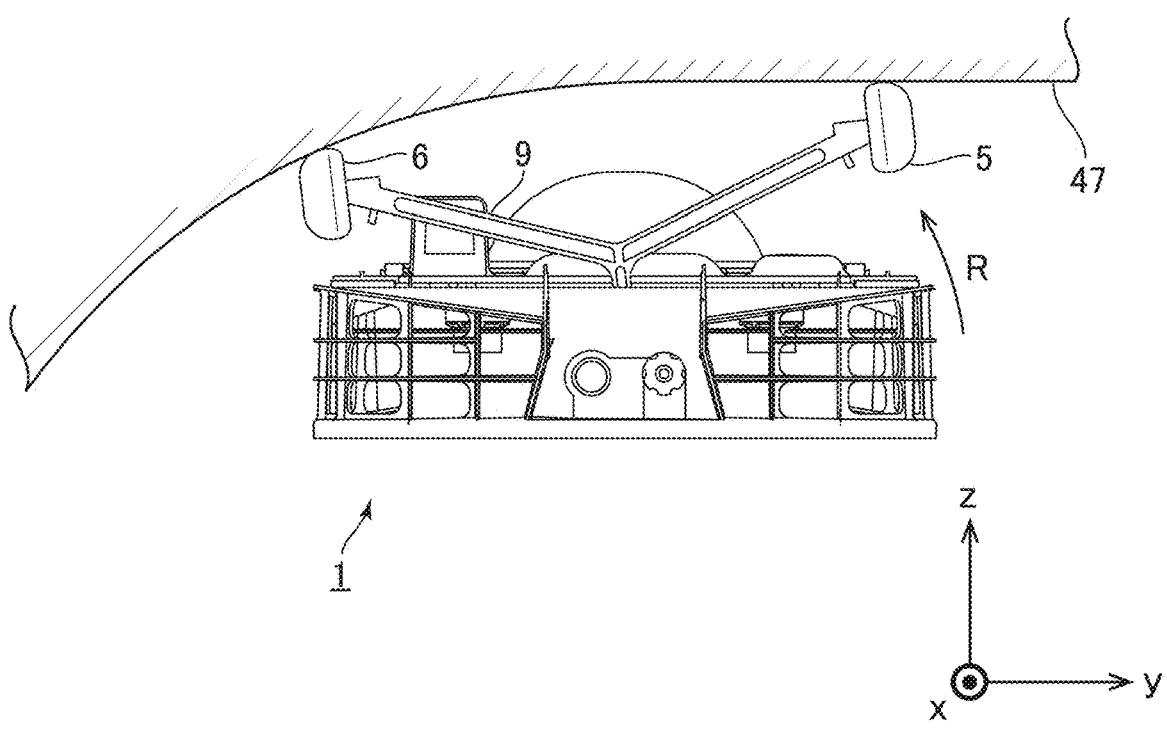
FIG. 12B is a diagram illustrating how the holding member rotates in response the collision illustrated in FIG. 12A and the other preceding collision member to be held by the holding member also collides with the inner wall in response to rise of the vehicle body.
Figure 12C:
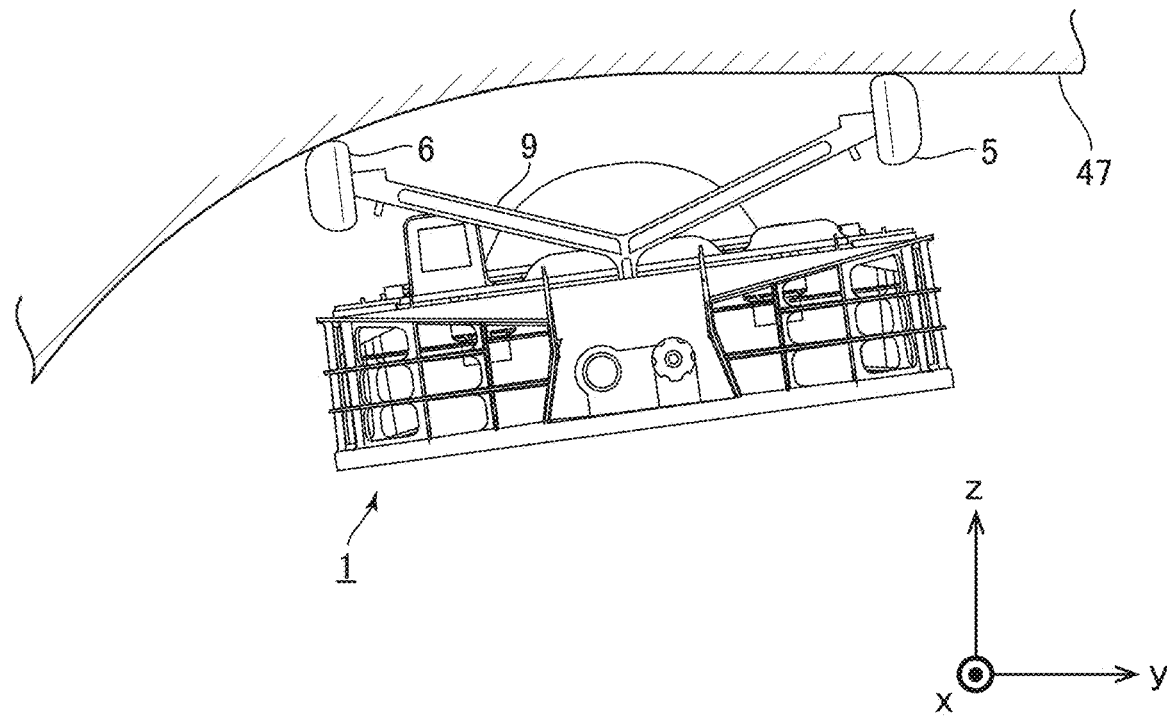
FIG. 12C is a diagram illustrating how the vehicle body is inclined after the holding member illustrated in FIG. 12B is inclined.

When the holding member 9 rotates as described above, and the vehicle body further rises, both the rotary members 5 and 6 to be held by the holding member 9 contact the boundary surface 47, as illustrated in FIG. 12B. The rotary members 7 and 8 to be held by the holding member 10 also contact the boundary surface 47 in a similar principle (Some of the rotary members may not contact the boundary surface 47 depending on a shape of the boundary surface). Assuming that the holding member 9 is attached to be rotatable around a position lower than the corresponding set of rotors 13 and 14 (in the negative direction of z in FIG. 1A) with the vehicle body not inclined, and the holding member 10 is attached to be rotatable around a position lower than the corresponding set of rotors 15 and 16 (in the negative direction of z in FIG. 1A) with the vehicle body similarly not inclined, the vehicle body is inclined in a similar direction to the direction of the inclination of the holding members 9 and 10, as described with reference to FIGS. 5A to 5E (FIG. 12C). In this state, if the unmanned aerial vehicle 1 is flown in an x-direction in FIG. 12C, for example, (In the present specification, "fly" also includes the unmanned aerial vehicle moving while floating with the components of the unmanned aerial vehicle contacting the boundary surface), the unmanned aerial vehicle 1 flies along the boundary surface 47 while the rotary member, which contacts the boundary surface 47, among the rotary members 5 to 8 is rotating (see FIG. 3B). Note that it is not essential to incline the vehicle body, as illustrated in FIG. 12C. The unmanned aerial vehicle 1 can also fly along the boundary surface 47 with the vehicle body not inclined. Alternatively, the unmanned aerial vehicle 1 can fly along the boundary surface 47 even if the vehicle body is inclined in an opposite direction, as described with reference to FIGS. 6A to 6E. If the preceding collision members 5 to 8 are not each a rotary member such as a wheel or a roller, but are each a member fixed to the holding member, as described with reference to FIG. 4, for example, the unmanned aerial vehicle 1 flies along the boundary surface 47 while the preceding collision member, which contacts the boundary surface 47, among the preceding collision members 5 to 8 is sliding.

Figure 13A:
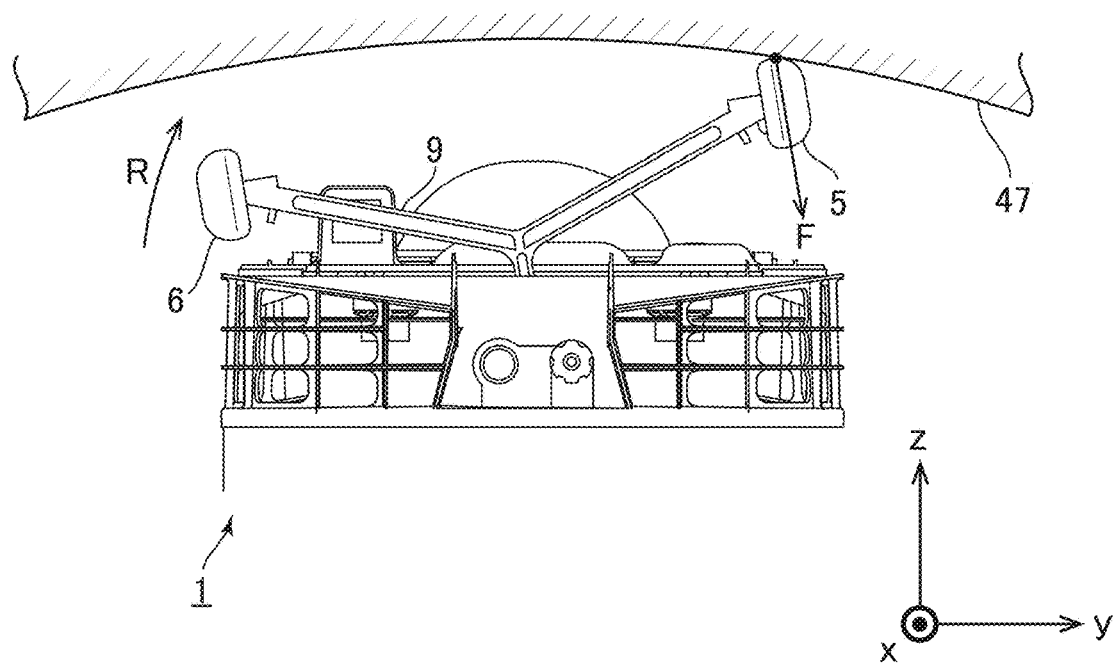
FIG. 13A is a diagram illustrating how the preceding collision member collides with the inner wall of the sewage pipeline (at a position different from a collision position illustrated in FIG. 12A) during flight illustrated in FIG. 11.
Figure 13B:
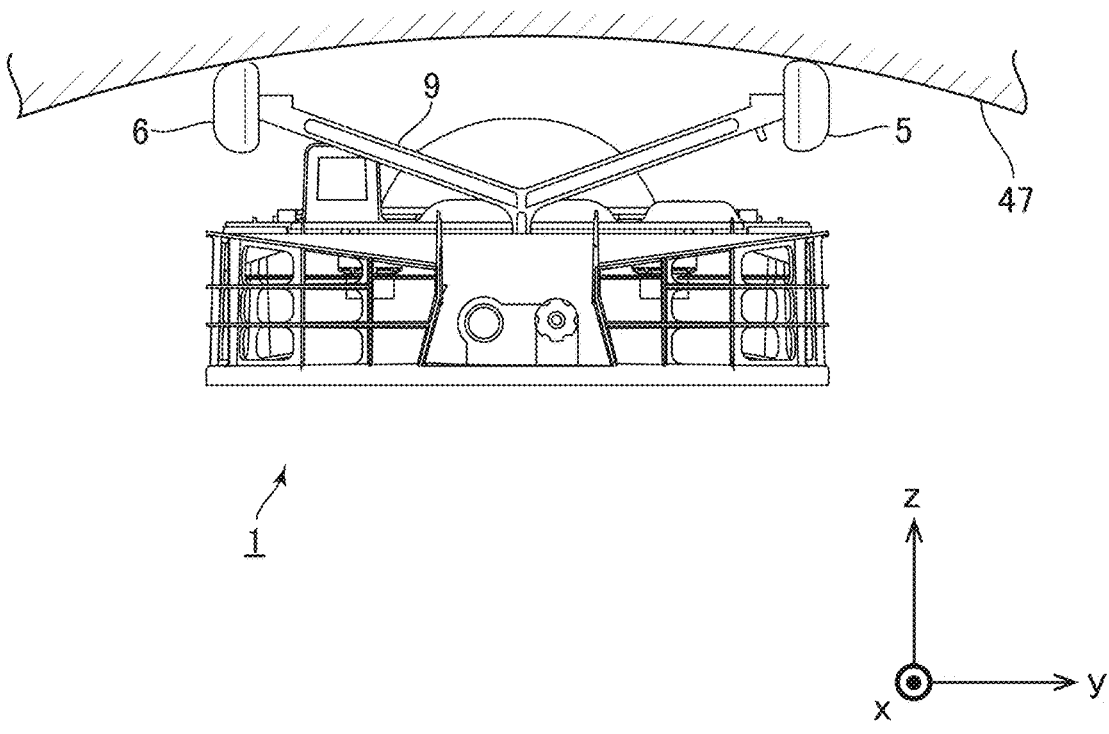
FIG. 13B is a diagram illustrating how the holding member rotates in response the collision illustrated in FIG. 13A and the other preceding collision member to be held by the holding member also collides with the inner wall in response to rise of the vehicle body.

Note that although description has been made assuming that the boundary surface 47 is inclined in one direction in a region with which the preceding collision member collies in an example illustrated in FIGS. 12A to 12C, even if the preceding collision member collies with a flat region on the boundary surface 47, a region symmetrically inclined in both directions, or the like, the unmanned aerial vehicle 1 can basically be flown along the boundary surface 47 in a similar principle. As an example, when the preceding collision member 5 contacts the region on the boundary surface 47 illustrated in FIG. 13A, a force is exerted on the preceding collision member 5 from the inner wall 44 in an arrow direction indicated by F in FIG. 13A, and the holding member 9 rotates in an arrow direction indicated by R in FIG. 13A. When the vehicle body further rises, both the preceding collision members 5 and 6 to be held by the holding member 9 contact the boundary surface 47, as illustrated in FIG. 13B. The preceding collision members 7 and 8 to be held by the holding member 10 also contact the boundary surface 47 in a similar principle (Some of the rotary members may not contact the boundary surface 47 depending on a shape of the boundary surface). Hereinafter, the unmanned aerial vehicle 1 can fly along the boundary surface 47 in a similar principle. If the preceding collision member is a rotary member such as a wheel or a roller, the unmanned aerial vehicle 1 flies along the boundary surface 47 while rotating the rotary member that has contacted the boundary surface 47. With a member described with reference to FIG. 4, the unmanned aerial vehicle 1 flies along the boundary surface 47 while sliding the member on the boundary surface 47.

Figure 14:
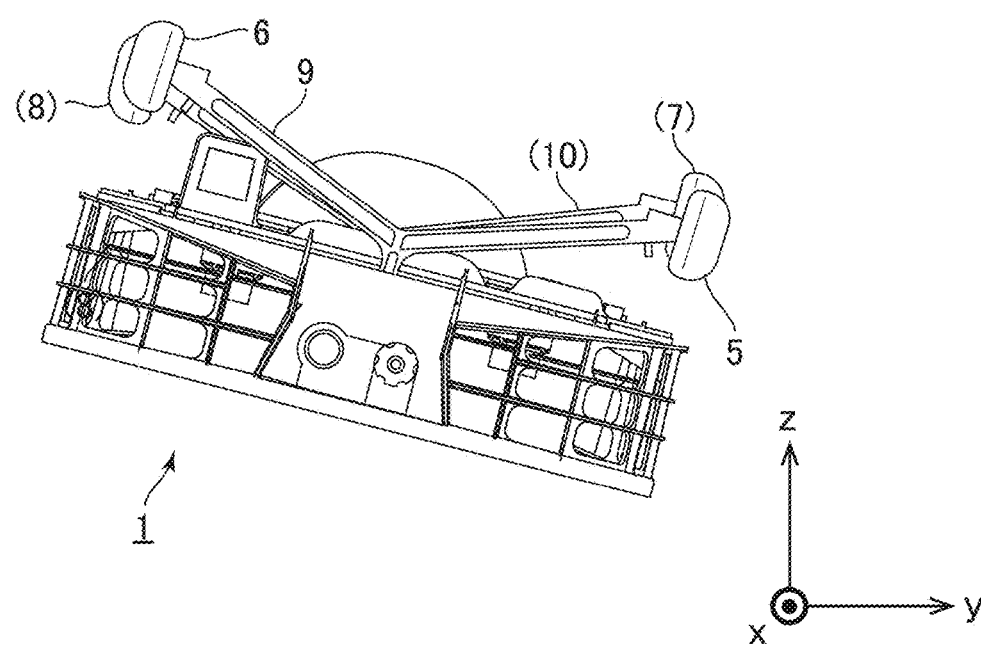
FIG. 14 is a diagram illustrating how the unmanned aerial vehicle illustrated in FIG. 1A is inclined by rotating (rolling) around an x-axis.

Note that the unmanned aerial vehicle 1 may be inclined due to any reason such as an accuracy problem of manual control and autonomous attitude control during the shooting flight in addition to or in a case other than a case where the preceding collision member collides with the boundary surface 47, as described above. As an example, FIG. 14 illustrates how the unmanned aerial vehicle 1 is inclined by rotating (rolling) around the x-axis illustrated in FIG. 1A. If the preceding collision member does not contact the boundary surface 47, for example, the lower side (the side in the positive direction of y) of the vehicle body can be raised by increasing the respective numbers of rotations of the rotors 13 and 15 to recover the attitude of the vehicle body to be horizontal. However, in this case, the vehicle body rises so that the unmanned aerial vehicle 1 may collide with an upper surface of the inner wall 44. As described with reference to FIGS. 12A to 13B, if the unmanned aerial vehicle 1 flies along the boundary surface 47 with the inner wall 44, the collision need not particularly be prevented. However, if the unmanned aerial vehicle 1 is desired to be flown while avoiding contact with the boundary surface 47, the respective numbers of rotations of the rotors 14 and 16 are preferably reduced to lower the higher side (the side in the negative direction of y) of the vehicle body and recover the attitude to be horizontal. Although such attitude control is typically performed when the main operation unit 28a reads data representing the attitude information of the unmanned aerial vehicle 1 obtained from the attitude sensor, as described above, and executes the autonomous control program 38a, the attitude control may be performed by transmitting a control signal representing a control command value of an attitude from the external controller device (a control signal including an attitude control signal for issuing instruction to roll in an opposite direction to that of the inclination illustrated in FIG. 14), receiving the control signal in the unmanned aerial vehicle 1, and executing the autonomous control program 38a in the main operation unit 28a. The attitude can be recovered by similarly reducing the respective numbers of rotations of some of the rotors for the inclination of the unmanned aerial vehicle 1 by any rotation such as rotation around a y-axis (a pitch) or a z-axis (a yaw).

The unmanned aerial vehicle 1 reaches the other end of the sewage pipeline 43 (a right end in the sewage pipeline in FIG. 10, which is hereinafter referred to as a shooting flight end position G), the shooting flight ends. A pole having a holding table provided at its distal end is inserted into the manhole 42b, and the unmanned aerial vehicle 1 is loaded on the holding table and is pulled up, for example, to recover the unmanned aerial vehicle 1. The unmanned aerial vehicle 1 may be pulled up from the end position G by autonomous flight, like when the unmanned aerial vehicle 1 is guided into a shooting flight start position S. Respective states of the sewage pipeline 43, the inner wall 44, and the like can be confirmed by detaching the inspection camera 22 from the recovered unmanned aerial vehicle 1 and seeing a still image or a moving image recorded in the memory of the inspection camera 22.

Figure 15:
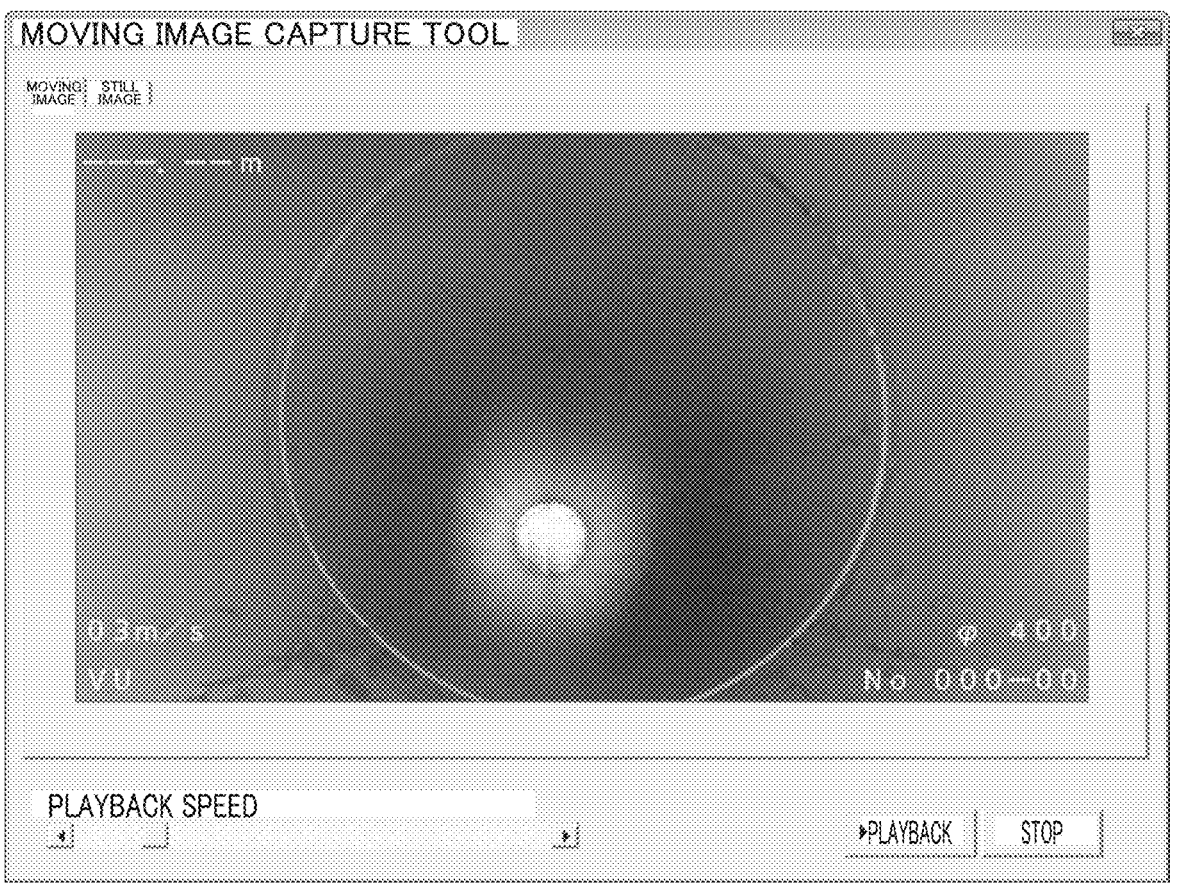
FIG. 15 is a diagram illustrating an example of an image in the sewage pipeline shot by a front camera.

FIG. 15 illustrates an example of an image in the sewage pipeline shot by the front camera. A similar image can be obtained by the shooting flight of the unmanned aerial vehicle 1 loaded with the front camera 23. The operator can steer the unmanned aerial vehicle 1 using the external controller device while seeing a still image or a moving image at a first person view shot by the front camera 23 as illustrated in FIG. 15. After the shooting flight, the state of the sewage pipeline 43, for example, a crack of the inner wall 44 or a shift of a packing in the connection section 45 can be confirmed by detaching the inspection camera 22 from the recovered unmanned aerial vehicle 1 and seeing a still image or a moving image recorded in the memory.

Second Embodiment

Then, an unmanned flying object, a shooting inspection system, and a shooting inspection method according to an embodiment of the present invention will be described with reference to the drawings. Note that the shooting inspection system and the shooting inspection method according to the present invention are not limited to a specific mode described below, but are appropriately changeable within the scope of the present invention. For example, the unmanned flying object used for shooting inspection according to the present invention is not necessarily an unmanned flying object of a type illustrated in FIG. 16A, for example, but may be the unmanned flying object (unmanned aerial vehicle) illustrated in FIG. 1A, for example, or may be any other unmanned flying object. The unmanned flying object illustrated in FIG. 16A, for example, may be an unmanned flying object that operates in a similar principle to that of the unmanned flying object illustrated in FIG. 1A, for example, except that it does not include a flight control mechanism including preceding collision members 5 to 8, holding members 9 and 10, and the like, and a functional configuration may be as illustrated in FIG. 9. However, the unmanned flying object usable for the preset invention is not limited to that but may be arbitrary. For example, the unmanned flying object illustrated in FIG. 16A, for example, may include the flight control mechanism illustrated in FIG. 1A, for example. The other configuration may also be arbitrary. Operations to be performed by a plurality of components may be performed by a single component, for example, a function of a communication unit is integrated with a main operation unit. Alternatively, an operation to be performed by a single component as illustrated may be performed by a plurality of components, for example, a function of the main operation unit is distributed among a plurality of operation units. An autonomous control program of the unmanned flying object may be recorded on a recording device such as a hard disk drive and read out and executed by the main operation unit autonomous control program as illustrated may be decomposed into a plurality of program modules, or any other programs may be executed by the main operation unit or the like), or a similar operation may be performed by a built-in type system using a microcomputer or the like. All components illustrated in the following embodiment need not be included in the unmanned flying object (For example, the unmanned flying object need not include a thrust generation propeller 25 when propulsion of the unmanned flying object is controlled under control of rotors 13 to 16 illustrated in FIG. 16B and need not include an autonomous control program and various types of databases if the unmanned aerial vehicle is completely flown under control from outside without performing autonomous control), and the method according to the present invention need not include all method steps as illustrated. A rotary wing for floating the unmanned flying object is not limited to the four rotors 13 to 16 as illustrated in FIG. 16B, for example, but may be any number of (four or more) rotary wings. A propeller for generating a thrust is not limited to the thrust generation propeller 25 illustrated in FIG. 16D, for example, but may be any propeller. The unmanned flying object usable in the present invention is not limited to a rotorcraft. An vehicle body size of the unmanned flying object is also arbitrary. Although an example in which the unmanned flying object performs shooting flight in a closed-type space such as a sewage pipeline is illustrated in the following embodiment, the shooting inspection according to the present invention can be performed in not only the closed-type space but also any inspection space and for any purpose. Note that the closed-type space need not be completely closed, but may be a space that is at least partially closed and where flight of the unmanned flying object is at least partially restricted. For example, a tubular space in the sewage pipeline connected to the outside via, a manhole is also a closed-type space, and a tunnel of a highway is also a closed-type space, as described in the following embodiment. Other members and components included in the shooting inspection system may be composed of any material if they can exhibit functions of the present invention. In addition, arbitrariness of the configuration described in association with the unmanned aerial vehicle according to the first embodiment similarly holds true for the unmanned flying object used in the shooting inspection according to the second embodiment. Elements and the like that may be similar to the elements and the like described in FIGS. 1A to 15 are respectively assigned similar reference characters in FIG. 16A and subsequent figures.

Configuration of Unmanned Flying Object.

Figure 16A:
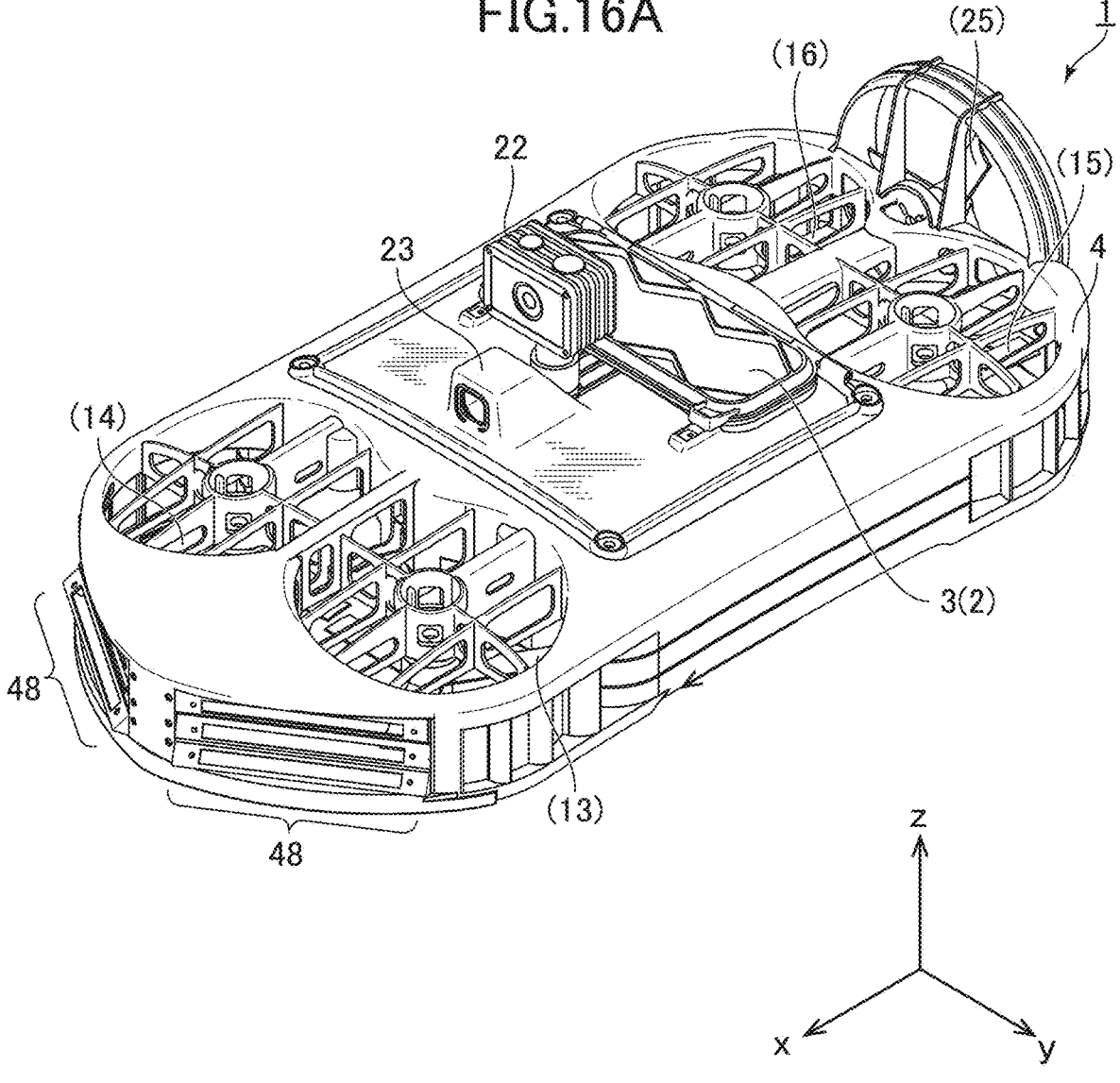
FIG. 16A is a perspective view of an unmanned flying object according to an embodiment of the present invention (a coordinate axis is defined, like in FIG. 1A).
Figure 16B:
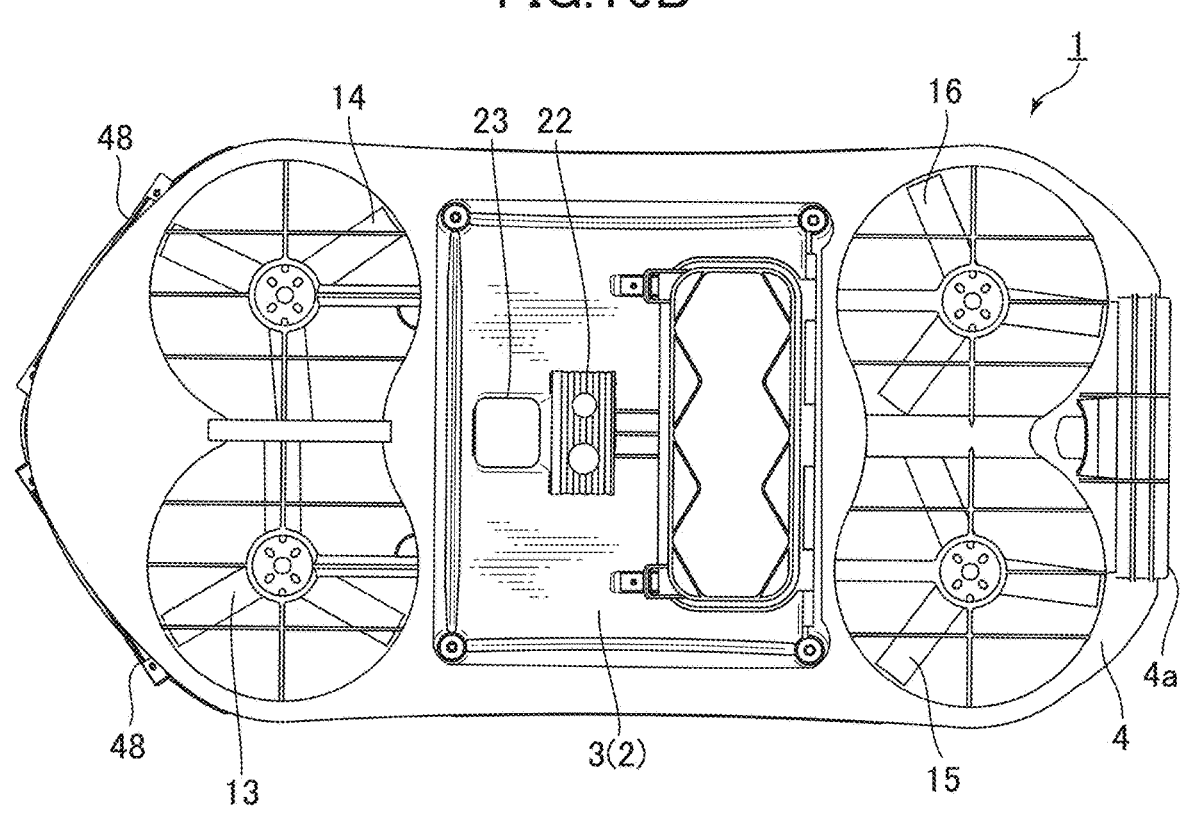
FIG. 16B is a diagram of the unmanned flying object illustrated in FIG. 16A in a positive direction of z.
Figure 16C:
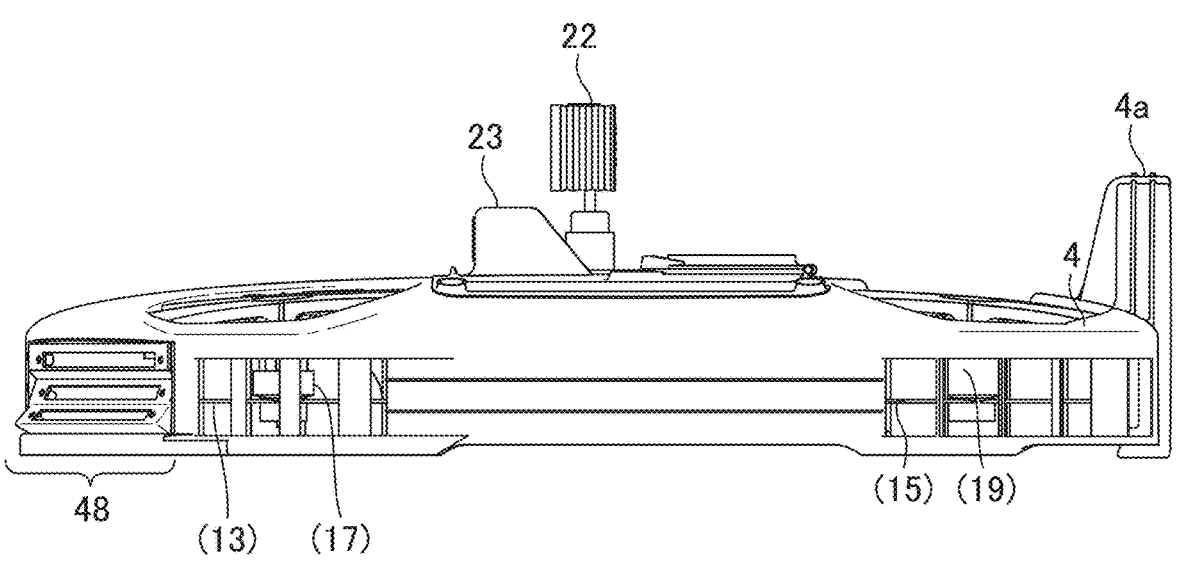
FIG. 16C is a diagram of the unmanned flying object illustrated in FIG. 16A in a positive direction of y.
Figure 16D:
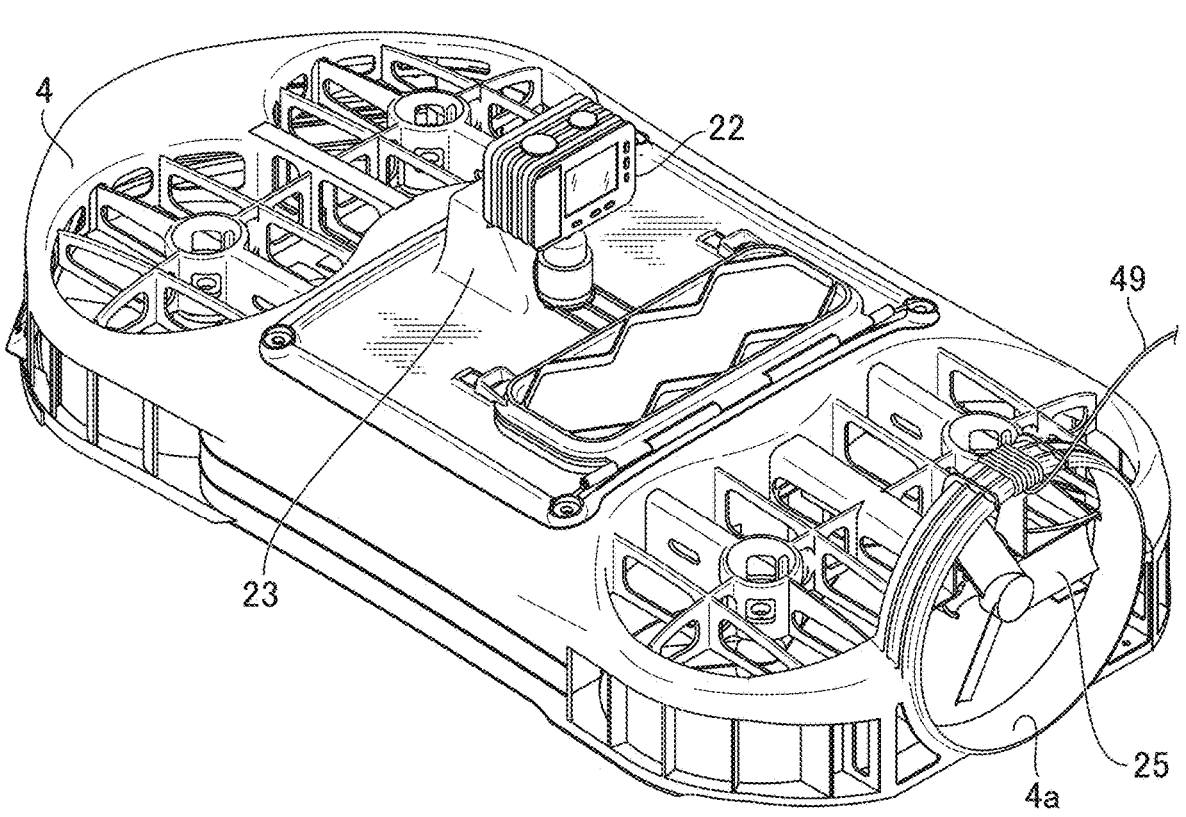
FIG. 16D is a perspective view of the unmanned flying object illustrated in FIG. 1A from behind in a traveling direction.
Figure 16E:
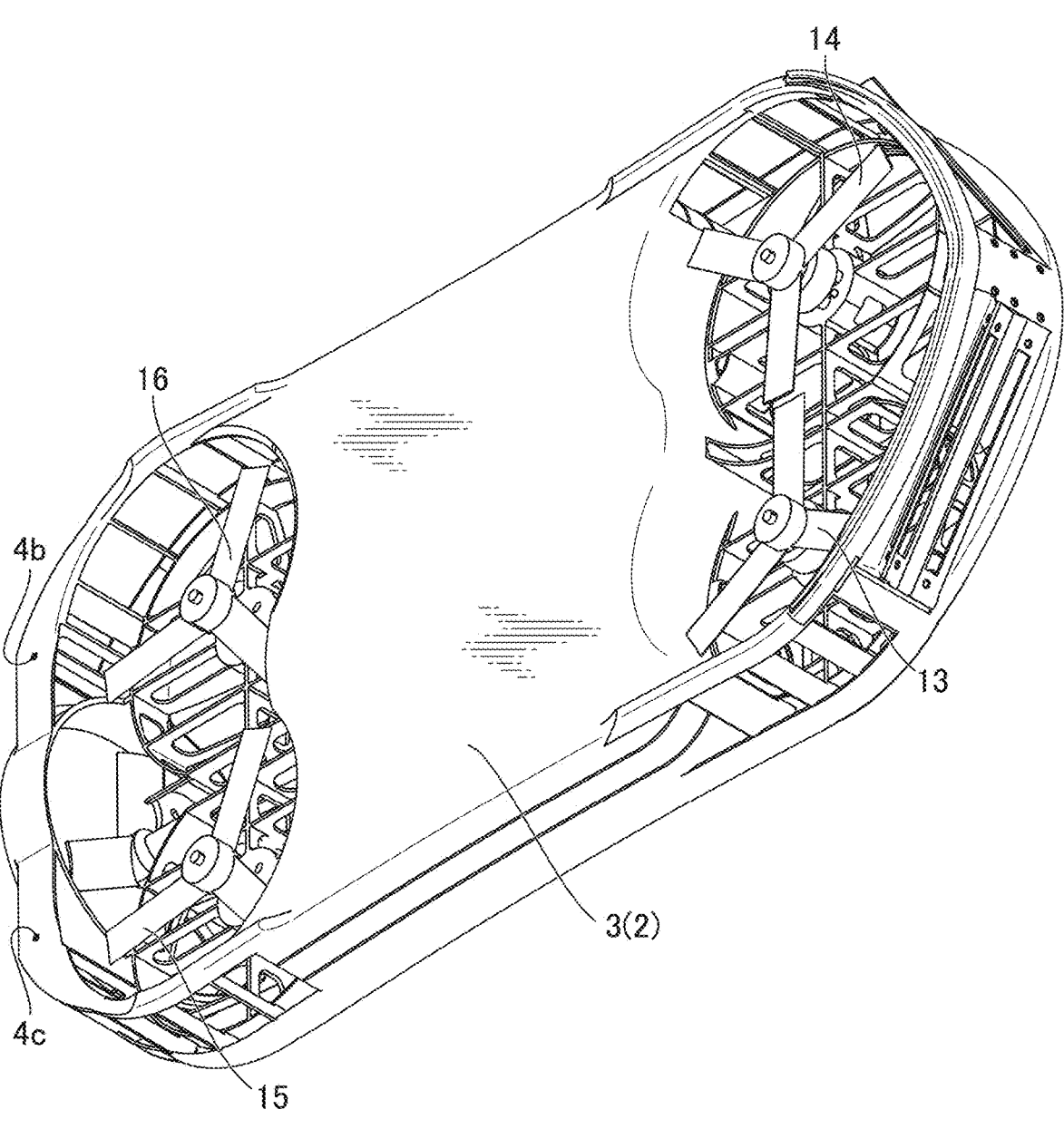
FIG. 16E is a perspective view of the unmanned flying object illustrated in FIG. 16A in a negative direction of z.
Figure 16F:
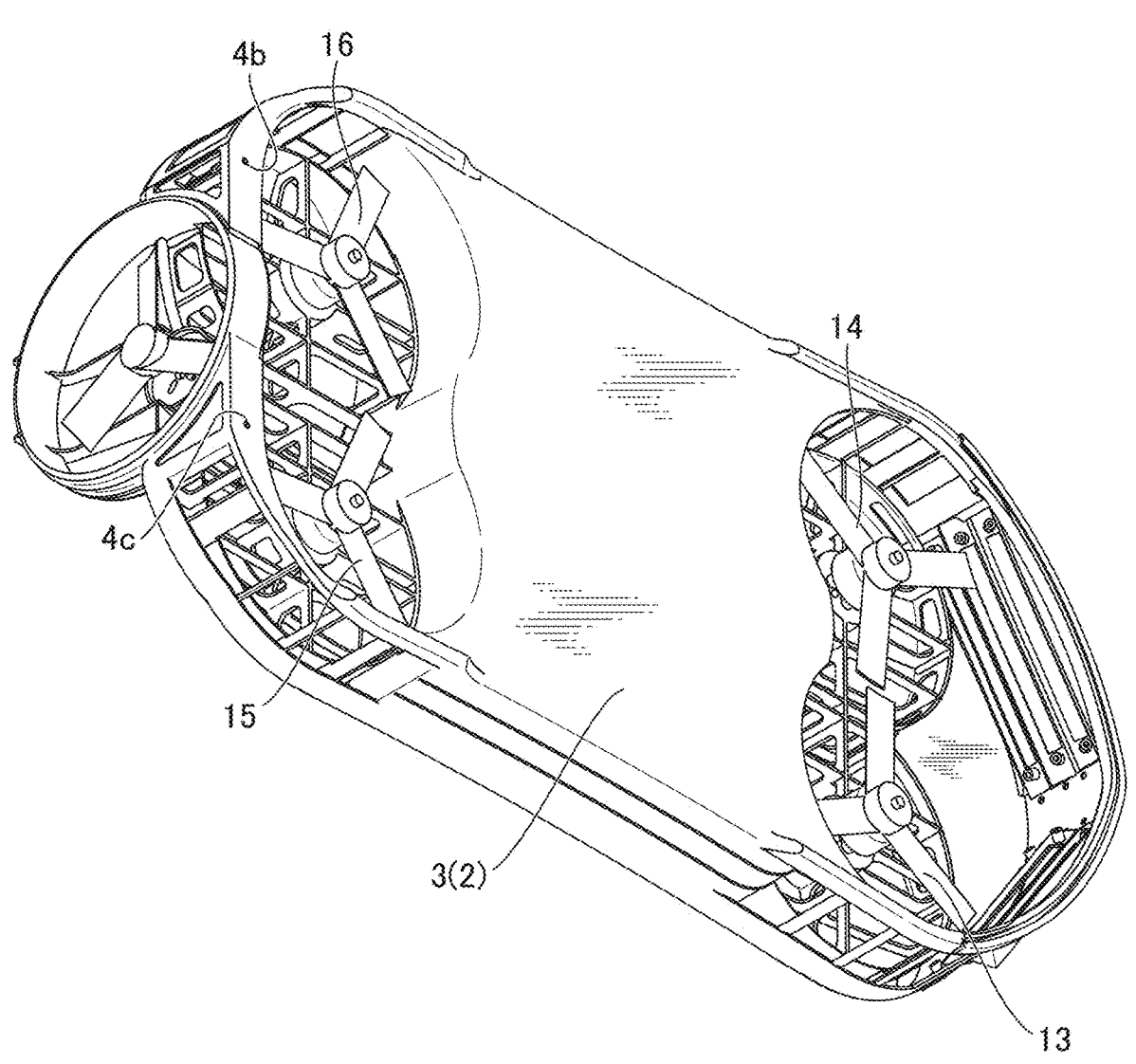
FIG. 16F is a perspective view of the unmanned flying object illustrated in FIG. 16A in the negative direction of z and in a direction different from that in FIG. 16E.

FIGS. 16A to 16F illustrate an appearance of an unmanned flying object that can be used for shooting inspection according to the present invention. FIG. 16A is a perspective view, FIG. 16B is a diagram viewed in a positive direction of z illustrated in FIG. 16A (a coordinate system is defined, like in FIG. 1A), FIG. 16C is a diagram viewed in a positive direction of y, FIG. 16D is a perspective view viewed from behind in a traveling direction, and FIGS. 16E and 16F are perspective views viewed in a negative direction of z (but in different directions) illustrated in FIG. 16A. An unmanned flying object 1 is designed in dimensions of an overall width (a width in a y-direction in FIG. 16A) of approximately 250 mm and an overall length (a width in an x-direction in FIG. 16A) of approximately 570 mm to be able to fly in a closed-type space (inspection space) having a bore diameter of approximately 400 mm in an example, and includes a main body section 2 (housed in a waterproof case 3), five motors 17 to 21 (see FIG. 17) that are driven in response to a control signal from the main body section 2, four rotors (rotary wings) 13 to 16 that respectively rotate by drives of the motors 17 to 20 to float the unmanned flying object 1 (The adjacent rotors respectively rotate in opposite directions, for example, the rotors 13 and 16 rotate in a clockwise direction viewed in the positive direction of z, and the rotors 14 and 15 rotate in a counterclockwise direction viewed in the positive direction of z), a thrust generation propeller 25 that rotates by a drive of the motor 21 to generate a thrust of the unmanned flying object 1, an inspection camera 22, a front camera 23, and an illumination light 48 that performs forward illumination (may further include a ultrasonic sensor 24 not illustrated at any position), and each of the components are integrated using a frame 4. A line-type member 49 is connected to a frame rear section 4a as illustrated in FIG. 16D (the line-type member 49 is appropriately omitted in figures other than FIG. 16D).

The inspection camera 22 is a camera for shooting a still image or a moving image during flight in the inspection space by the unmanned flying object 1. In an example of the inspection camera 22, a commercially available camera such as a GoPro session (Tajima MOTOR CORPORATION) can be used. As described below, in an example of the shooting inspection, shooting by the inspection camera 22 is performed while the unmanned flying object 1 stops flying forward, and a draw device 50 winds the line-type member 49 to draw the unmanned flying object 1 toward a flight start stage 52 (The shooting by the inspection camera 22 may be started before the unmanned flying object 1 is put into the inspection space, the shooting by the inspection camera 22 may be continued until the unmanned flying object 1 is recovered from the inspection space, or start and stop of the shooting may be controlled at any timing by a remote operation). The front camera 23 is a camera for shooting a still image or a moving image in the traveling direction during flight in the inspection space by the unmanned flying object 1. Data of the shot still image or moving image is transmitted to an external control device (e.g., a computer including a display), as needed, and an operator can steer the unmanned flying object 1 while confirming the data. The ultrasonic sensor 24 is a sensor for detecting an obstacle or the like ahead thereof, and can transmit an ultrasonic wave in the traveling direction during flight in the inspection space by the unmanned flying object 1 and measure a distance from the obstacle or the like by receiving a reflected wave. The inspection camera 22 and the front camera 23 may be each a camera such as an infrared camera or a ultraviolet camera. In an example of the shooting inspection, the unmanned flying object 1 is steered while the still image or the moving image shot by the front camera 23 is being confirmed in real time, and the still image or the moving image shot by the inspection camera 22 is confirmed after the unmanned flying object 1 is recovered from the inspection space, and the inspection camera 22 is then removed, to acquire shooting data from a memory of the inspection camera 22. Accordingly, when resolution of the moving image or the still image obtained based on shooting data from the front camera 23 is made lower than resolution of the moving image or the still image obtained based on the shooting data from the inspection camera 22, the moving image or the still image can be examined, for example, using the shooting data (by the inspection camera 22) having a high resolution after shooting flight ends while making a communication data amount in data transmission/reception performed in real time during flight of the unmanned flying object 1 relatively low.

Here, the inspection camera 22 is loaded at a position on the vehicle body of the unmanned flying object 1 and between the rotors 13 and 14 positioned on the side in the traveling direction (in a positive direction of x) and the rotors 15 and 16 positioned on the opposite side in the traveling direction (in a negative direction of x) among the four rotors 13 and 16, as illustrated in FIG. 16A, for example. When the unmanned flying object 1 flies in a space, on a surface where a liquid (water, etc.) exists at least partially, such as a sewage pipeline, the liquid is scattered by rotation of the rotors 13 to 16. Accordingly, when the inspection camera 22 is loaded below the vehicle body or ahead of the vehicle body, the liquid is splashed on the inspection camera 22 so that the liquid (water splashes, water droplets, etc.) may also be reflected on the moving image or the still image shot by the inspection camera 22. However, if the inspection camera 22 is arranged, as illustrated in FIG. 16A, for example, the rotors 13 to 16 at least partially prevent the scattered liquid from reaching a position above the vehicle body (The liquid is at least partially prevented from reaching a position of the inspection camera 22 by the liquid adhering to the rotors 13 to 16 and by a flow of gas below the vehicle body (in the negative direction of z) caused by the rotation of the rotors 13 to 16). Accordingly, a moving image or a still image obtained by more favorably shooting a state inside the sewage pipeline can be obtained. The front camera 23 is also preferably arranged in a similar position (a position different from the position of the inspection camera 22).

Figure 16G:
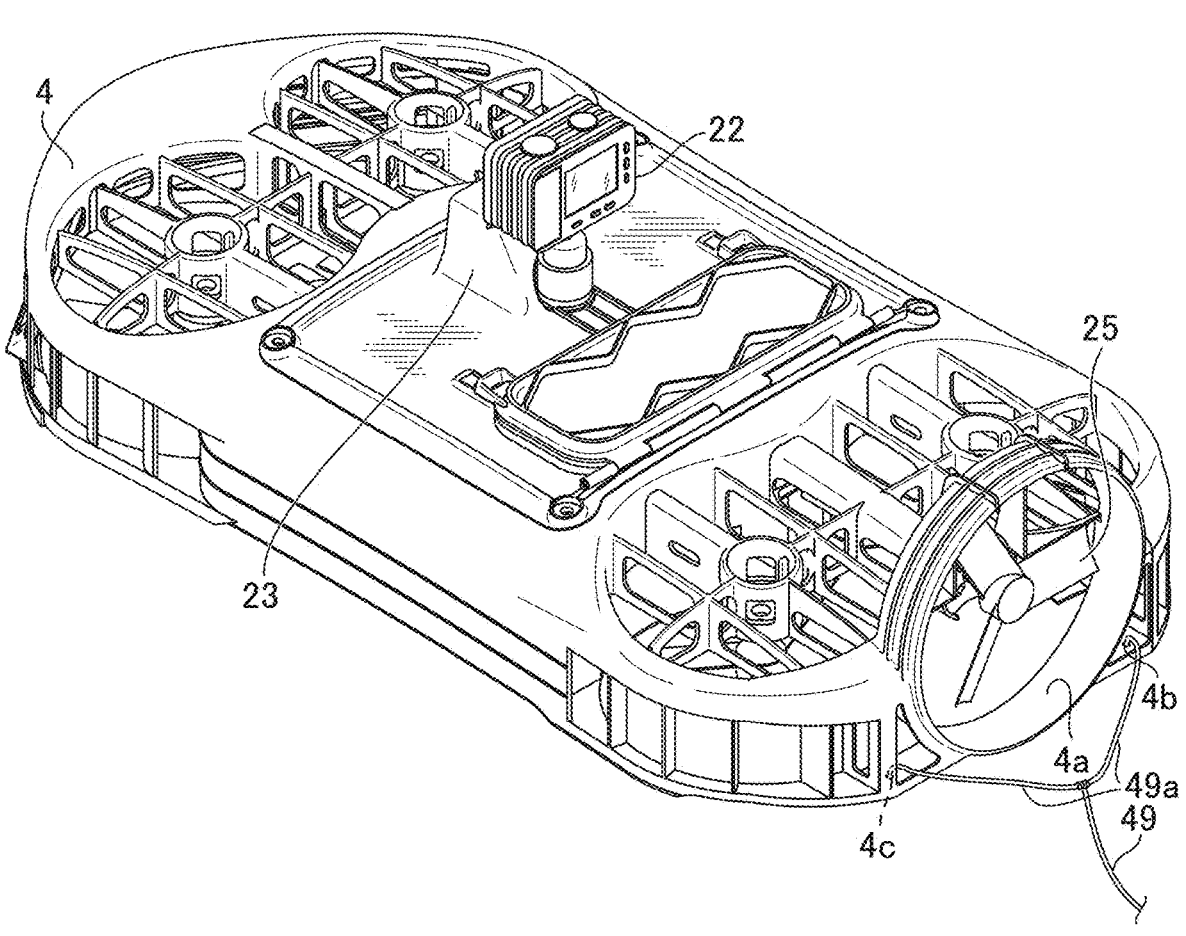
FIG. 16G is a diagram illustrating an example in which the unmanned flying object and a line-type member are connected to each other using a wire such as a piano wire as a variant of a mode illustrated in FIG. 16D.

Note that a method of connecting the unmanned flying object 1 and the line-type member 49 is arbitrary regardless of a mode illustrated in FIG. 16D. As illustrated in FIGS. 16E and 16F, for example, the unmanned flying object 1 and the line-type member 49 can also be connected to each other by forming a through hole 4b and a through hole 4c in the frame 4, passing one wire 49a such as a piano wire through the through holes 4b and 4c to fasten the wire 49a to the through holes 4b and 4c and coupling the line-type member 49 to the wire 49a using a snap, a carabiner, or the like (FIG. 16G).

Figure 17:
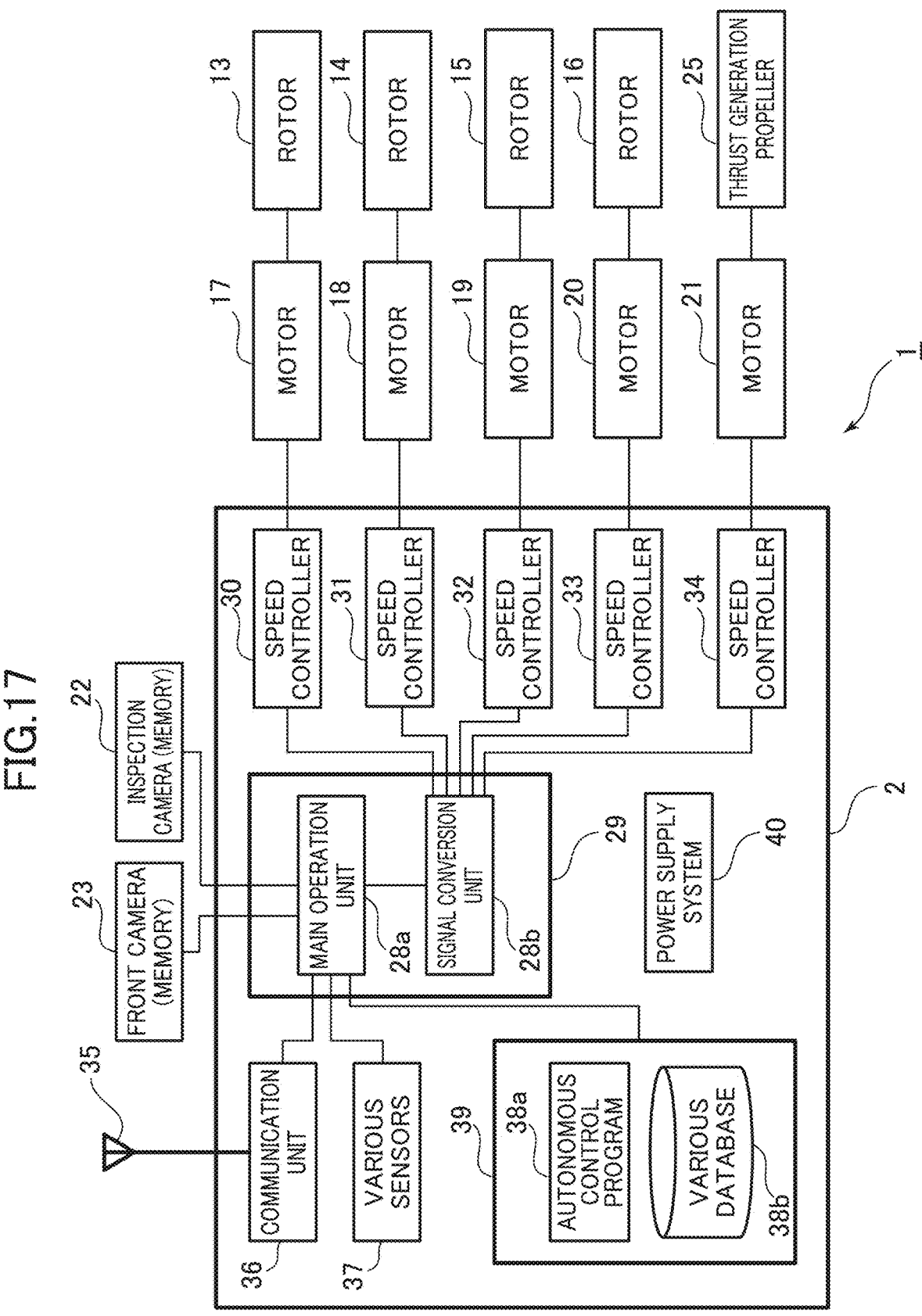
FIG. 17 is a block diagram illustrating a functional configuration of the unmanned flying object illustrated in FIG. 16A.

FIG. 17 is a block diagram illustrating functional configuration of the unmanned flying object illustrated in FIG. 16A. The main body section 2 in the unmanned flying object 1 includes a main operation unit 28a, including a processor, a temporary memory and the like, to perform various types of operations, a signal conversion unit 28b including a processor, a temporary memory, and the like, which performs processing for converting control command value data obtained by an operation by the main operation unit 28a into a pulse signal (PWM: a pulse width modulation signal) (An operation unit including the main operation unit 28a and the signal conversion unit 28b is referred to as a control signal generation unit 29), speed controllers (ESC: electric speed controllers) 30 to 34 that convert the pulse signal generated by the control signal generation unit 29 into driving currents, respectively, to the motors 17 to 21, a communication antenna 35 and a communication unit (including a processor, a temporary memory, and the like) 36 that transmit and receive various types of data to and from outside, a sensor unit 37 including various types of sensors such as a GPS (global positioning system) sensor, an attitude sensor, an altitude sensor, and a direction sensor, a recording apparatus 39 including a recording device such as a hard disk drive that records an autonomous flight program 38a, various types of databases 38b, and the like, and a power supply system 40 including a battery device such as a lithium polymer battery or a lithium ion battery and a power distribution system to each of elements, and an illumination light 48. In an example, respective functions of the main operation unit 28a, the recording apparatus 39, the communication unit 36, and the like may be implemented by storing a computer such as a laptop PC in the unmanned flying object 1. For example, a communication unit 67 (a communication circuit, a communication antenna, etc.) in an external control device 51 and the communication antenna 35 and the communication unit 36 (a communication circuit, etc.) in the laptop PC loaded on the unmanned flying object communicate with each other at a communication frequency of 5 GHz via a wireless LAN relay device 56.

In addition, the unmanned flying object 1 may include any functional unit, information, and the like depending on a functional use. As an example, when the unmanned flying object 1 autonomously flies according to a flight plan, flight plan information, which is data representing a flight plan as any rule to follow during flight, such as a flight plan path as a set of a start position and a destination of flight, and a check point position (a latitude, a longitude, and an altitude) through which the unmanned flying object 1 is to pass until it reaches the destination after starting from the start position, a speed limit, and an altitude limit is recorded in the recording apparatus 39, and the main operation unit 28*a* reads the flight plan information to execute the autonomous control program 38*a* so that the unmanned flying object 1 flies according to the flight plan. Specifically, the flight of the unmanned flying object 1 is controlled by determining a current position, a speed, and the like of the unmanned flying object 1 based on information obtained from the various types of sensors in the sensor unit 37, comparing the current position, the speed, and the like with respective target values of the flight plan path, the speed limit, the altitude limit, and the like determined by the flight plan to operate respective control command values for the rotors 13 to 16 and the thrust generation propeller 25 in the main operation unit 28*a*, respectively converting data representing the control command values into pulse signals (generating control signals) and transmitting the pulse signals to the speed controllers 30 to 34 in the signal conversion unit 28*b*, respectively converting the pulse signal into driving currents and outputting the driving currents to the motors 17 to 21 in the speed controllers 30 to 34, and controlling drives of the motors 17 to 21 to control respective rotational speeds and the like of the rotors 13 to 16 and the thrust generation propeller 25. As an example, control is performed to increase the respective numbers of rotations of the rotors 13 and 16 for a control command to increase the altitude of the unmanned flying object 1 (decrease the numbers of rotations when the altitude is decreased), increase the number of rotations of the thrust generation propeller 25 for a control command to accelerate the unmanned flying object 1 in a forward direction (in the position direction of x in FIG. 16A) (decrease the number of rotations when the unmanned flying object 1 is decelerated), and decrease the respective numbers of rotations of the rotors 14 and 16 for a control command to incline the unmanned flying object 1 by rolling around the x-axis illustrated in FIG. 16A (in a counterclockwise direction as viewed in the positive direction of x) to maintain the respective numbers of rotations of the rotors 13 and 15, for example. Note that the acceleration (deceleration) in the forward direction of the unmanned flying object 1 can also be performed by controlling the respective numbers of rotations of the rotors 13 to 16, for example, decreasing the respective numbers of rotations of the rotors 13 and 14 to increase the respective numbers of rotations of the rotors 15 and 16 (opposite control when the unmanned flying object 1 is decelerated), and the unmanned flying object 1 can also be flown without using the thrust generation propeller 25. Note that simplified control can also be performed. For example, the speed control of the unmanned flying object 1 in the forward direction (in the positive direction of x in FIG. 16A) can be performed by making all the respective numbers of rotations of the rotors 13 to 16 equal to one another (performing control to only equally increase or decrease the respective numbers of rotations of all the four rotors 13 to 16) to float and land (or land on water) the unmanned flying object 1 and controlling the number of rotations of the thrust generation propeller 25. Flight recording information such as a flight path through which the unmanned flying object 1 has actually flown (e.g., a position of the vehicle body of the unmanned flying object 1 at each time point) and various types of sensor data are recorded on various types of databases 38*b*, as needed, during flight.

As examples of the autonomous flight type unmanned flying object, Mini Surveyor ACSL-PF1 (Autonomous Control Systems Laboratory Ltd.), Snap (Vantage Robotics), AR. Drone 2.0 (Parrot), and Bebop Drone (Parrot), for example, are commercially available.

Note that when the unmanned flying object 1 flies under control from outside, the unmanned flying object 1 receives data representing a control command value received from a controller device or the like of the operator using the communication antenna 35 and the communication unit 36, converts the data into a pulse signal using the signal conversion unit 28*b* (generates a control signal), and similarly controls respective rotational speeds of the rotors 13 to 16 and the thrust generation propeller 25 using the speed controllers 30 to 34 and the motors 17 to 21, to perform flight control. Even in this case, when the main operation unit 28*a* reads data representing attitude information of the unmanned flying object 1 obtained from the attitude sensor (a gyro sensor or a magnetic sensor) among various types of sensors in the sensor unit 37 to execute the autonomous control program 38*a*, partial autonomous control and control from outside can also be combined with each other. For example, a command value of attitude control is operated by comparing the data from the attitude sensor with a target value of an attitude, for example, to perform the attitude control (In this case, the main operation unit 28*a* operates a final control command value by executing the autonomous control program 38*a* based on data representing a control command value received from an external controller device or the like and data representing the command value of the attitude control. When the signal conversion unit 28*b* converts the data representing the control command value into a pulse signal, a control signal including an attitude control signal is generated). Although it is assumed that the unmanned flying object 1 basically flies in response to a control signal from the external controller device or the like in shooting flight described below, and only the attitude is autonomously controlled, similar shooting flight can also be performed by the unmanned flying object 1 that performs fully autonomous control flight and fully external control flight.

Shooting Inspection Using Unmanned Flying Object

As an example of shooting inspection in an inspection space using the unmanned flying object 1, shooting flight in a sewage pipeline will be described below with reference to FIGS. 18 to 30.

A structure of a sewage pipeline facility is, for example, a structure as illustrated in FIG. 10 also described in the first embodiment. A manhole 42*a* provided on a ground surface 41 leads to a sewage pipeline 43, and follows the sewage pipeline 43 in a rightward direction in FIG. 10 to reach another manhole 42*b* (Although the sewage pipeline 43 is drawn by being cut at two points in the middle in FIG. 10, this is a representation used for convenience and is actually formed as a consecutive sewage pipeline 43 longer than that illustrated). A boundary surface of the inspection space is defined by an inner wall 44 in the sewage pipeline 43, respective wall surfaces of vertical holes continuing into the ground from the manholes 42*a* and 42*b*, and the like, and a connection section 45 exists for each predetermined distance in the rightward direction in FIG. 10 in the sewage pipeline 43.

Shooting Inspection System

Figure 18:
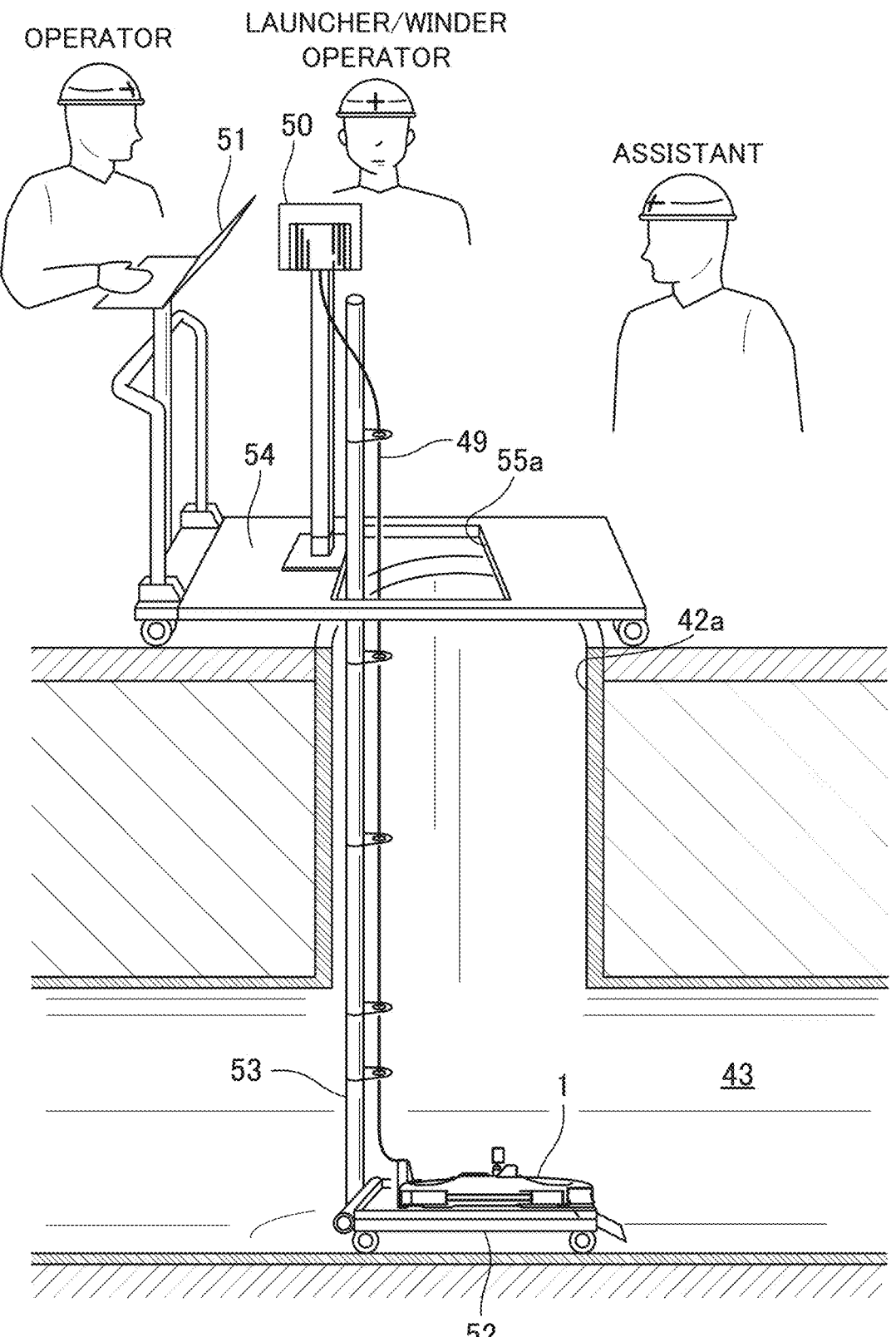
FIG. 18 is a diagram illustrating a configuration example of a shooting inspection system, including the unmanned flying object, for performing shooting inspection.

FIG. 18 is a diagram illustrating a configuration example of a shooting inspection system, including an unmanned flying object, for performing shooting inspection. The shooting inspection system includes an unmanned flying object 1, a flight start stage (launcher) 52 on which the unmanned flying object 1 can be placed, an external control device 51 such as a laptop PC, and a draw device 50 such as an automatic winding device that automatically winds a line-type member 49 such as a fishing line in a similar principle to that of an electric reel for fishing. In an example, the shooting inspection is performed using the shooting inspection system by three workers such as (1) an operator who controls flight of the unmanned flying object 1 using the external control device 51, (2) a launcher/winder operator who performs work for inserting the flight start stage 52 loaded with the unmanned flying object 1 into an inspection space and work for drawing the unmanned flying object 1, which has reached a destination in the inspection space or cannot advance due to any reason such as a damage to a sewer or existence of a deposit, to the flight start stage 52 using the draw device 50 and recovering the flight start stage 52 and the unmanned flying object 1 to the ground, and (3) an assistant.

Figure 19:
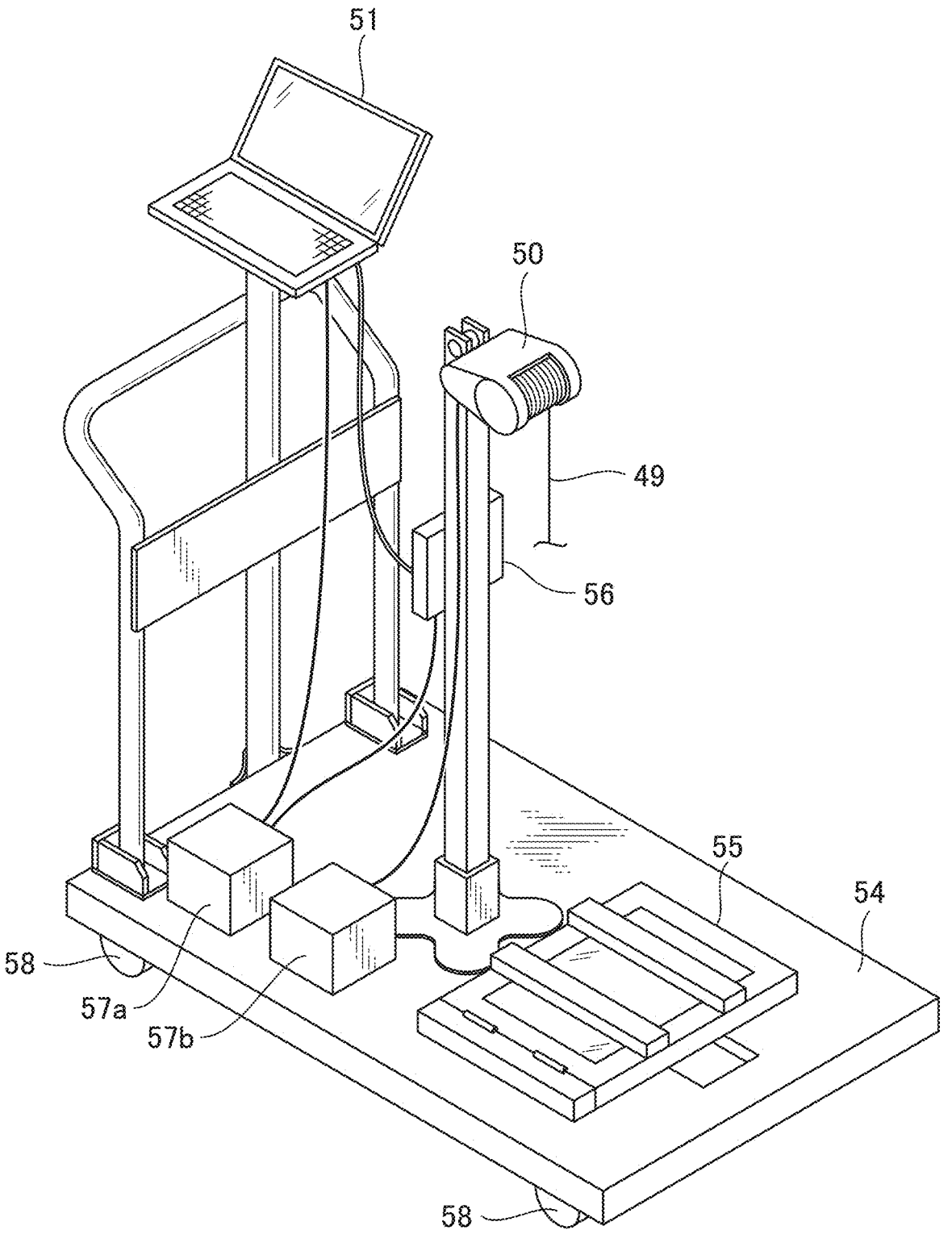
FIG. 19 is a diagram illustrating apparatuses other than the unmanned flying object and a flight start stage in an example of the shooting inspection system.
Figure 20:
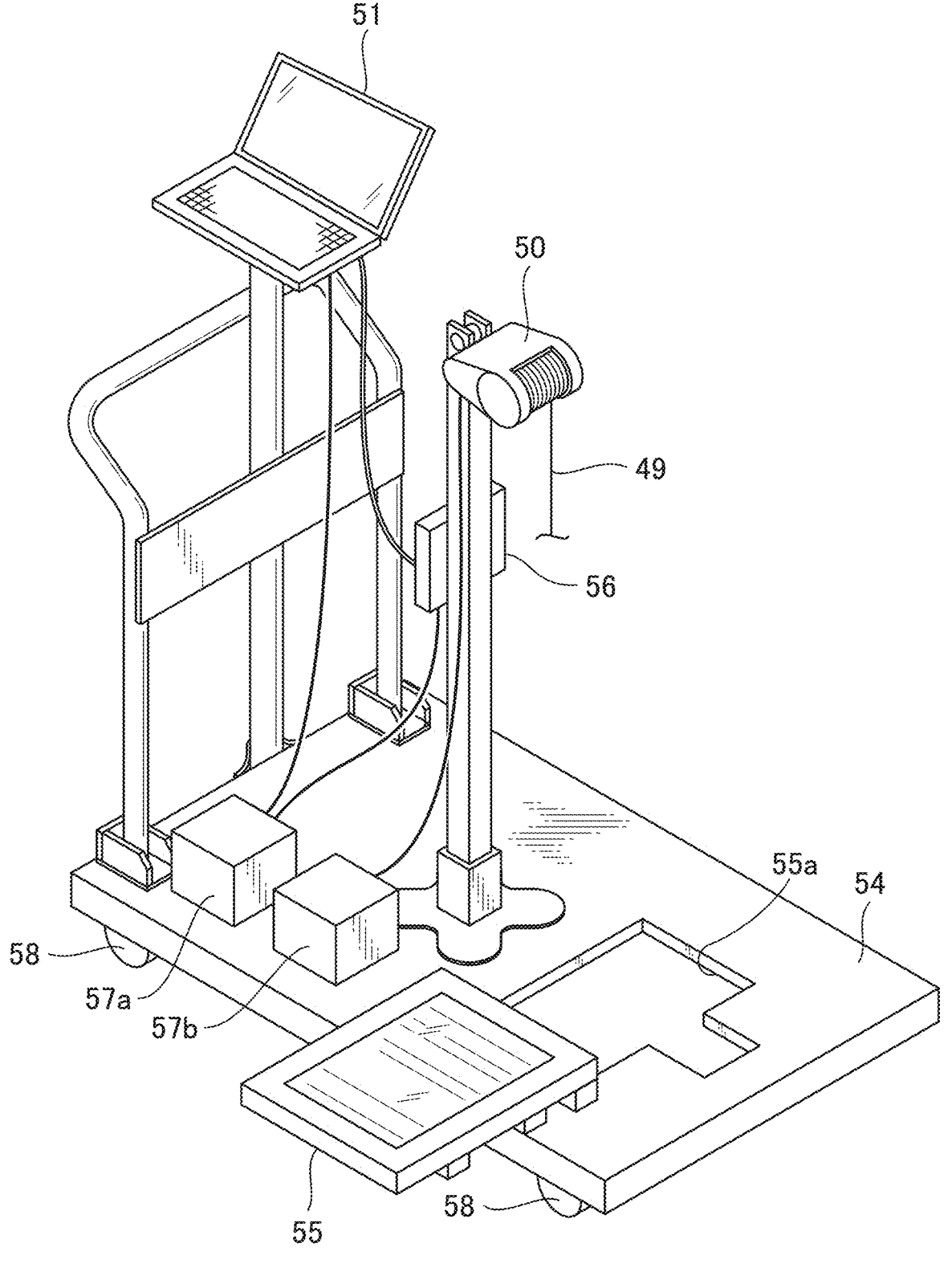
FIG. 20 is a diagram illustrating how the shooting inspection system has entered a state where a window provided in a carriage is opened and an opening for putting the unmanned flying object into an inspection space can be seen in the configuration example illustrated in FIG. 19.

FIG. 19 is a diagram illustrating apparatuses other than the unmanned flying object and the flight start stage in an example of the shooting inspection system. A carriage 54 is loaded with the draw device 50, the external control device 51, a wireless LAN (local area network) relay device (Wi-Fi relay device) 56, and external power supply apparatuses 57*a* and 57*b*, and is also provided with a window 55. The draw device 50 and the external control device 51 are loaded respectively using pillar-shaped members, and the wireless LAN relay device 56 is attached to the pillar-shaped member to which the draw device 50 is attached. The external control device 51 and the wireless LAN relay device 56 are supplied with electric power from the external power supply apparatus 57*a* via a power supply cable, and the draw device 50 is supplied with electric power from the external power supply apparatus 57*b* via a power supply cable. The external control device 51 and the wireless LAN relay device 56 are connected to each other via a LAN cable, and are communicable with each other. The window 55 can be opened, as illustrated in FIG. 20, the window 55 is opened after the carriage 54 with the flight start stage 52 on which the unmanned flying object 1 is placed such that a position of the window 55 is just above the manhole 42*a* is moved, and the flight start stage 52 loaded with the unmanned flying object 1 is put into the inspection space (underground space) via the manhole 42*a*.

Figure 21:
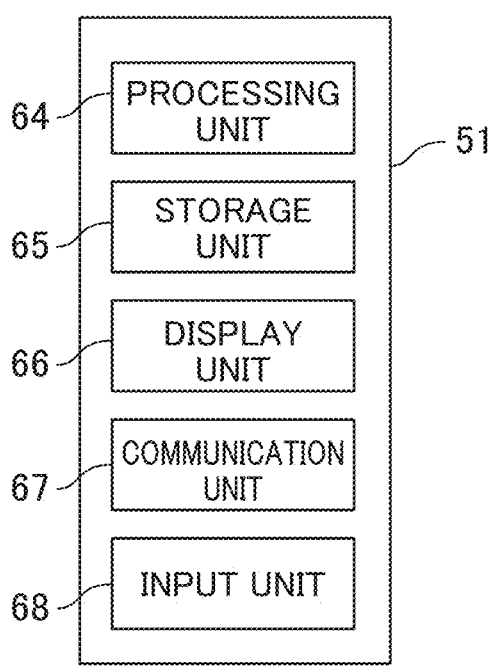
FIG. 21 is a block diagram illustrating a functional configuration of a laptop PC (personal computer) as an example of an external control device.

FIG. 21 is a block diagram illustrating a functional configuration of the laptop PC (personal computer) as an example of the external control device. The external control device 51 includes a processing unit 64 including a CPU (central processing unit) (the processing unit 64 controls an operation of each of elements included in the external control device 51), a storage unit 65 including a storage device such as a hard disk drive or an SSD (solid state drive), a display unit 66 including a display device such as a liquid crystal display device, a communication unit 67 that includes a communication circuit and the like and communicates with the wireless LAN relay device 56 via a LAN cable and further communicates (via the communication antenna 35) with the communication unit 36 in the unmanned flying object 1 via the wireless LAN relay device 56 (may further communicate therewith via an antenna attached to the flight start stage 52) or wirelessly communicates with the unmanned flying object 1 directly without via the wireless LAN relay device 56, and an input unit 68 including an input key or the like for receiving an input from the operator. The storage unit 65 stores a steering program for generating an instruction signal to the unmanned flying object 1 in response to the input from the operator, a drawing program for displaying shooting data of a moving image or a still image received by the communication unit 67 from the unmanned flying object 1 on the display unit 66, an image processing program for performing image processing of the shooting data of the moving image or the still image acquired from the memory of the inspection camera 22 and stored in the storage unit 65 and generating a developed view or an expanded image of the inner wall 44 or the like of the inspection space, for example, and the processing unit 64 executes the programs, to perform control of the unmanned flying object 1 and image processing.

Figure 22:
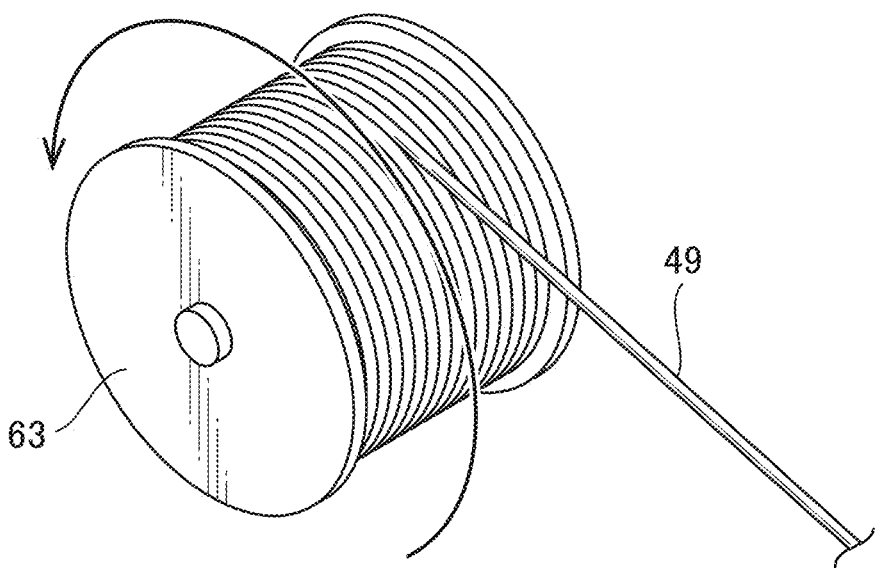
FIG. 22 is a conceptual diagram for describing an operation of an automatic winding device that winds a line-type member such as a fishing line or a string.

FIG. 22 is a conceptual diagram for describing an operation of an automatic winding device that winds a line-type member such as a fishing line or a string as an example of the draw device 50. A cylinder like member (spool) 63 connected to an end of the line-type member 49 rotates in an arrow direction in FIG. 22 by a drive of a motor not illustrated so that the line-type member 49 is automatically wound around the cylinder like member 63. The unmanned flying object 1 is connected to an end, on the opposite side to the cylinder like member 63, of the line-type member 49. When the unmanned flying object 1 flies and pulls the line-type member 49, the cylinder like member 63 rotates in the opposite direction to the arrow direction in FIG. 22, and the line-type member 49 is unwound (extends) from the cylinder like member 63. However, if the cylinder like member 63 is rotated in the arrow direction in FIG. 22 by the drive of the motor, to wind the line-type member 49, the unmanned flying object 1 that has thus flown can be drawn and recovered. As the automatic winding device, various known or new reel apparatuses, for example, can be used. For example, electric reel devices respectively described in Patent Literatures 4 to 6 can be used.

Figure 23A:
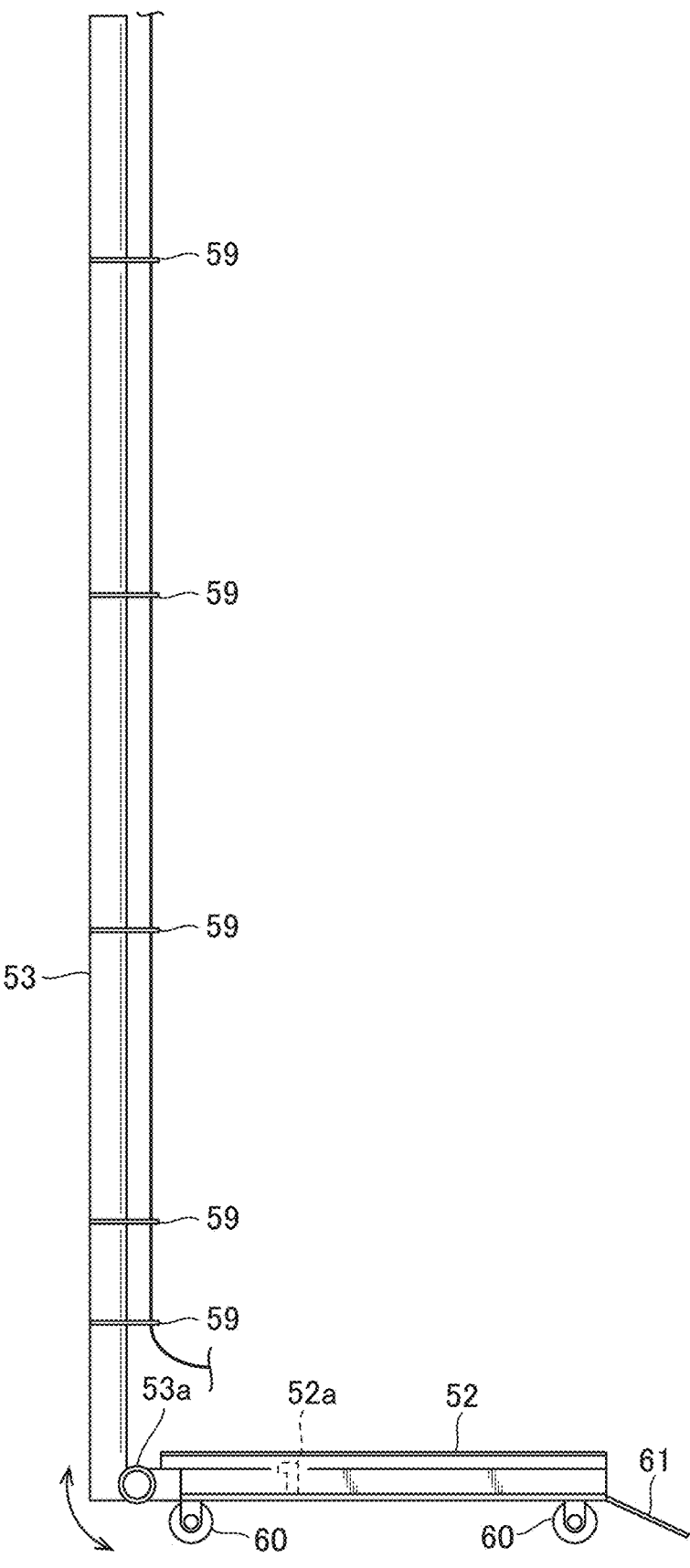
FIG. 23A is a diagram of the flight start stage viewed from the side (in a similar direction to that in FIG. 18).
Figure 23B:
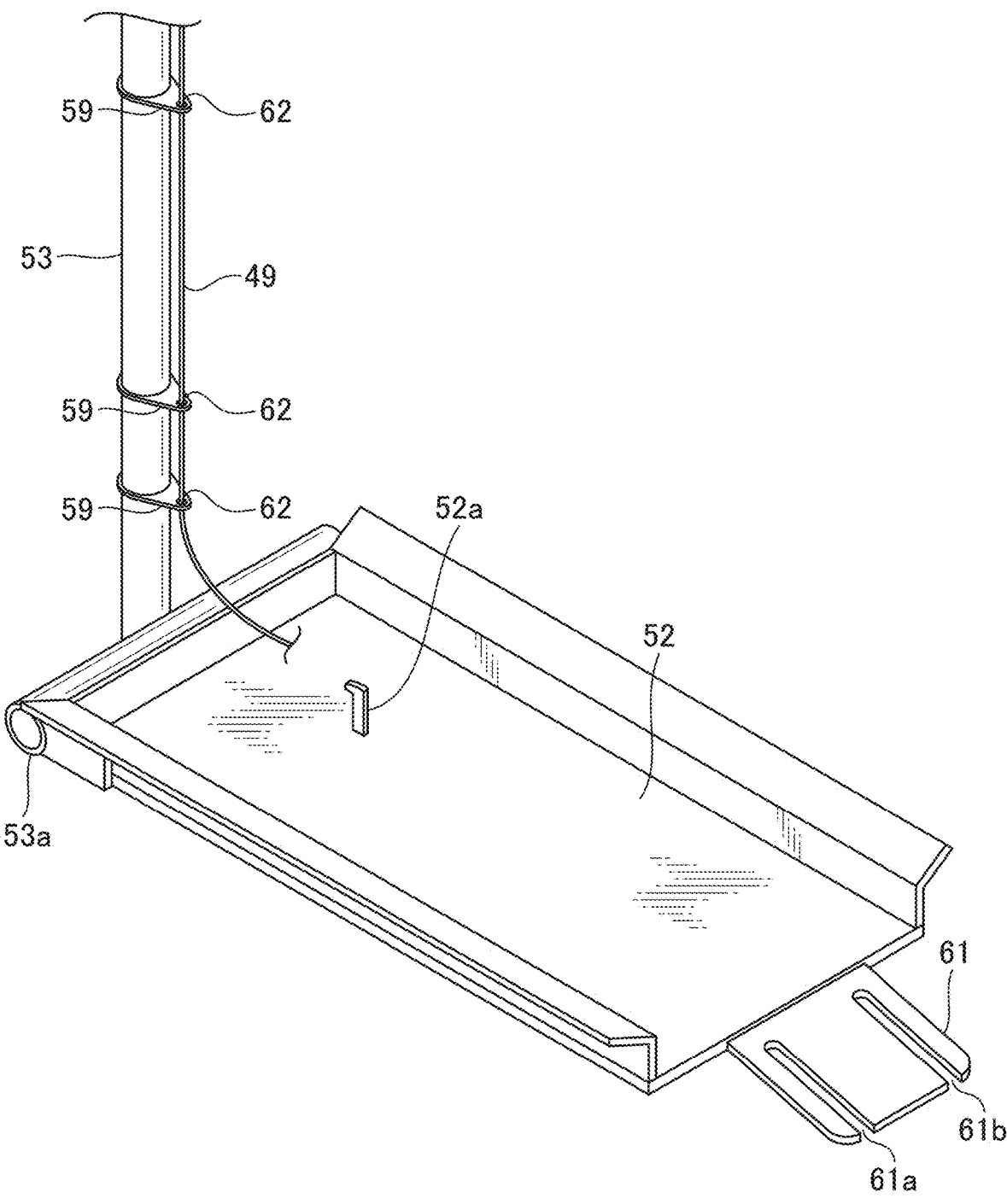
FIG. 23B is a perspective view of the flight start stage illustrated in FIG. 23A.
Figure 23C:
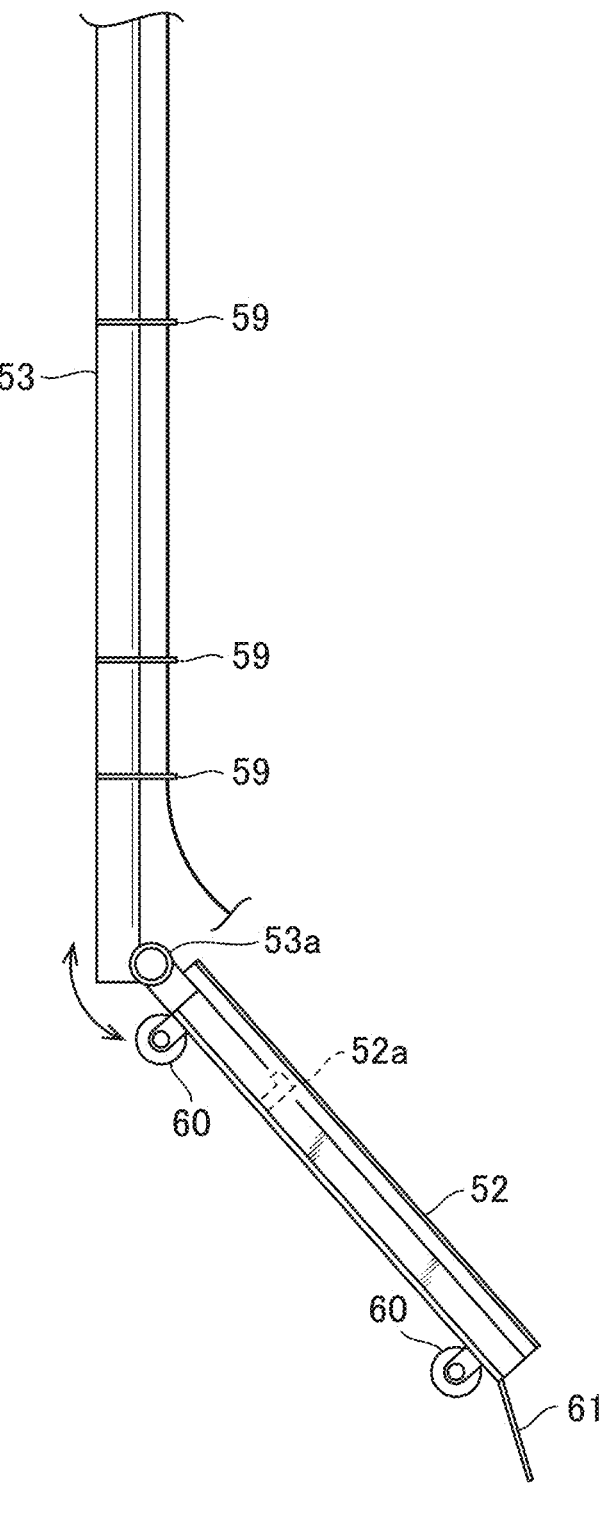
FIG. 23C is a diagram when the flight start stage illustrated in FIG. 23A is swung with respect to a rod-shaped body.

FIG. 23A is a diagram of the flight start stage 52 viewed from the side (in a similar direction to that in FIG. 18). The flight start stage 52 is attached to a distal end portion of the rod-shaped body 53 (The start stage 52 may be configured to be swingable with respect to the rod-shaped body 53, as indicated by an arrow in FIG. 23A, or may be completely fixed to the rod-shaped body 53), and is provided with an inclination section 61 for easily recovering the unmanned flying object 1. Guide members 59 are attached to the rod-shaped body 53. As illustrated in FIG. 23B, each of the guide members 59 is provided with a through hole 62, and has its one end connected to a rear end portion of the unmanned flying object 1 after the line-type member 49 extending from the cylinder like member 63 in the draw device 50 is passed through the through hole 62. As illustrated in FIG. 23B, the inclination section 61 is provided with two slits 61*a* and 61*b* (for the purpose of not preventing a flow of a solid material (e.g., a polluted material such as tissue paper) or polluted water). Note that when the flight start stage 52 illustrated in FIG. 23A or the unmanned flying object 1 loaded on the flight start stage 52 is larger than an insertion port 55*a* or the manhole 42*a*, and cannot be inserted into the inspection space as it is, the flight start stage 52 may be configured to be swingable (or rotatable), by being provided with a swing arm 53*a*, with the swing arm 53*a* used as an axis around the rod-shaped body 53. If the flight start stage 52 is swung, as illustrated in FIG. 23C (The rod-shaped body 53 and the flight start stage 52 may be swung along one straight line, as viewed from a similar angle to that in FIG. 23A, or the rod-shaped body 53 and the flight start stage 52 may be at a certain angle to each other, as illustrated in FIG. 23C, in a range where the unmanned flying object 1 is insertable into the inspection space), the flight start stage 52 loaded with the unmanned flying object 1 can be inserted into the inspection space even when the insertion port 55a and the manhole 42a are relatively small. Note that to prevent the unmanned flying object 1 from dropping when swinging the flight start stage 52, the flight start stage 52 is preferably provided with a stopper 52a (corresponding to a stopper hook in FIG. 24B), as illustrated in FIG. 23B, and a recess (or a hole, etc.) for hooking the vehicle body of the unmanned flying object 1 on the stopper 52a is preferably provided at the bottom of the vehicle body (for example, a depression is formed in the waterproof case 3 illustrated in FIG. 16E). Note that the swing arm, the stopper hook, and the like illustrated in FIGS. 23A to 23C, for example, are only schematically drawn to describe functions, and a specific configuration for swinging the flight start stage 52 with respect to the rod-shaped body 53 and a specific configuration for preventing the unmanned flying object 1 from dropping from the flight start stage 52 may be each any one of all known configurations, or may be each any one of all new configurations. Alternatively, if the flight start stage 52 and the unmanned flying object 1 are previously configured to be smaller than both the insertion port 55a and the manhole 42a (such that they can pass through both the insertion port 55a and the manhole 42a), the flight start stage 52 can be inserted into the inspection space without being swung (In this case, the flight start stage 52 need not be configured to be swingable, and a swing arm and stopper are also unnecessary).

Figure 24A:
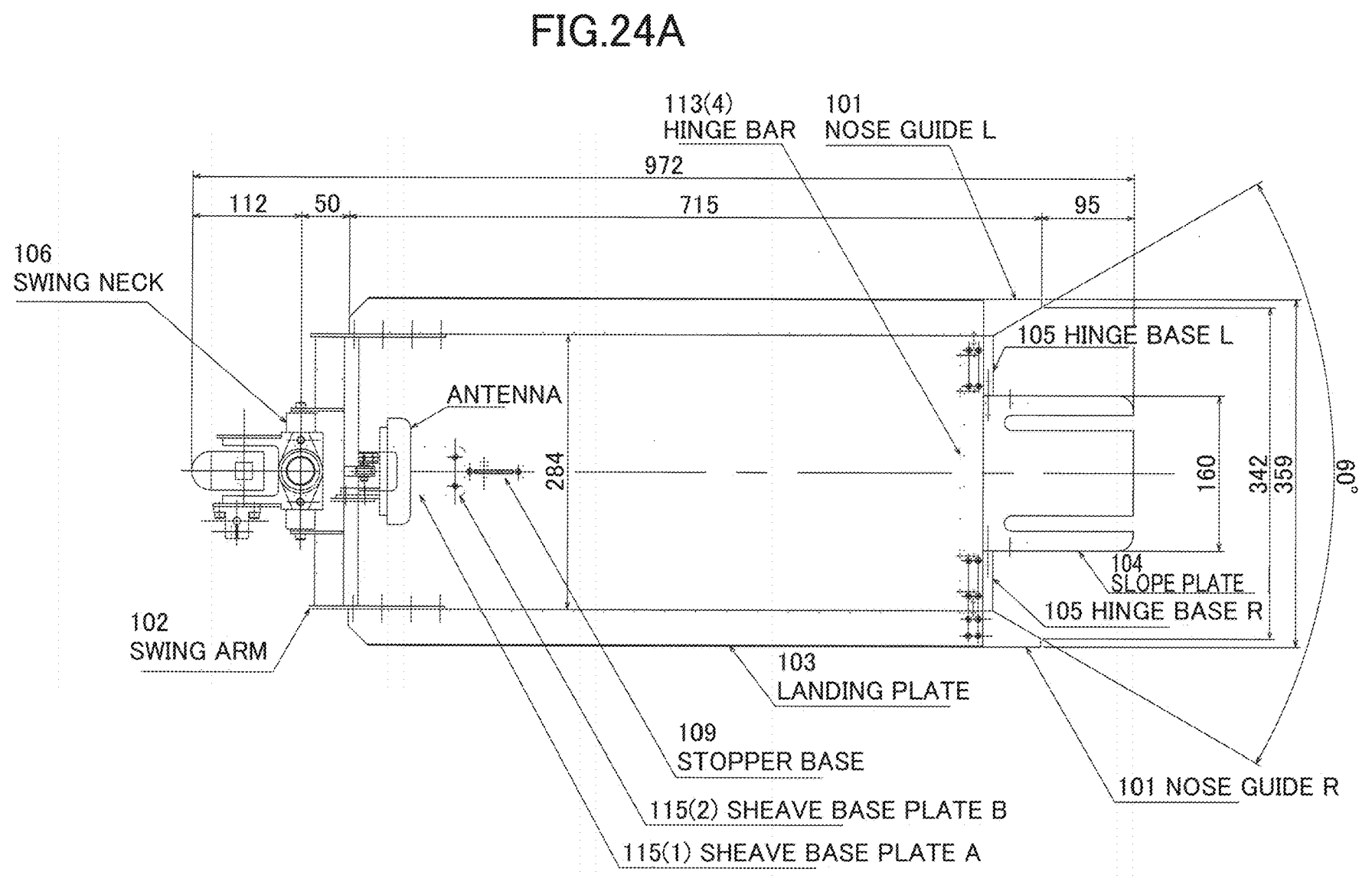
Figure 24B:
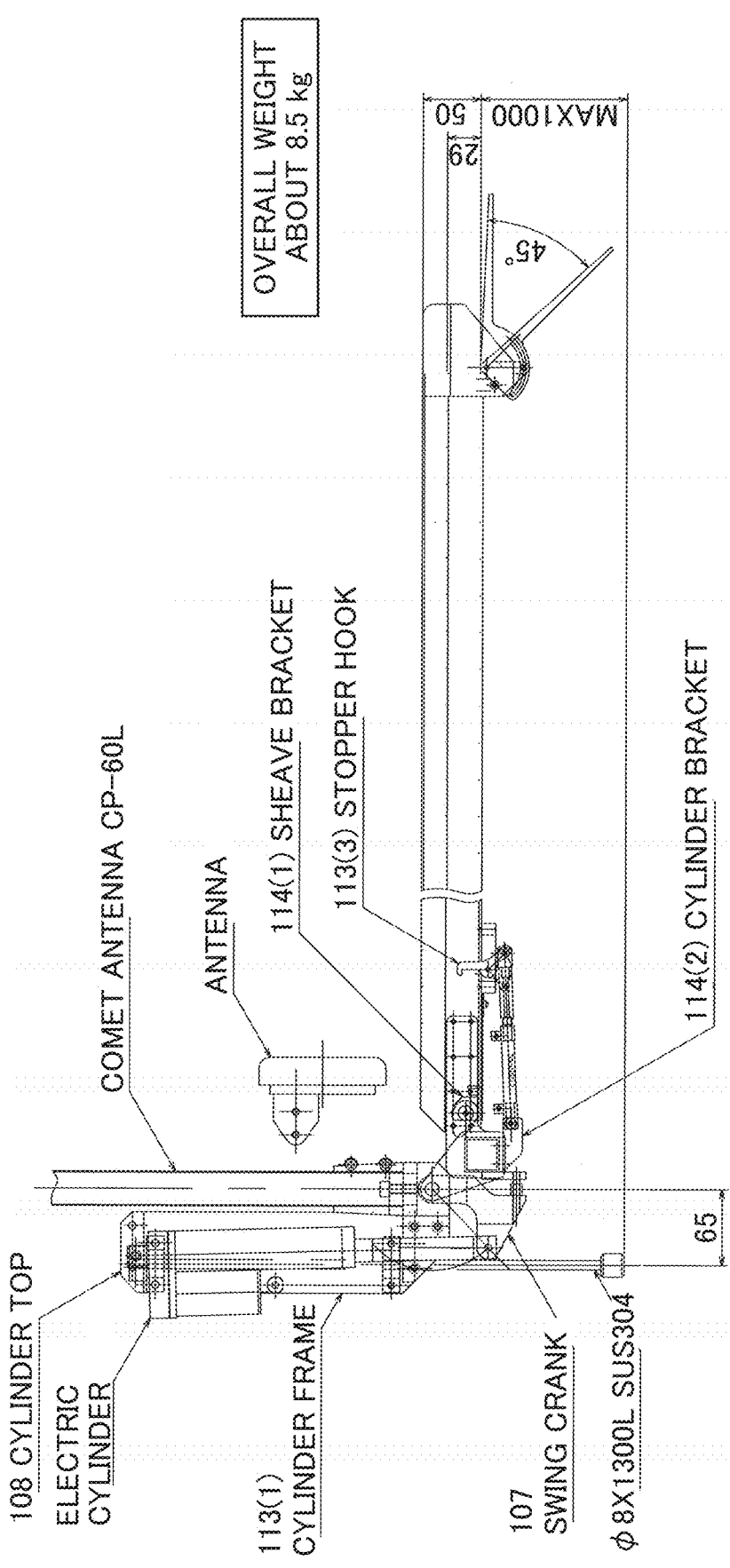
FIG. 24B is a design drawing of one example of the flight start stage (corresponding to a diagram viewed in a similar direction to that in FIG. 18).
Figure 24C:
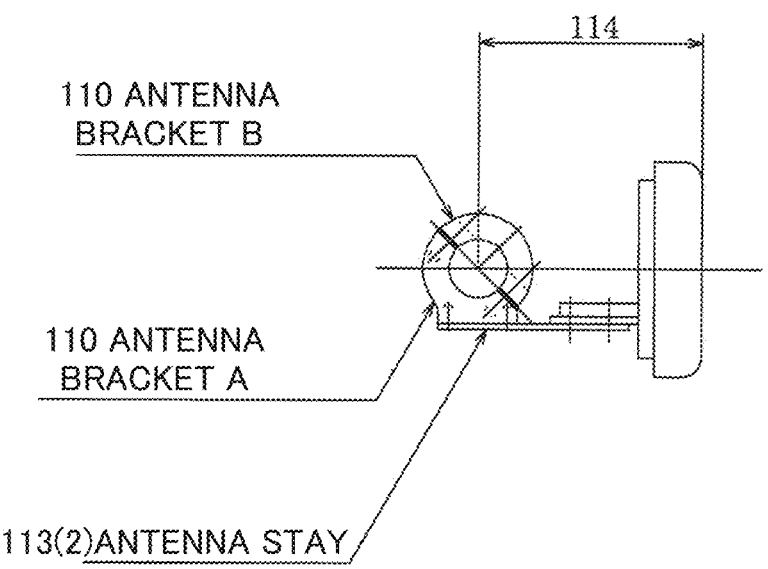
FIG. 24C is a design drawing of an antenna illustrated in FIGS. 24A and 24B.
Figure 24D:
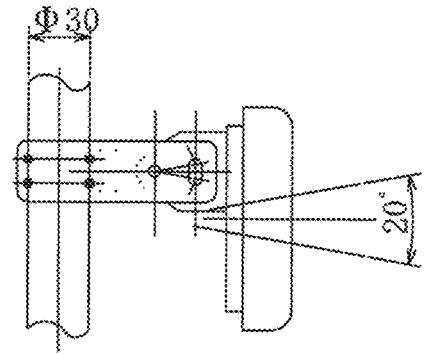
FIG. 24D is a design drawing of the antenna illustrated in FIGS. 24A and 24B (illustrating connection with the rod-shaped body in the flight start stage).

FIG. 24A is a design drawing of one example of the flight start stage (corresponding to a diagram viewed from above in FIG. 18), and FIG. 24B is a design drawing of the one example of the flight start stage (corresponding to a diagram viewed in a similar direction to that in FIG. 18). The flight start stage 52 is swingable with respect to the rod-shaped body 53. When the flight start stage 52 is swung in a direction along the rod-shaped body 53, for example, the unmanned flying object 1 is insertable into the inspection space even when the manhole is small (The unmanned flying object 1 can be fixed to the flight start stage 52 using a stopper base illustrated in FIG. 24A and a stopper hook illustrated in FIG. 24B). As illustrated in FIGS. 24A and 24B, communication between the external control device 51 and the unmanned flying object 1 may be performed, by loading the rod-shaped body 53 to which the flight start stage 52 is attached with an antenna, using the antenna, communication may be performed by the external control device 51, the wireless LAN relay device 56, and the unmanned flying object (the communication antenna 35 and the communication unit 36) without loading the rod-shaped body 53 with an antenna), or the communication unit 67 in the external control device 51 (including a communication antenna, a communication circuit, or the like, if necessary) and the unmanned flying object 1 (the communication antenna 35 and the communication unit 36) may directly communicate with each other without using the wireless LAN relay device 56. FIG. 24C is a design drawing of an antenna illustrated in FIGS. 24A and 24B, and FIG. 24D is also a design drawing of the antenna illustrated in FIGS. 24A and 24B (illustrating connection with the rod-shaped body in a flight start stage). In FIGS. 24A to 24D, a unitless numerical value of a length is indicated in millimeters.

Shooting Inspection Method

Figure 25:
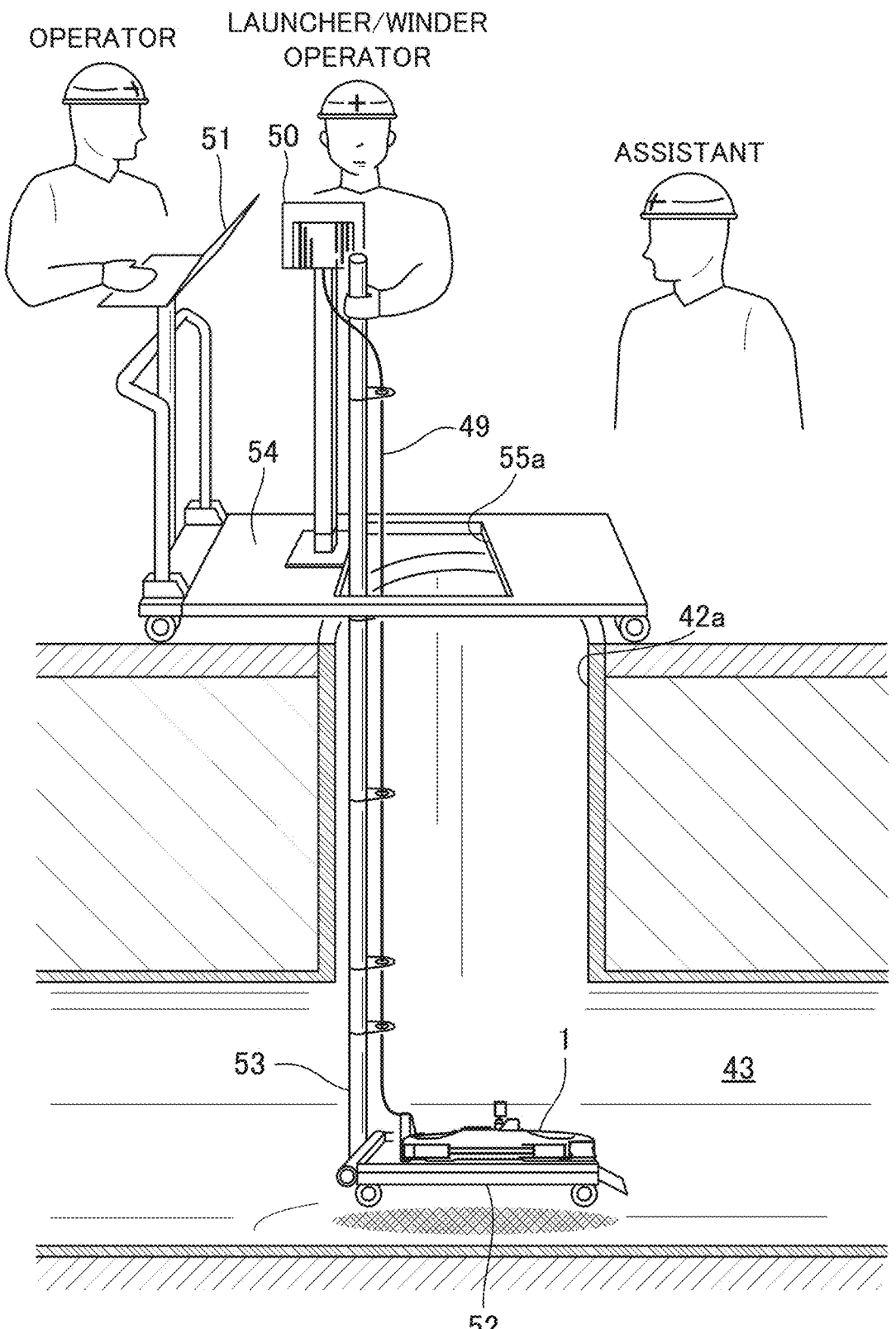
FIG. 25 is a diagram illustrating how the flight start stage loaded with the unmanned flying object is inserted into an underground space (FIG. 10, etc.) in an example of the shooting inspection according to the present invention.
Figure 26:
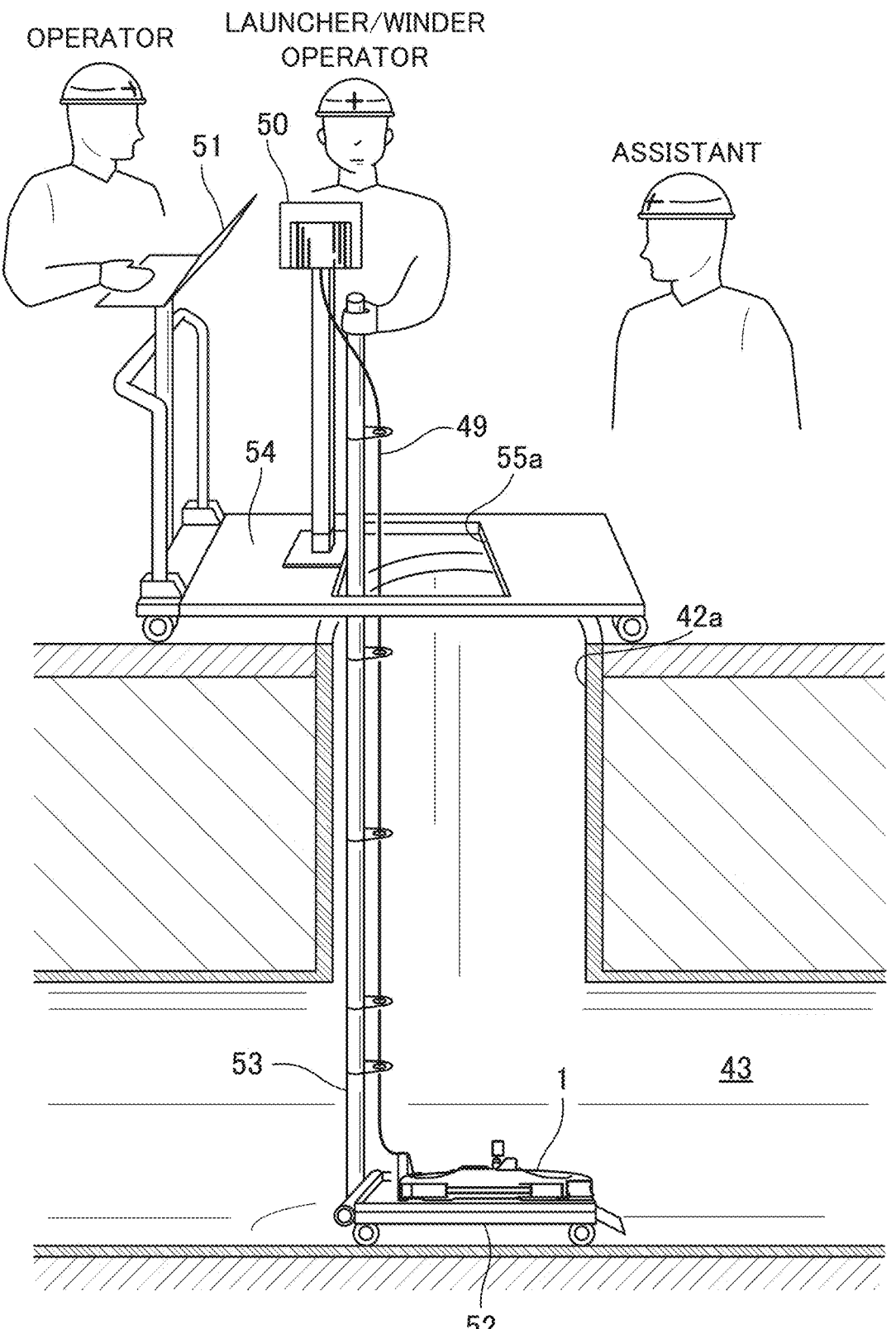
FIG. 26 is a diagram illustrating how the flight start stage loaded with the unmanned flying object is landed on the ground in an example of the shooting inspection according to the present invention.
Figure 27:
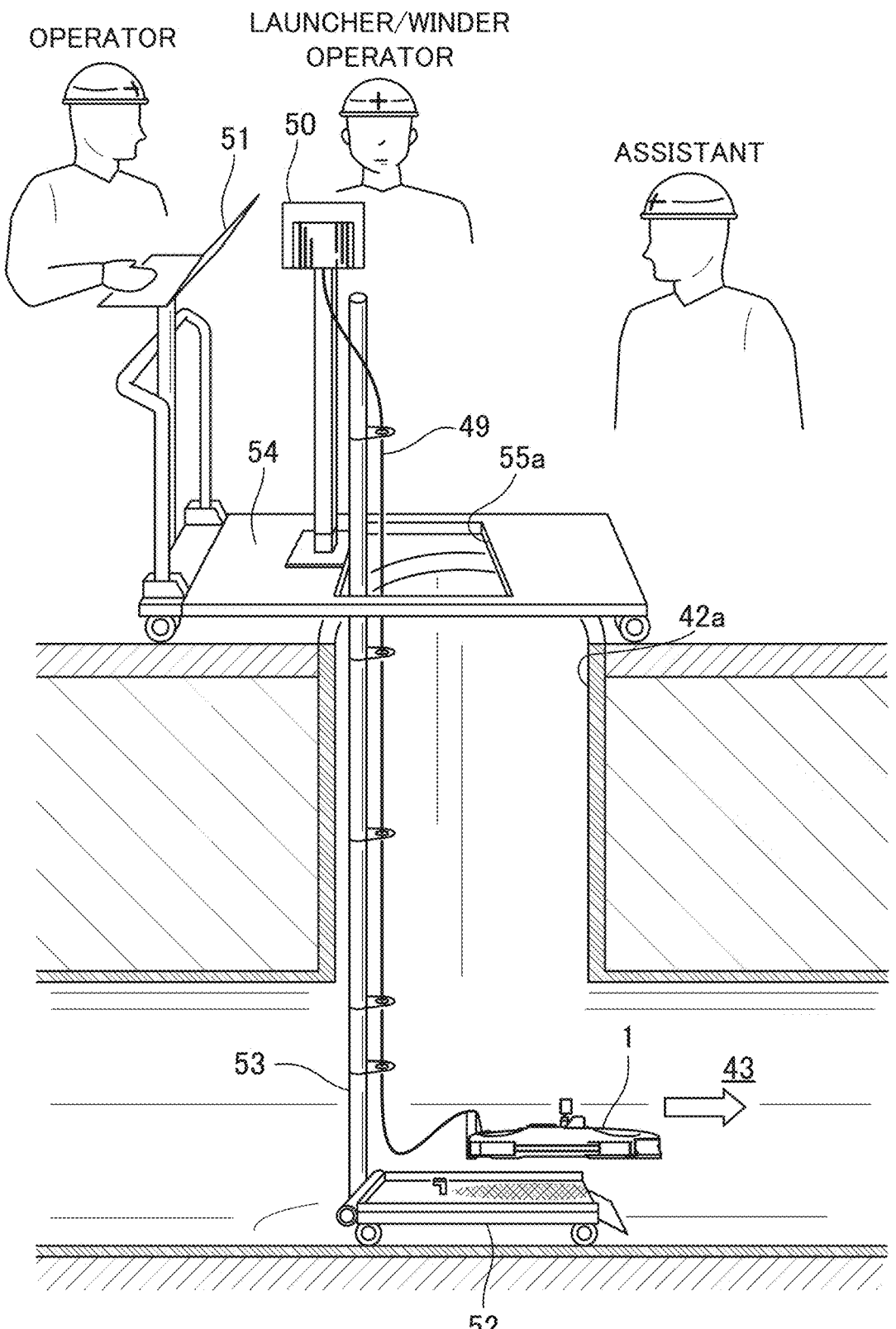
FIG. 27 is a diagram illustrating a state immediately after the unmanned flying object has started to fly away from the flight start stage in an example of the shooting inspection according to the present invention.

Then, a shooting inspection method performed using the shooting inspection system will be described. First, the launcher/winder operator inserts the rod-shaped body 53 into the inspection space from the insertion port 55a and the manhole 42a from the side of the flight start stage 52 with the rod-shaped body 53 held in his or her hand, to put the flight start stage 52 loaded with the unmanned flying object 1 into the inspection space (underground space) (FIG. 25). When the unmanned flying object 1 or the flight start stage 52 is larger than at least one of the insertion port 55a and the manhole 42a, as already described, the flight start stage 52 is swung to be along the rod-shaped body 53 or such that a certain angle is formed between the rod-shaped body 53 and the flight start stage 52, as illustrated in FIG. 23C, in a range where it can pass through the insertion port 55a and the manhole 42a (The flight start stage 52 is provided with the stopper hook (FIG. 24B), for example, to fix the unmanned flying object 1 to the flight start stage 52. Note that at the time of start of subsequent flight, a method of releasing the unmanned flying object 1 from the stopper hook when flight is started is arbitrary. For example, the unmanned flying object 1 can be released from the stopper hook by being appropriately steered to take off. Alternatively, the unmanned flying object 1 is configured to start to fly after the stopper hook moves and comes off the unmanned flying object 1 by remote control). Then, the flight start stage 52 and the rod-shaped body 53 are inserted into the inspection space, and the flight start stage 52 that has swung after being inserted is returned to its original state (may be returned to its original state electrically by remote control, or may be returned to its original state by being simply pressed downward, for example). Alternatively, if the flight start stage 52 and the unmanned flying object 1 are previously configured to be smaller than both the insertion port 55a and the manhole 42a (such that they can pass through both the insertion port 55a and the manhole 42a), the flight start stage 52 can be inserted into the inspection space without being swung (In this case, the flight start stage 52 need not be configured to be swingable, and a stopper is also unnecessary). After the flight start stage 52 lands in the inspection space (FIG. 26), the operator inputs a control instruction from the input unit 68 in the external control device 51 (It is assumed that the steering program stored in the storage unit 65 is being executed by the processing unit 64), to start flight of the unmanned flying object 1 (FIG. 27). The line-type member 49 is connected to the rear end portion of the unmanned flying object 1, and the unmanned flying object 1 flies in the inspection space while pulling the line-type member 49. Accordingly, the cylinder like member (spool) 63 in the draw device 50 rotates in the opposite direction to the arrow direction in FIG. 22 so that the line-type member 49 is unwound (extends).

Figure 28:
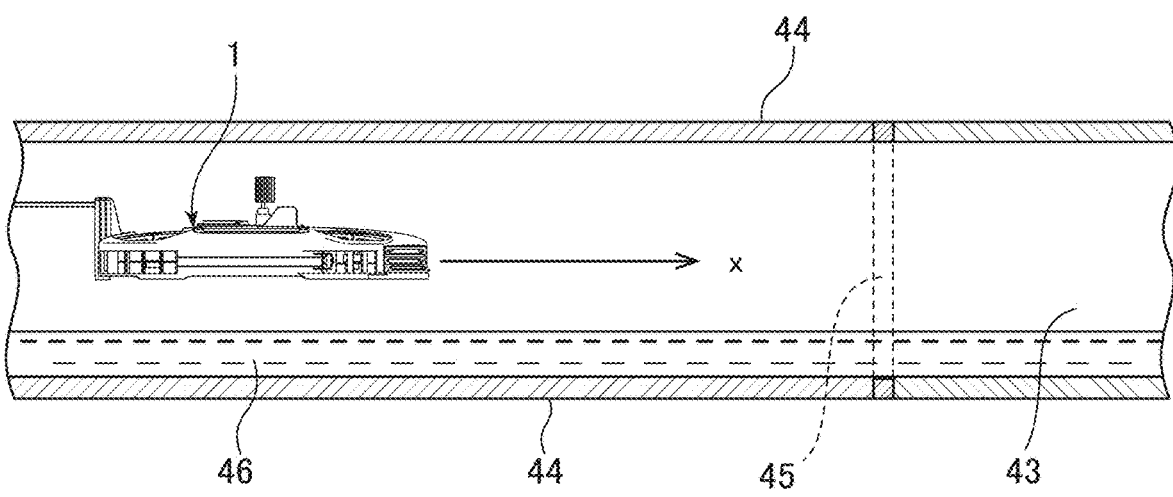
FIG. 28 is a diagram illustrating the unmanned flying object illustrated in FIG. 16A that flies in a tubular space in the sewage pipeline facility illustrated in FIG. 10.

The unmanned flying object 1 flies in an x-direction in FIG. 28 in the sewage pipeline 43 while pulling the line-type member 49 according to a control instruction indicated by a control signal to be transmitted from the external control device 51. At this time, the unmanned flying object 1 shoots a still image or a moving image in the sewage pipeline 43 using the inspection camera 22 and the front camera 23 while flying in the traveling direction upon receiving a control signal for issuing an advance instruction (may not perform shooting using the inspection camera 22 while flying in the traveling direction). Note that although water 46 normally exists in the sewage pipeline 43, and its water level varies, as needed, a float force can also be obtained by a water surface effect caused by rotation of the rotors 13 to 16 (Even when there is no water 46, a similar effect can be obtained from the inner wall 44).

During flight, data of the still image or the moving image shot by the front camera 23 is transmitted, as needed (preferably in real time), to the external control device 51 of the operator from the communication antenna 35 by the communication unit 36 after being recorded in a built-in memory in the front camera 23. The external control device 51 receives the data of the still image or the moving image shot by the front camera 23 in the communication unit 67, and displays the still image or the moving image shot by the front camera 23 on a display (the display unit 66) included in the external control device 51 using the received data (The processing unit 64 executes the drawing program stored in the storage unit 65 to control an operation of the display unit 66, and the display unit 66, which has been controlled by the processing unit 64, displays the still image or the moving image). The operator steers the unmanned flying object 1 by inputting a control instruction to the external control device 51 (The input unit 68 in the external control device 51 receives the input of the control instruction) at a first person view (FPV) while confirming the still image or the moving image displayed on the display unit 66 (A signal representing the control instruction inputted by the operator is transmitted to the unmanned flying object 1 from the communication unit 67 in the external control device 51, and the unmanned flying object 1 receives the signal using the communication antenna 35 and the communication circuit 36, and flies according to the control instruction represented by the signal. As already described, the communication unit 67 in the external control device 51 and the communication antenna 35 and the communication circuit 36 in the unmanned flying object 1 may directly communicate with each other, or may communicate with each other according to a wireless LAN communication standard while using an antenna or the like attached to the wireless LAN relay device 56 or the rod-shaped body 53). In an example, a distance by which the unmanned flying object 1 has advanced can be determined based on a length of the line-type member 49 pulled out of the draw device 50.

When the unmanned flying object 1 finishes flying in the traveling direction (in the x-direction in FIG. 28) when it has reached a destination or when it cannot further advance due to any reason, for example, the unmanned flying object 1 receives the signal representing the control instruction inputted to the external control device 51 by the operator from the external control device 51, and performs hovering in situ according to the control instruction represented by the signal. In an example, the unmanned flying object 1 performs hovering by stopping the rotation of the thrust generation propeller 25 and controlling all respective rotational speeds of the rotors 13 to 16 to be an equal rotational speed (The adjacent rotors respectively rotate in opposite directions, for example, the rotors 13 to 16 rotate in a clockwise direction as viewed in the positive direction of z, and the rotors 14 and 15 rotate in a counterclockwise direction as viewed in the positive direction of z). When the launcher/winder operator operates the draw device 50 with the unmanned flying object 1 performing hovering, the draw device 50 winds the line-type member 49, and therefore the unmanned flying object 1 is drawn in a direction toward the flight start stage 52 (FIG. 29).

Figure 29:
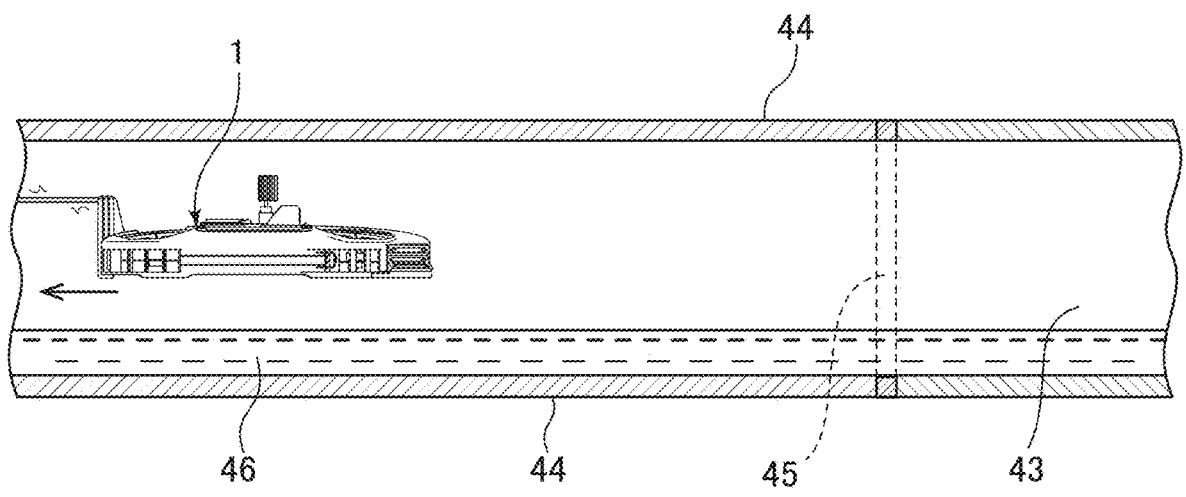
FIG. 29 is a diagram illustrating how the automatic winding device winds the line-type member to pull the unmanned flying object backward with the unmanned flying object stopping advancing in an x-direction in FIG. 28 and floating.

While the unmanned flying object 1 is being drawn in the direction toward the flight start stage 52 (while it is retreating or while it advancing in an arrow direction in FIG. 29), the inspection camera 22 continues to shoot a still image or a moving image in the sewage pipeline 43 (The shooting by the inspection camera 22 may be started before the unmanned flying object 1 is put into the inspection space, the shooting by the inspection camera 22 may be continued until the unmanned flying object 1 is recovered on the ground, or the shooting by the inspection camera 22 may be performed only while the unmanned flying object 1 is being drawn by remote control). An amount of water splashes scattered around the unmanned flying object 1 is small because the rotation of the thrust generation propeller 25 is stopped when the unmanned flying object 1 is retreating than when the unmanned flying object 1 is advancing. Accordingly, when the inspection camera 22 performs front shooting while the unmanned flying object 1 is retreating, a moving image or a still image that are less affected by the water splashes is obtained. Data of the still image or the moving image shot by the inspection camera 22 is recorded in a built-in memory in the inspection camera 22. Note that the front camera 23 also continues to shoot a still image or a moving image at this time, and data of the still image or the moving image shot by the front camera 23 is transmitted, as needed (preferably in real time), to the external control device 51 of the operator from the communication antenna 35 by the communication unit 36 after being recorded in the built-in memory in the front camera 23. As already described, the external control device 51 receives the data of the still image or the moving image shot by the front camera 23 in the communication unit 67, and displays the still image or the moving image shot by the front camera 23 on the display (the display unit 66) provided in the external control device 51 using the received data.

Figure 30:
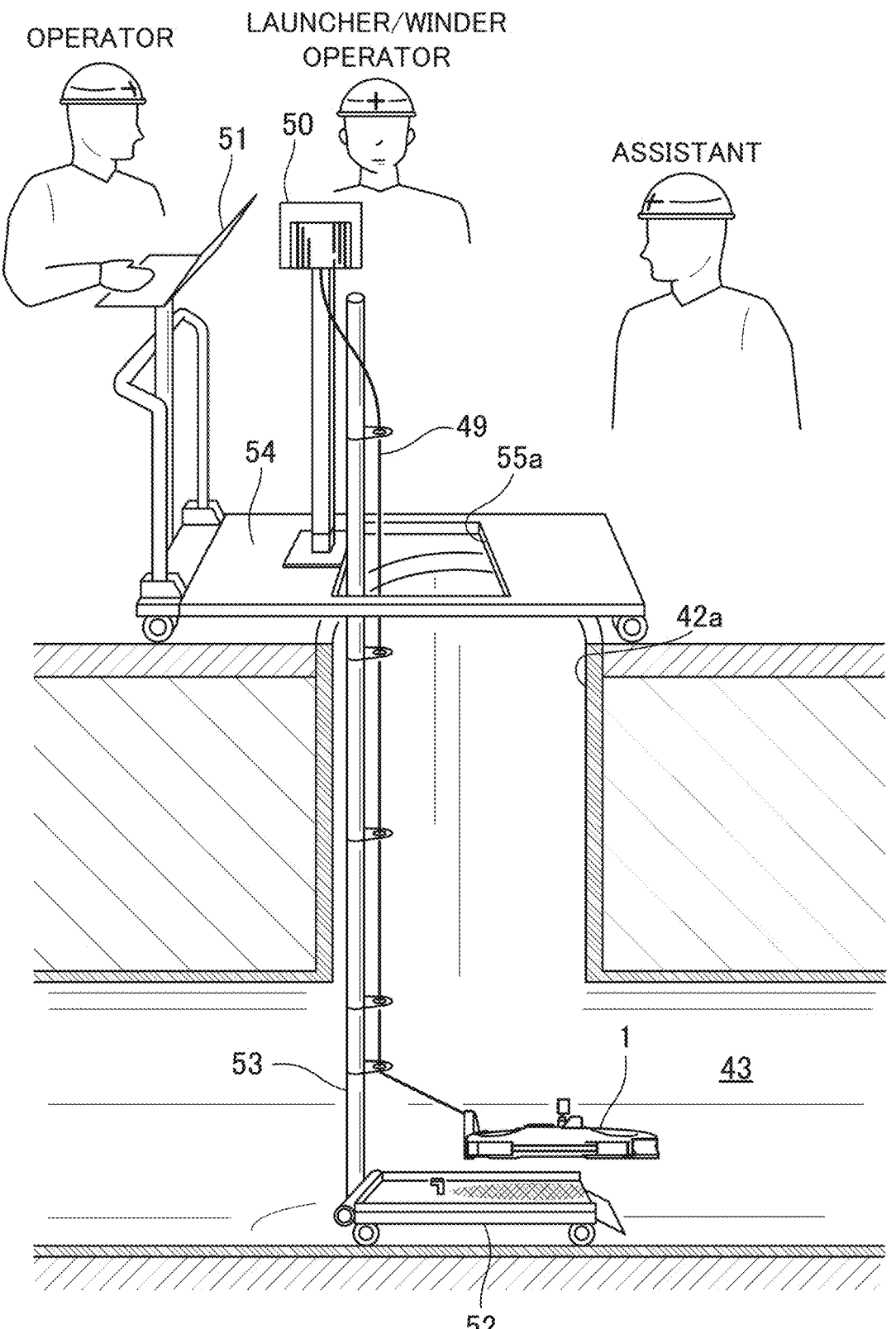
FIG. 30 is a diagram illustrating how the unmanned flying object has been pulled by the automatic winding device to return to the top of the flight start stage.
Figure 31:
FIG. 31 is a diagram illustrating a screen in which an expanded image is drawn on a display section of the external control device using data of a still image or a moving image shot by inspection camera.

As illustrated in FIG. 30, the un manned flying object 1 is drawn toward the flight start stage 52. When the unmanned flying object 1 returns to the top of the flight start stage 52 (It may be judged that the unmanned flying object 1 has returned to the top of the flight start stage 52 based on the moving image or the still image, which has been shot by the front camera 23, to be displayed on the display unit 66, or it may be judged that the unmanned flying object 1 has returned to the top of the flight start stage 52 because the length of the line-type member 49 pulled out of the draw device 50 becomes a predetermined length or less), the launcher/winder operator operates the draw device 50 to stop winding the line-type member 49 by the draw device 50. When the operator inputs a control instruction to issue an instruction to finish hovering of the unmanned flying object 1 to the external control device 51, a signal representing the control instruction is transmitted to the unmanned flying object 1 from the external control device 51, and the unmanned flying object 1 finishes hovering according to the control instruction represented by the signal to land on the flight start stage 52. Further, the launcher/winder operator pulls up the rod-shaped body 53 to the ground, to pull up the launcher 52 and the unmanned flying object 1 to the ground and recover the launcher 52 and the unmanned flying object 1 (The flight start stage 52 is swung with respect to the rod-shaped body 53, if necessary, like when the unmanned flying object 1 is inserted into the inspection space, to enable the flight start stage 52 loaded with the unmanned flying object 1 to pass through the manhole 42*a* and the insertion port 55*a*. In an example, the flight start stage 52 may be swung manually in a stage where the unmanned flying object 1 has approached the ground (At this time, the vehicle body of the unmanned flying object 1 may be manually hooked on the stopper 52*a*), or the flight start stage 52 may be swung electrically by remote control (A specific method is arbitrary. For example, the flight start stage 52 is similarly swung after the stopper 52*a* is electrically moved by remote control to hook the vehicle body of the unmanned flying object 1 on the stopper 52*a*). Alternatively, if the flight start stage 52 and the unmanned flying object 1 are previously configured to be smaller than both the insertion port 55*a* and the manhole 42*a* (such that they can pass through both the insertion port 55*a* and the manhole 42*a*), the flight start stage 52 can be recovered without being swung (In this case, the flight start stage 52 need not be configured to be swingable, and a stopper is also unnecessary). Respective states of the sewage pipeline 43, the inner wall 44, and the like can be confirmed by removing the inspection camera 22 from the recovered unmanned flying object 1 and seeing a still image or a moving image recorded on the memory. After the data of the still image or the moving image shot by the inspection camera 22 is stored in the storage unit 65 in the external control device 51, the processing unit 64 executes the image processing program stored in the storage unit 65 to perform image processing of the data of the still image or the moving image, generates a developed view or expanded image data of the inner wall 44 or the like of the inspection space, and displays the developed view or the expanded image data as a developed view or an expanded image on the display unit 66 so that an inner state of the sewage pipeline facility can be more appropriately grasped (See FIG. 31. Although an expanded image 69 is displayed on the display unit 66 in FIG. 31, the expanded image 69 may be displayed as a developed view such as a line diagram by being appropriately processed).

INDUSTRIAL APPLICABILITY

The present invention can be used for shooting inspection in any inspection space such as the inside of a water supply pipeline, the inside of a sewage pipeline, the inside of a drainage channel, the inside of a tunnel of a highway, the inside of a drainage pipe of the highway, the inside of a cave passage, the inside of a duct, the inside of a pipe shaft, or the inside of a gas pipeline. The present invention is also usable when an unmanned aerial vehicle (unmanned flying object) is flown for any purpose in any space.

REFERENCE SIGNS LIST 1 unmanned aerial vehicle, unmanned flying object
2 main body section
3 waterproof case
4 frame
4a frame rear section
4b, 4c, through hole
4A to 4D rotation stop position
5 to 8 preceding collision member
5A to 8A shaft section for preceding collision member
9, 10 holding member
9A, 10A hole
9B-1, 9B-2, 10B-1, 10B-2 preceding collision member attachment member
9C-1, 9C-2, 10C-1, 10C-2 hole
11, 12 holding member attachment member
11A, 12A shaft section for holding member
13 to 16 rotor
17 to 21 motor
22 inspection camera
23 front camera
24 ultrasonic sensor
25 thrust generation propeller
26 center of gravity
27A motor member
27B motor member
27C motor member
27A-1 groove
28A main operation unit
28b signal conversion unit
29 control signal generation unit 30 to 34 speed controller
35 communication antenna
36 communication unit
37 various types of sensors
38a autonomous control program
38b various types of databases
39 recording apparatus
40 power supply system
41 ground surface
42a, 42b manhole
43 sewage pipeline, inspection space
44 inner wall
45 connection section
46 water
47 boundary surface
48 illumination light
49 line-type member
49a wire (piano wire, etc.)
50 draw device
51 external control device
52 flight start stage (launcher)
52a stopper
53 rod-shaped body
53a swing arm
54 carriage
55 window
55a insertion port
wireless LAN (Wi-Fi) relay device
57a, 57b external power supply apparatus
58 wheels (four wheels)
59 guide member
60 wheels (four wheels)
61 inclination section
61a, 61b slit
62 through hole
63 cylinder like member (spool)
64 processing unit
65 storage unit
66 display unit
67 communication unit
68 input unit
69 expanded image

The invention claimed is:

1. An unmanned flying object comprising:
a frame carrying a vehicle body, wherein the frame is elongated and extends in a forward direction between a front-half side of the vehicle body and a back-half side of the vehicle body;
four rotary wings for floating the unmanned flying object which are positioned inside the frame adjacent to a corresponding set of openings provided in an upper surface and a bottom surface of the frame, wherein a plurality of sidewall openings formed in a sidewall separating the upper surface and the bottom surface of the frame are positioned adjacent to the corresponding set of openings, and wherein the four rotary wings include a first pair of rotary wings positioned in the front-half side of the vehicle body and a second pair of rotary wings is positioned in the back-half side of the vehicle body such that the first pair of rotary wings are spaced apart from the second pair of rotary wings to define an area therebetween, wherein each of the corresponding set of openings is associated with a corresponding one of the plurality of sidewall openings, and wherein a sidewall opening of the plurality of sidewall openings is positioned at a side of each of the four rotary wings;

a driver that drives the first pair of rotary wings and the second pair of rotary wings;

a control signal generation unit coupled to the driver and positioned in the area between the first pair of rotary wings and second pair of rotary wings, wherein the control signal generation unit generates a control signal for causing the driver to drive the first pair of rotary wings and the second pair of rotary wings, and wherein the first pair of the four rotary wings, the control signal generation unit, and the second pair of the four rotary wings are arranged apart from each other in the forward direction in the order of the first pair of rotary wings, the control signal generation unit, and the second pair of rotary wings, an inspection camera and a traveling direction shooting camera which are placed at positions on the upper surface of the vehicle body and pointed in the forward direction of travel and oriented along a longitudinal axis parallel to the elongated frame, the positions being different from each other and are located in the area between the first pair of rotary wings and second pair of rotary wings, where the inspection camera is a detachable camera positioned to limit scattered liquid from reaching a position of the inspection camera or the traveling direction shooting camera when the unmanned flying object is flying above a surface on which a liquid at least partly exists, and an unmanned flying object-side communicator transmitting externally traveling direction image data obtained by shooting in a traveling direction by means of the traveling direction shooting camera while the unmanned flying object is flying, wherein resolution of moving image or still image obtained from the traveling direction image data is lower than resolution of moving image or still image obtained from image data of the inspection camera.

2. The unmanned flying object according to claim 1, further comprising a thrust generation propeller, the unmanned flying object being propelled by rotations of the thrust generation propeller while floating by rotations of the four rotary wings.

3. The unmanned flying object according to claim 1, wherein the inspection camera and the traveling direction shooting camera are positioned at different positions on the vehicle body and are aligned along the forward direction.

4. The unmanned flying object according to claim 1, wherein the traveling direction shooting camera is aligned along the forward direction, and the inspection camera is positioned vertically relative to the traveling direction shooting camera.

5. The unmanned flying object according to claim 1, wherein the sidewall includes an illumination light aligned along the forward direction to provide forward illumination.

* * * * *